(12) United States Patent
Karr

(10) Patent No.: US 12,229,430 B2
(45) Date of Patent: Feb. 18, 2025

(54) SCHEDULING REPLICATION BASED ON COORDINATED CHECKPOINTS

(71) Applicant: PURE STORAGE, INC., Santa Clara, CA (US)

(72) Inventor: Ronald Karr, Palo Alto, CA (US)

(73) Assignee: PURE STORAGE, INC., Santa Clara, CA (US)

(*) Notice: Subject to any disclaimer, the term of this patent is extended or adjusted under 35 U.S.C. 154(b) by 0 days.

(21) Appl. No.: 18/419,809

(22) Filed: Jan. 23, 2024

(65) Prior Publication Data

US 2024/0311034 A1     Sep. 19, 2024

Related U.S. Application Data

(63) Continuation of application No. 17/731,020, filed on Apr. 27, 2022, now Pat. No. 11,893,263, which is a continuation-in-part of application No. 17/514,784, filed on Oct. 29, 2021, now Pat. No. 11,714,723.

(60) Provisional application No. 63/298,161, filed on Jan. 10, 2022.

(51) Int. Cl.
*G06F 12/00* (2006.01)
*G06F 1/08* (2006.01)
*G06F 3/06* (2006.01)

(52) U.S. Cl.
CPC .............. *G06F 3/065* (2013.01); *G06F 1/08* (2013.01); *G06F 3/0619* (2013.01); *G06F 3/0659* (2013.01); *G06F 3/067* (2013.01)

(58) Field of Classification Search
CPC .......... G06F 11/1448; G06F 11/1461; G06F 11/1446; G06F 11/1471; G06F 16/128; G06F 2201/82; G06F 2201/84; G06F 3/0646; G06F 3/065; G06F 3/0683; G06F 12/16
See application file for complete search history.

(56) References Cited

U.S. PATENT DOCUMENTS

| | | | |
|---|---|---|---|
| 7,975,115 B2 | 7/2011 | Wayda et al. |
| 8,504,797 B2 | 8/2013 | Mimatsu |
| 8,822,155 B2 | 9/2014 | Sukumar et al. |
| 9,280,678 B2 | 3/2016 | Redberg |
| 9,395,922 B2 | 7/2016 | Nishikido et al. |
| 10,324,639 B2 | 6/2019 | Seo |
| 10,567,406 B2 | 2/2020 | Astigarraga et al. |
| 10,846,137 B2 | 11/2020 | Vallala et al. |
| 10,877,683 B2 | 12/2020 | Wu et al. |

(Continued)

OTHER PUBLICATIONS

Hwang K., et al., "RAID-χ: A New Distributed Disk Array for I/O-Centric Cluster Computing," Proceedings of The Ninth International Symposium On High-performance Distributed Computing, IEEE Computer Society, Los Alamitos, CA, Aug. 2000, pp. 279-286.

(Continued)

*Primary Examiner* — Shawn X Gu

(57) ABSTRACT

Coordinated checkpoints among storage systems implementing checkpoint-based replication, including orchestrating one or more coordinated lightweight checkpoints for a source dataset stored across two or more source storage systems; and coordinating a replication of the one or more coordinated lightweight checkpoints from the two or more source storage systems to two or more target storage systems.

20 Claims, 43 Drawing Sheets

(56) References Cited

U.S. PATENT DOCUMENTS

| | | |
|---|---|---|
| 11,076,509 B2 | 7/2021 | Alissa et al. |
| 11,106,810 B2 | 8/2021 | Natanzon et al. |
| 11,194,707 B2 | 12/2021 | Stalzer |
| 2008/0256141 A1 | 10/2008 | Wayda et al. |
| 2010/0306500 A1 | 12/2010 | Mimatsu |
| 2011/0035540 A1 | 2/2011 | Fitzgerald et al. |
| 2014/0220561 A1 | 8/2014 | Sukumar et al. |
| 2015/0154418 A1 | 6/2015 | Redberg |
| 2016/0026397 A1 | 1/2016 | Nishikido et al. |
| 2016/0182542 A1 | 6/2016 | Staniford |
| 2016/0248631 A1 | 8/2016 | Duchesneau |
| 2017/0262202 A1 | 9/2017 | Seo |
| 2018/0054454 A1 | 2/2018 | Astigarraga et al. |
| 2018/0074748 A1* | 3/2018 | Makin .................. G06F 9/4856 |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0360833 A1 | 11/2021 | Alissa et al. |

OTHER PUBLICATIONS

Stalzer M.A., "FlashBlades: System Architecture and Applications," Proceedings of the 2nd Workshop on Architectures and Systems for Big Data, Association for Computing Machinery, New York, NY, 2012, pp. 10-14.

Storer M.W., et al., "Pergamum: Replacing Tape with Energy Efficient, Reliable, Disk-Based Archival Storage," 6TH USENIX Conference on File And Storage Technologies (FAST'08), San Jose, CA, USA, Feb. 26-29, 2008, 16 Pages, ISBN 978-1-931971-56-0, XP002665467.

\* cited by examiner

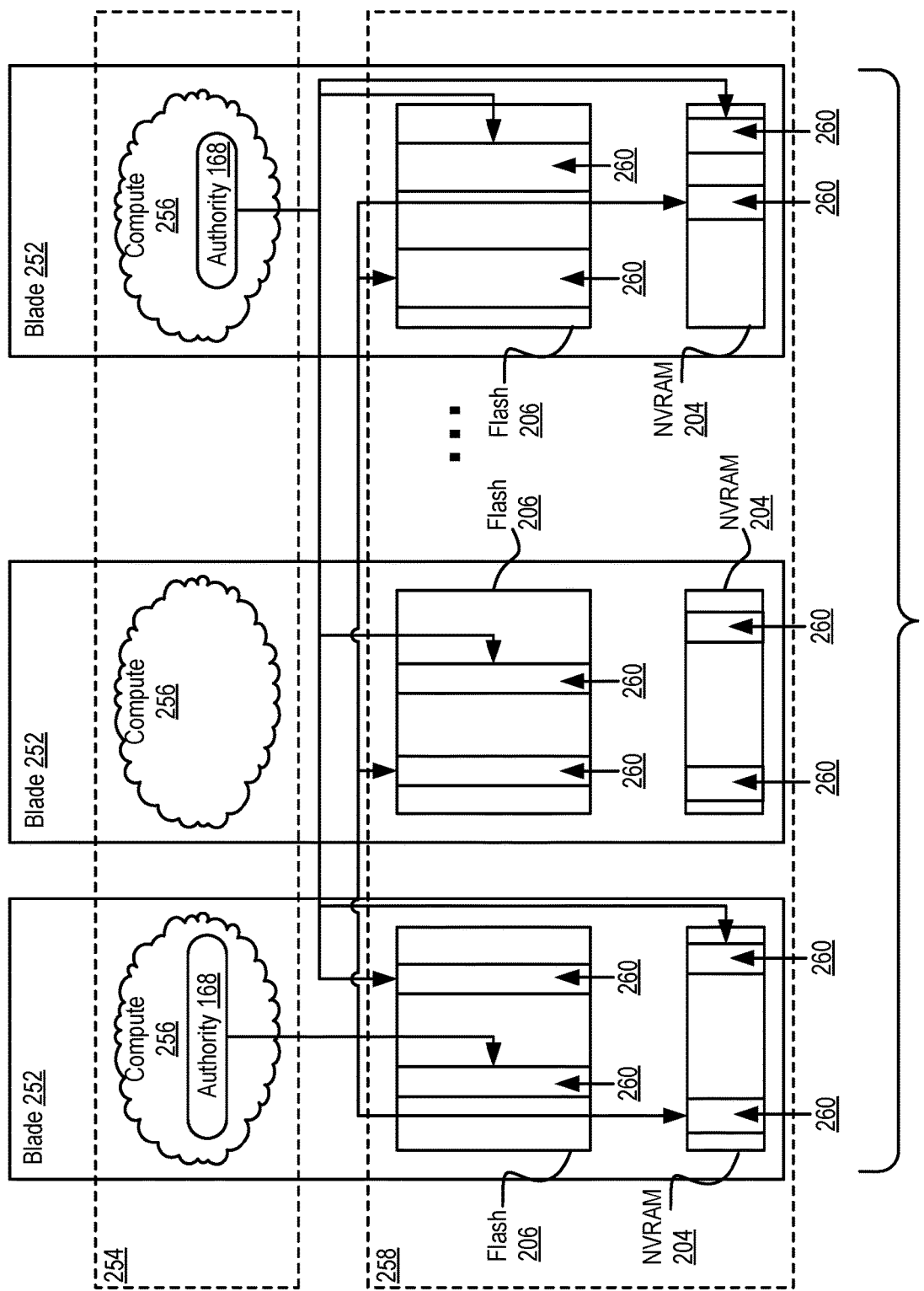

SCHEDULING REPLICATION BASED ON COORDINATED CHECKPOINTS

CROSS-REFERENCE TO RELATED APPLICATIONS

This is a continuation application for patent entitled to a filing date and claiming the benefit of earlier-filed U.S. Pat. No. 11,893,263, issued Feb. 6, 2024, herein incorporated by reference in its entirety, which is a continuation in-part of U.S. Pat. No. 11,714,723, issued Aug. 1, 2023, and claims priority to U.S. Provisional Patent Application No. 63/298,161, filed Jan. 10, 2022.

BRIEF DESCRIPTION OF DRAWINGS

FIG. 2E is a blade hardware block diagram, showing a control plane, compute and storage planes, and authorities interacting with underlying physical resources, in accordance with some embodiments.

DESCRIPTION OF EMBODIMENTS

Figure 1A:
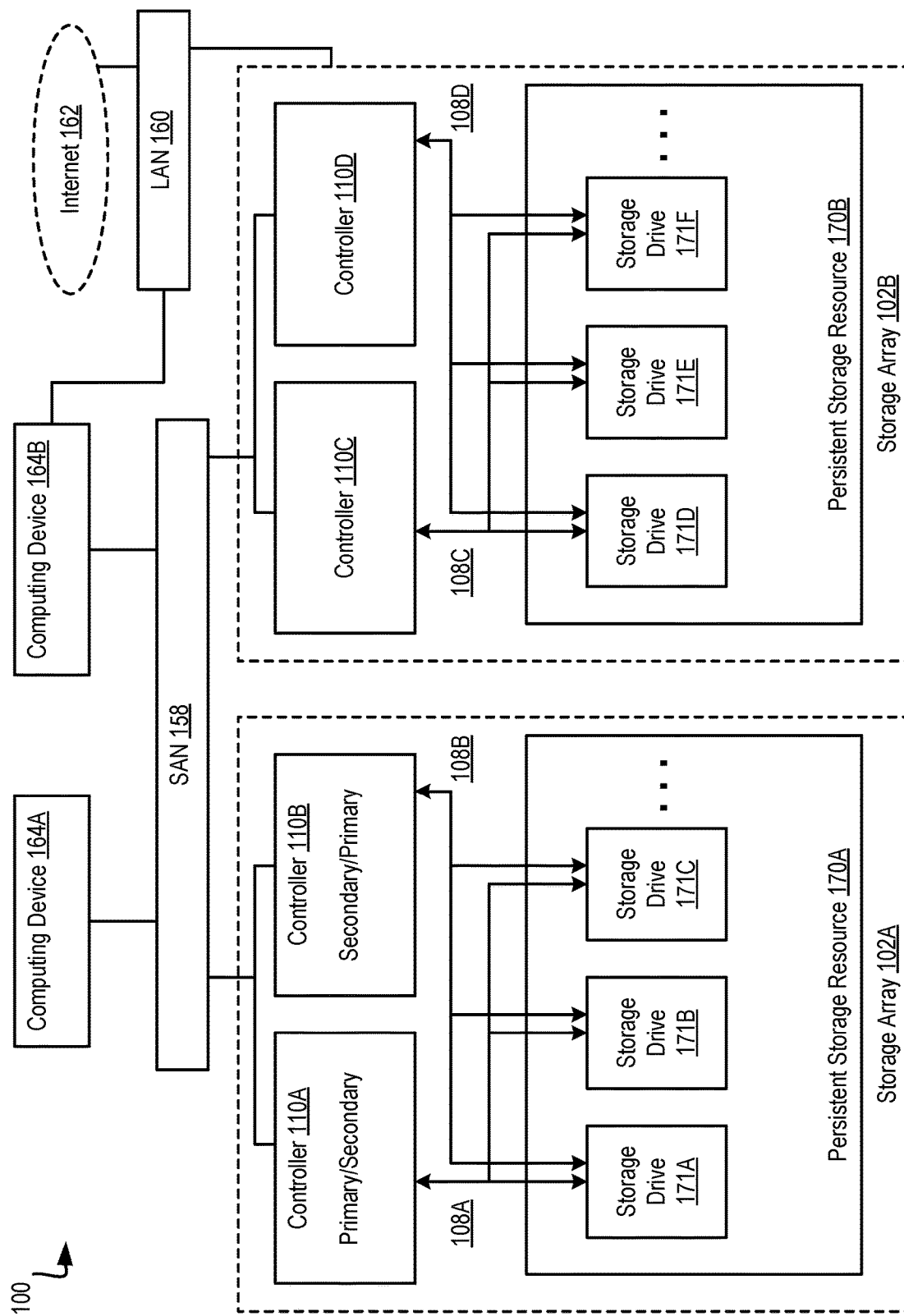
FIG. 1A illustrates a first example system for data storage in accordance with some implementations.

Example methods, apparatus, and products for coordinated checkpoints among storage systems implementing checkpoint-based replication in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like. The LAN 160 may also connect to the Internet 162.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110B) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
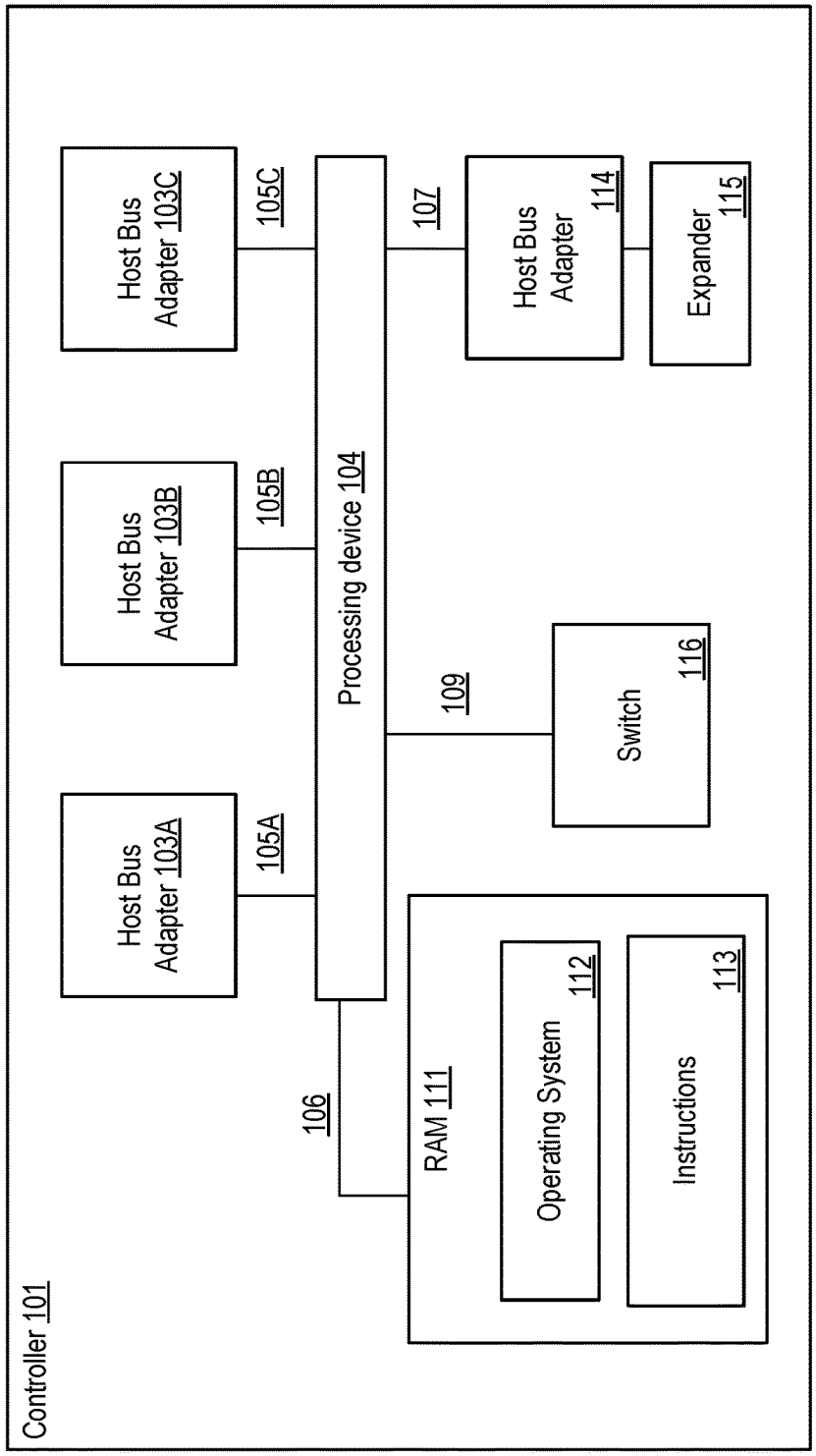
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in a direct-mapped flash storage system. In one embodiment, a direct-mapped flash storage system is one that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 171A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD. In some implementations, the zones of the zoned storage device may be defined during initialization of the zoned storage device. In implementations, the zones may be defined dynamically as data is written to the zoned storage device.

In some implementations, zones may be heterogeneous, with some zones each being a page group and other zones being multiple page groups. In implementations, some zones may correspond to an erase block and other zones may correspond to multiple erase blocks. In an implementation, zones may be any combination of differing numbers of pages in page groups and/or erase blocks, for heterogeneous mixes of programming modes, manufacturers, product types and/or product generations of storage devices, as applied to heterogeneous assemblies, upgrades, distributed storages, etc. In some implementations, zones may be defined as having usage characteristics, such as a property of supporting data with particular kinds of longevity (very short lived or very long lived, for example). These properties could be used by a zoned storage device to determine how the zone will be managed over the zone's expected lifetime.

It should be appreciated that a zone is a virtual construct. Any particular zone may not have a fixed location at a storage device. Until allocated, a zone may not have any location at a storage device. A zone may correspond to a number representing a chunk of virtually allocatable space that is the size of an erase block or other block size in various implementations. When the system allocates or opens a zone, zones get allocated to flash or other solid-state storage memory and, as the system writes to the zone, pages are written to that mapped flash or other solid-state storage memory of the zoned storage device. When the system closes the zone, the associated erase block(s) or other sized block(s) are completed. At some point in the future, the system may delete a zone which will free up the zone's allocated space. During its lifetime, a zone may be moved around to different locations of the zoned storage device, e.g., as the zoned storage device does internal maintenance.

In implementations, the zones of the zoned storage device may be in different states. A zone may be in an empty state in which data has not been stored at the zone. An empty zone may be opened explicitly, or implicitly by writing data to the zone. This is the initial state for zones on a fresh zoned storage device, but may also be the result of a zone reset. In some implementations, an empty zone may have a designated location within the flash memory of the zoned storage device. In an implementation, the location of the empty zone may be chosen when the zone is first opened or first written to (or later if writes are buffered into memory). A zone may be in an open state either implicitly or explicitly, where a zone that is in an open state may be written to store data with write or append commands. In an implementation, a zone that is in an open state may also be written to using a copy command that copies data from a different zone. In some implementations, a zoned storage device may have a limit on the number of open zones at a particular time.

A zone in a closed state is a zone that has been partially written to, but has entered a closed state after issuing an explicit close operation. A zone in a closed state may be left available for future writes, but may reduce some of the run-time overhead consumed by keeping the zone in an open state. In implementations, a zoned storage device may have a limit on the number of closed zones at a particular time. A zone in a full state is a zone that is storing data and can no longer be written to. A zone may be in a full state either after writes have written data to the entirety of the zone or as a result of a zone finish operation. Prior to a finish operation, a zone may or may not have been completely written. After a finish operation, however, the zone may not be opened a written to further without first performing a zone reset operation.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
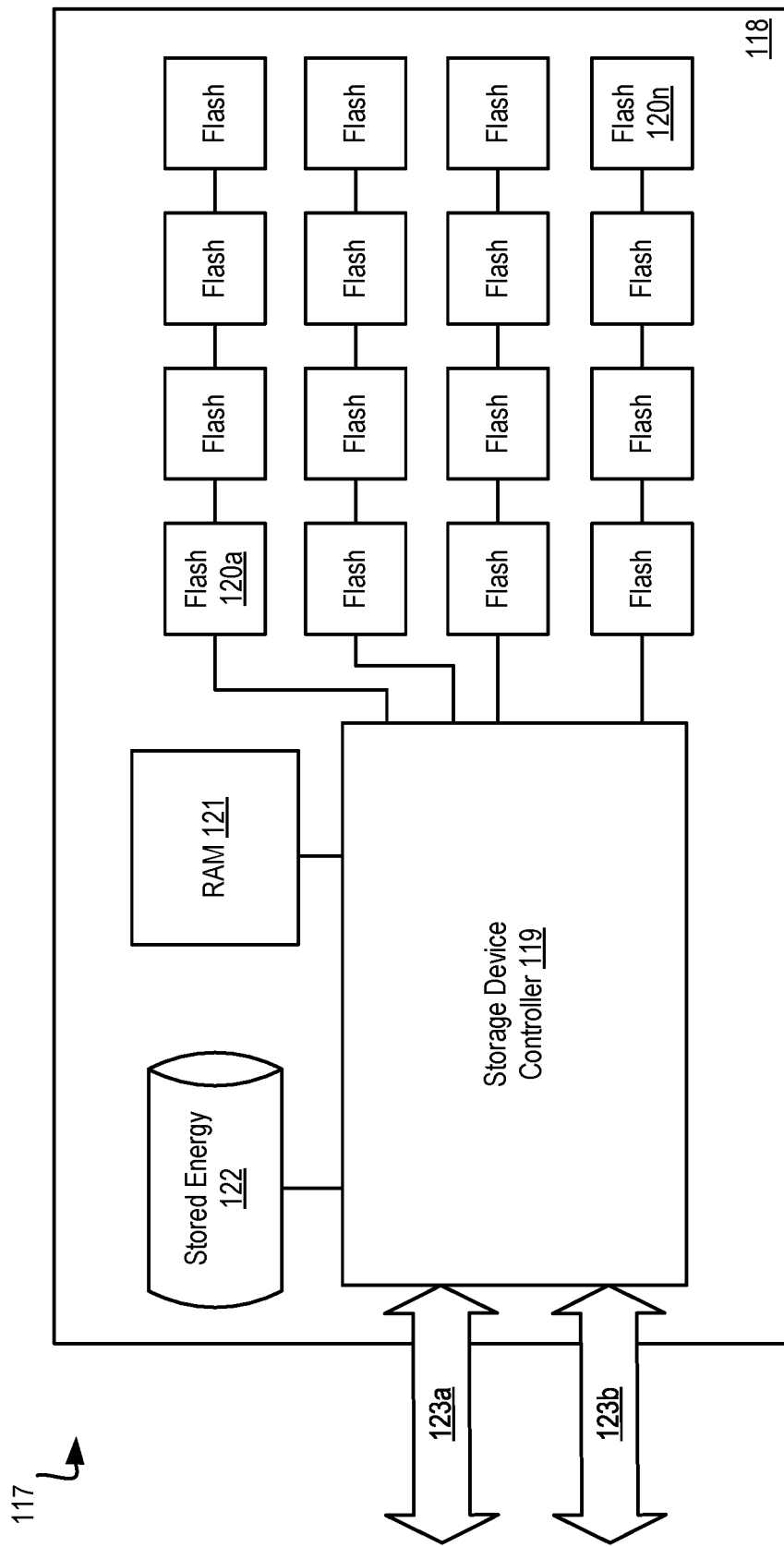
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119. In one embodiment, storage device controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n. The stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the stored energy device 122 to measure corresponding discharge characteristics, etc. If the available energy decreases over time, the effective available capacity of the addressable fast-write storage may be decreased to ensure that it can be written safely based on the currently available stored energy.

Figure 1D:
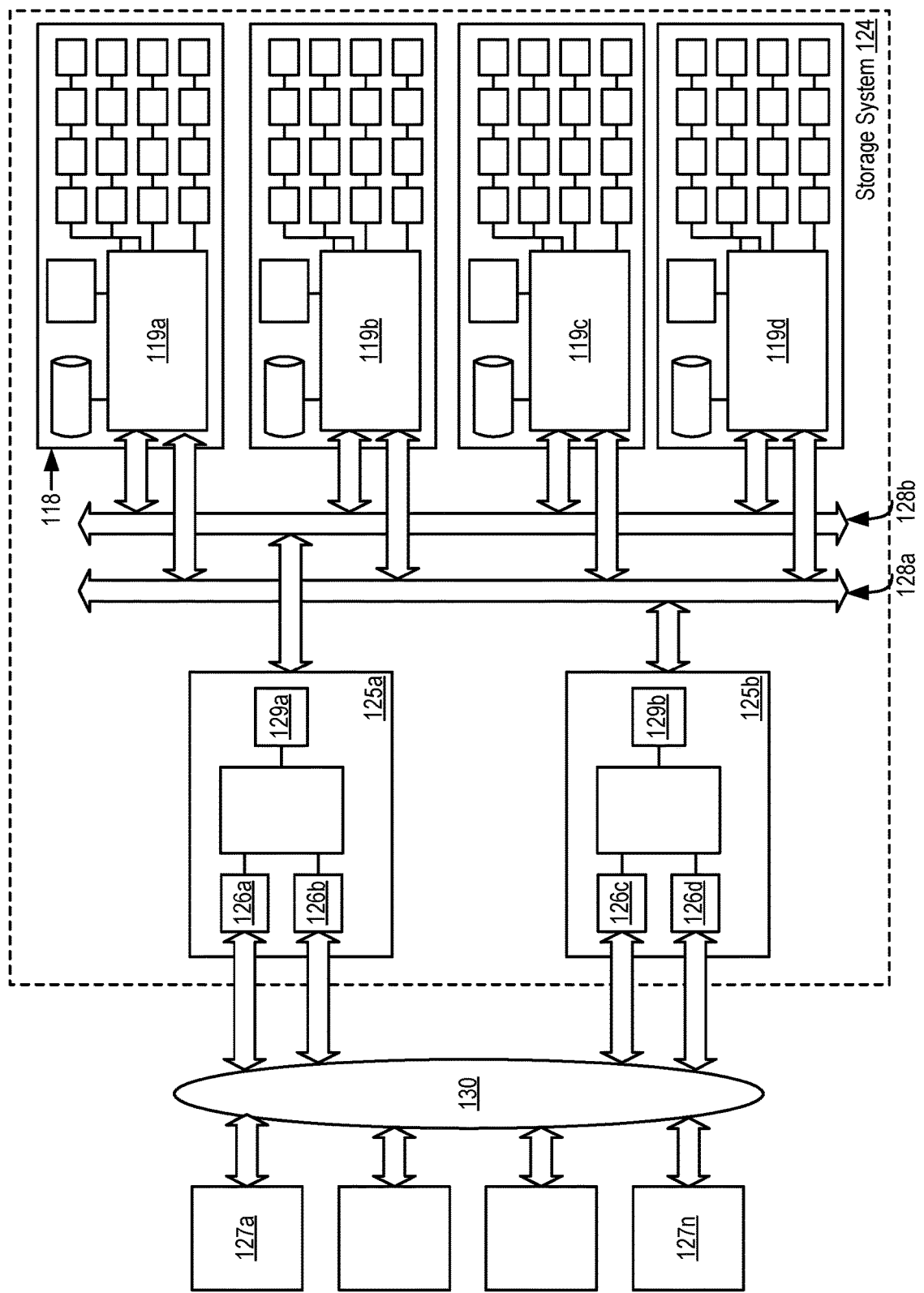
FIG. 1D illustrates a fourth example system for data storage in accordance with some implementations.

FIG. 1D illustrates a third example storage system 124 for data storage in accordance with some implementations. In one embodiment, storage system 124 includes storage controllers 125a, 125b. In one embodiment, storage controllers 125a, 125b are operatively coupled to Dual PCI storage devices. Storage controllers 125a, 125b may be operatively coupled (e.g., via a storage network 130) to some number of host computers 127a-n.

In one embodiment, two storage controllers (e.g., 125a and 125b) provide storage services, such as a SCS block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, storage controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one storage controller 125a to another storage controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one or more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory.

Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
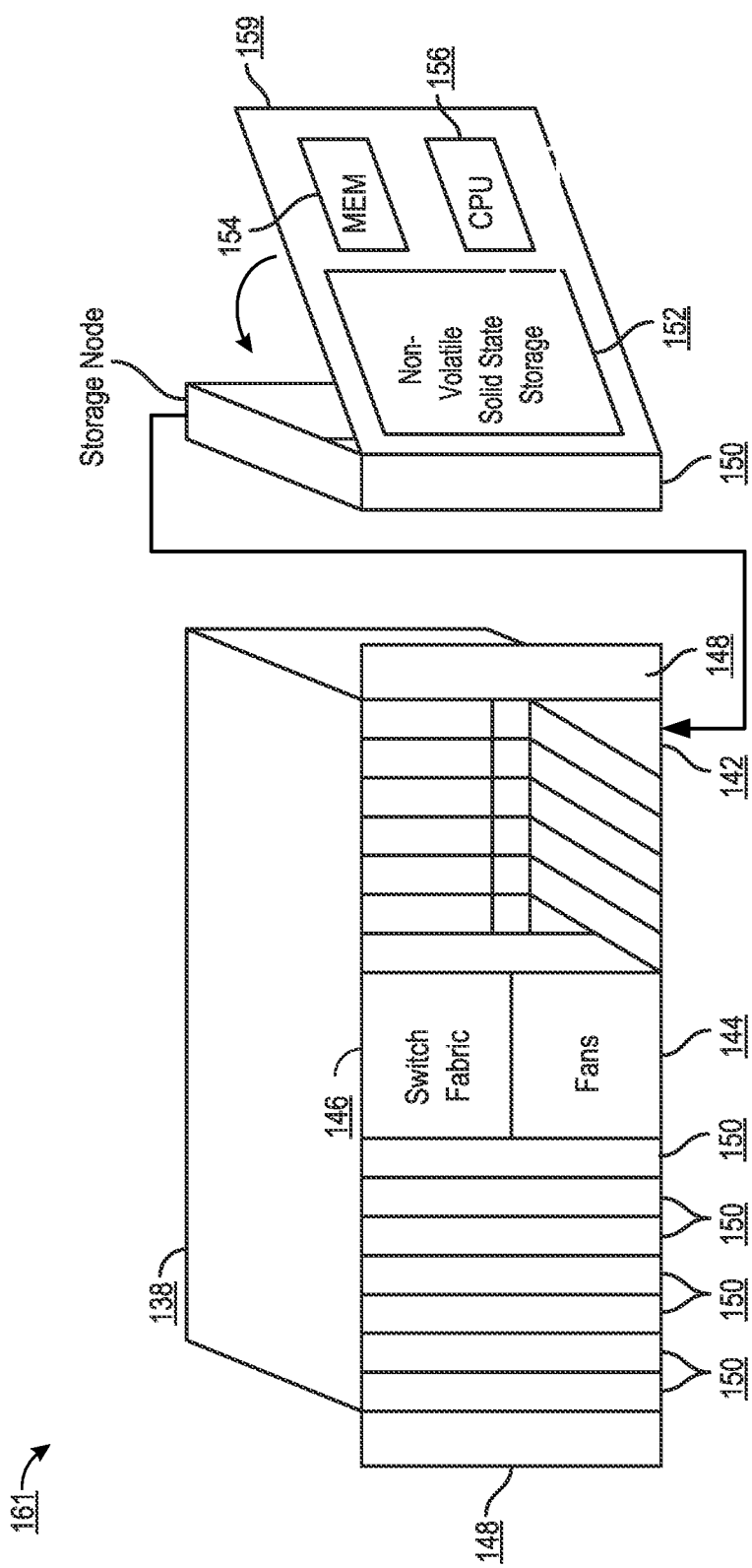
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage 152 units or storage nodes 150 within the chassis.

Figure 2B:
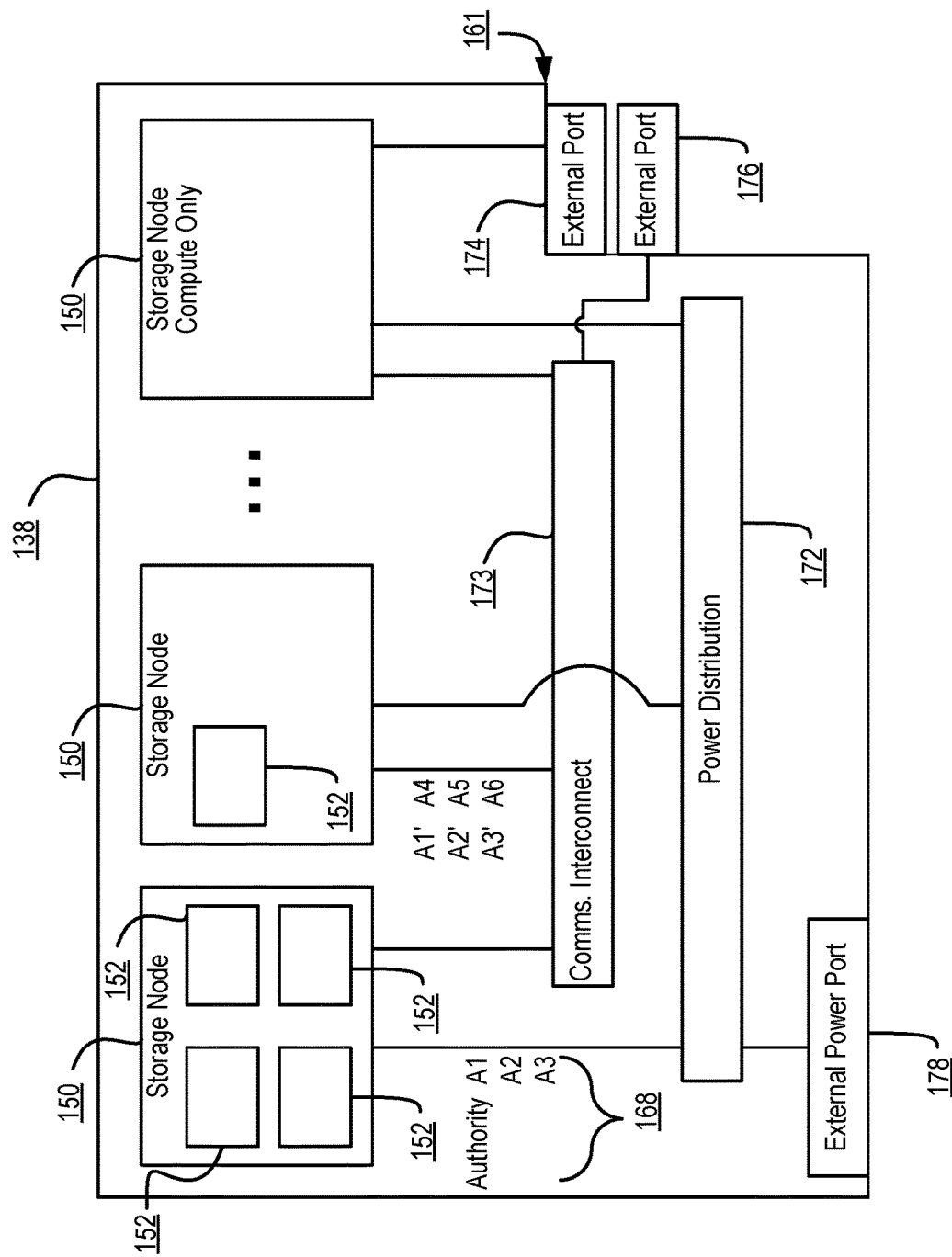
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storage 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storage 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storage 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In embodiments, authorities 168 operate to determine how operations will proceed against particular logical elements. Each of the logical elements may be operated on through a particular authority across a plurality of storage controllers of a storage system. The authorities 168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 unit may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
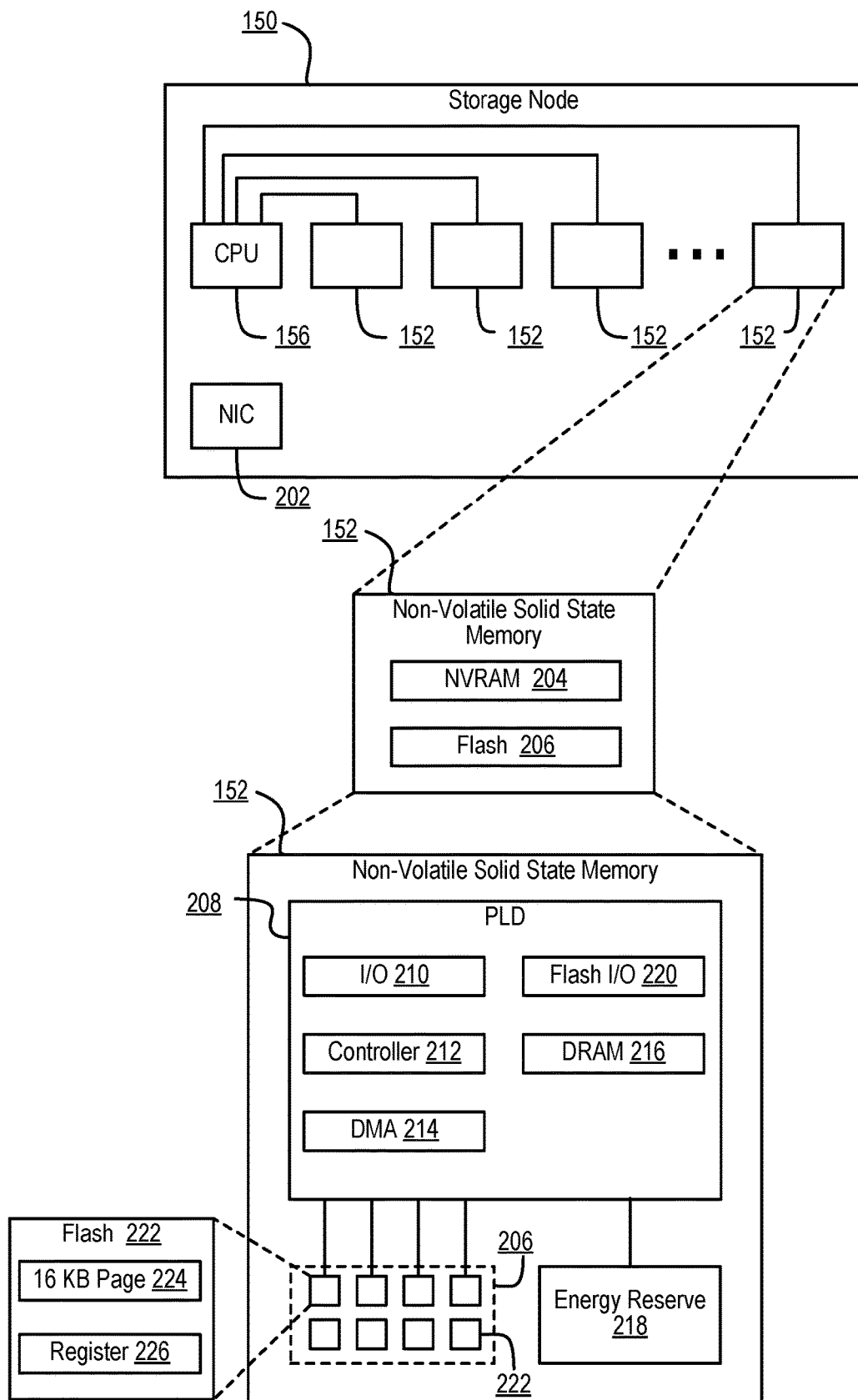
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The non-volatile solid state storage 152 units described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple non-volatile solid state storage 152 units and/or storage nodes 150 cooperate in various ways (e.g., for erasure coding, data sharding, metadata communication and redundancy, storage capacity expansion or contraction, data recovery, and so on).

Figure 2D:
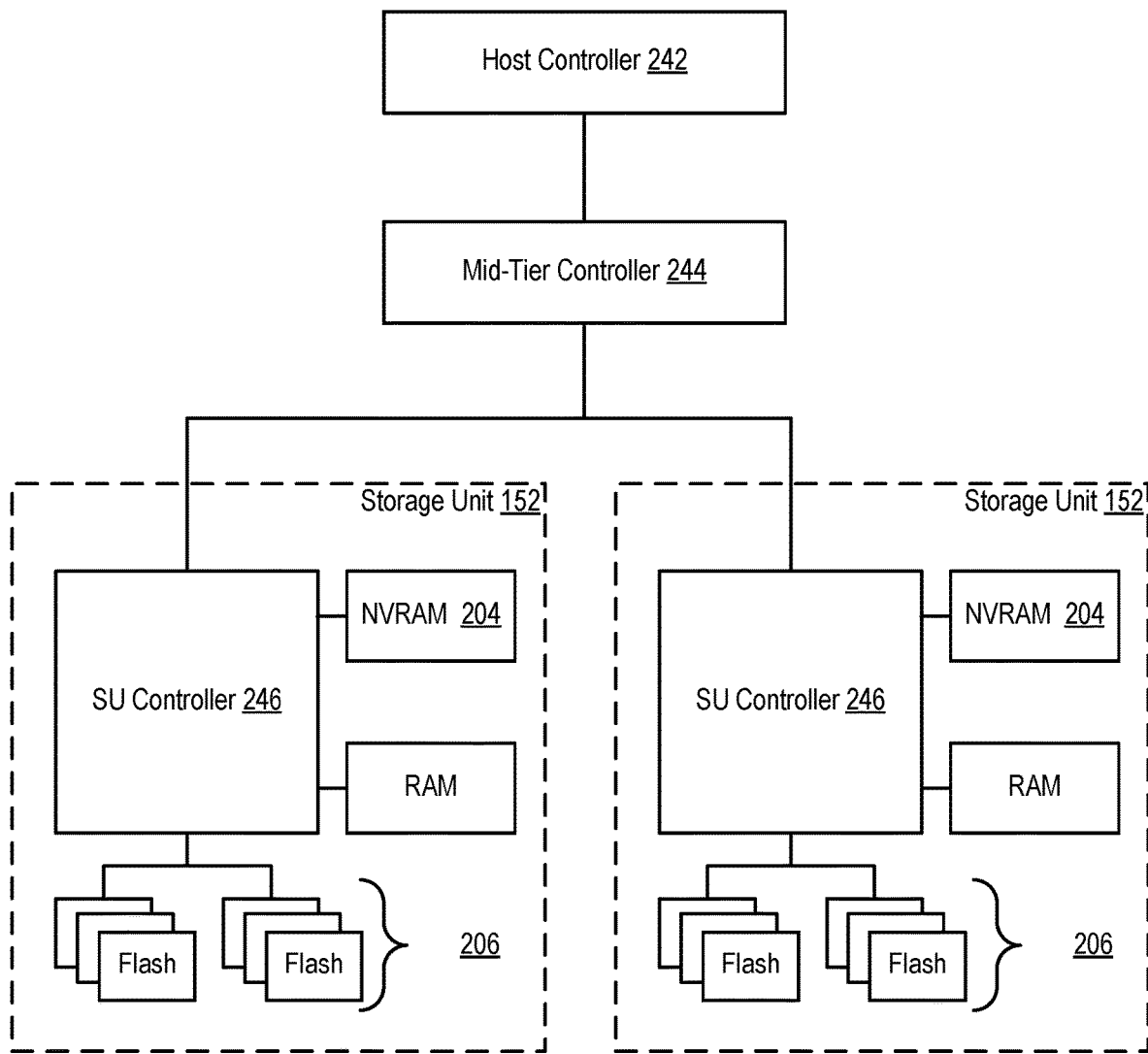
FIG. 2D shows a storage server environment, which uses embodiments of the storage nodes and storage units of some previous figures in accordance with some embodiments.

FIG. 2D shows a storage server environment, which uses embodiments of the storage nodes 150 and storage 152 units of FIGS. 2A-C. In this version, each non-volatile solid state storage 152 unit has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The non-volatile solid state storage 152 unit may be implemented as a single board containing storage, and may be the largest tolerable failure domain inside the chassis. In some embodiments, up to two non-volatile solid state storage 152 units may fail and the device will continue with no data loss.

The physical storage is divided into named regions based on application usage in some embodiments. The NVRAM 204 is a contiguous block of reserved memory in the non-volatile solid state storage 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a non-volatile solid state storage 152 unit fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
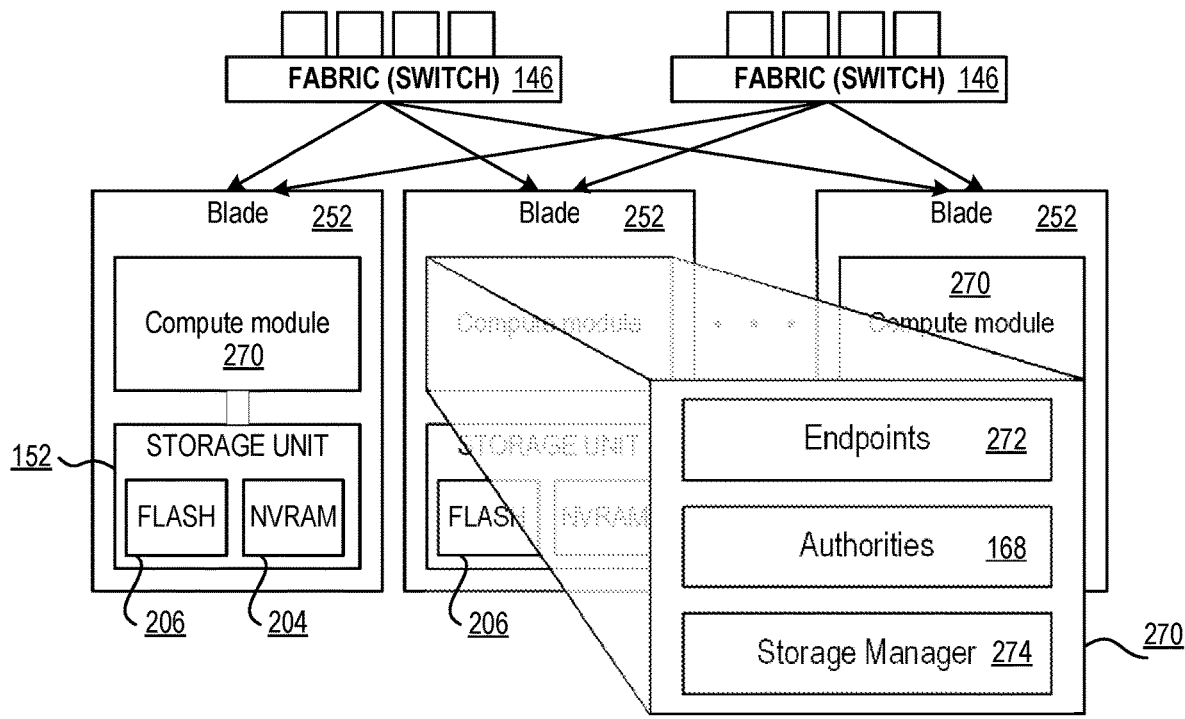
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some embodiments. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
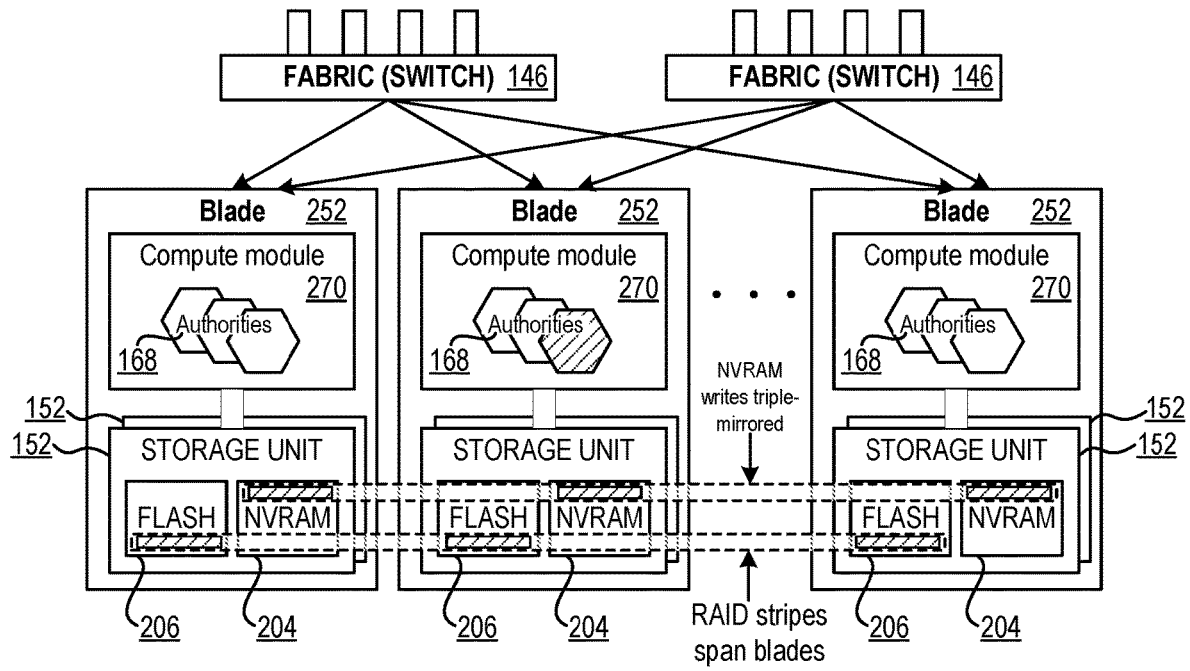
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
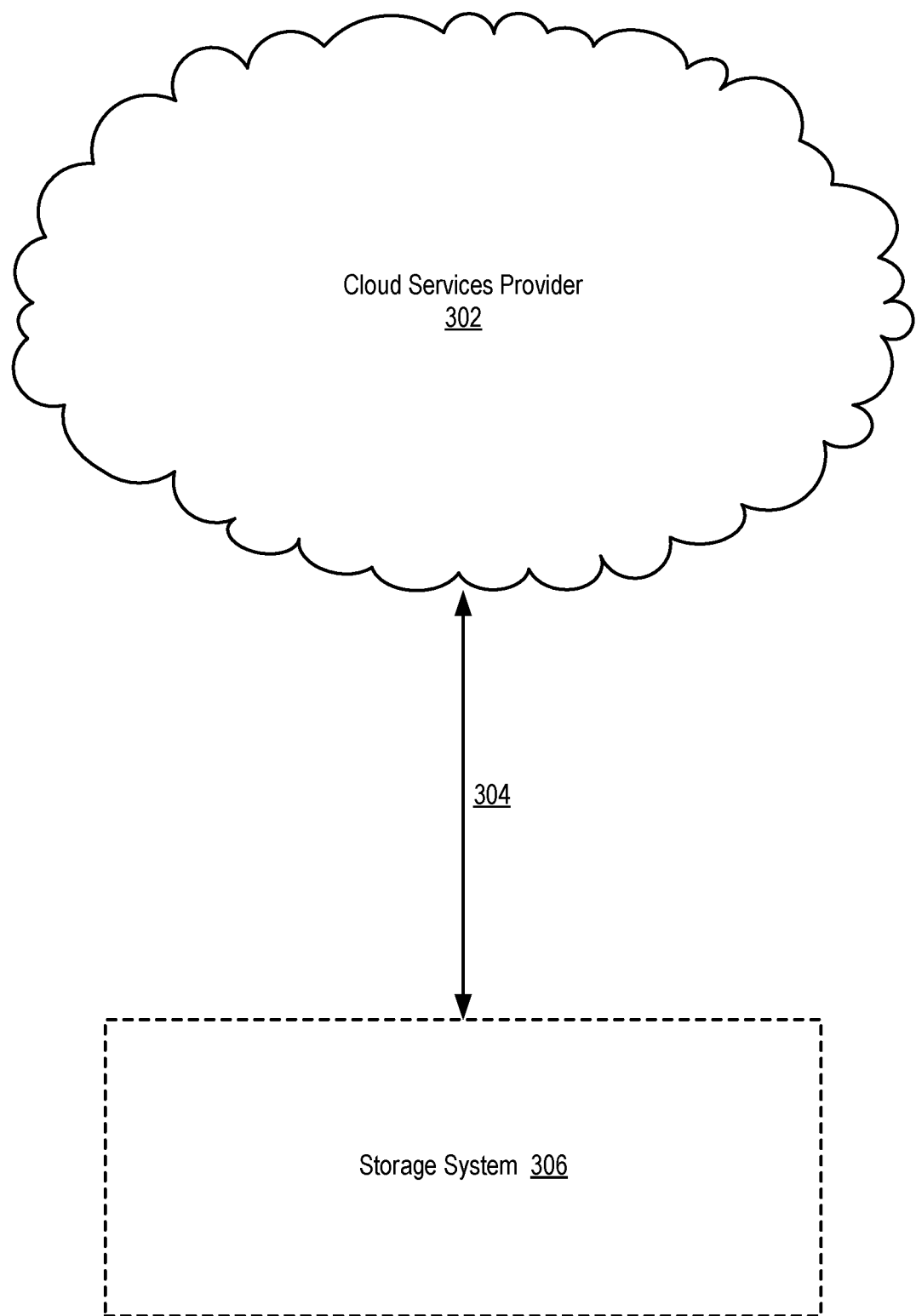
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premises with the storage system 306. Such a cloud storage gateway may operate as a bridge between local applications that are executing on the storage system 306 and remote, cloud-based storage that is utilized by the storage system 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 3A illustrates the storage system 306 being coupled for data communications with the cloud services provider 302, in other embodiments the storage system 306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 3B:
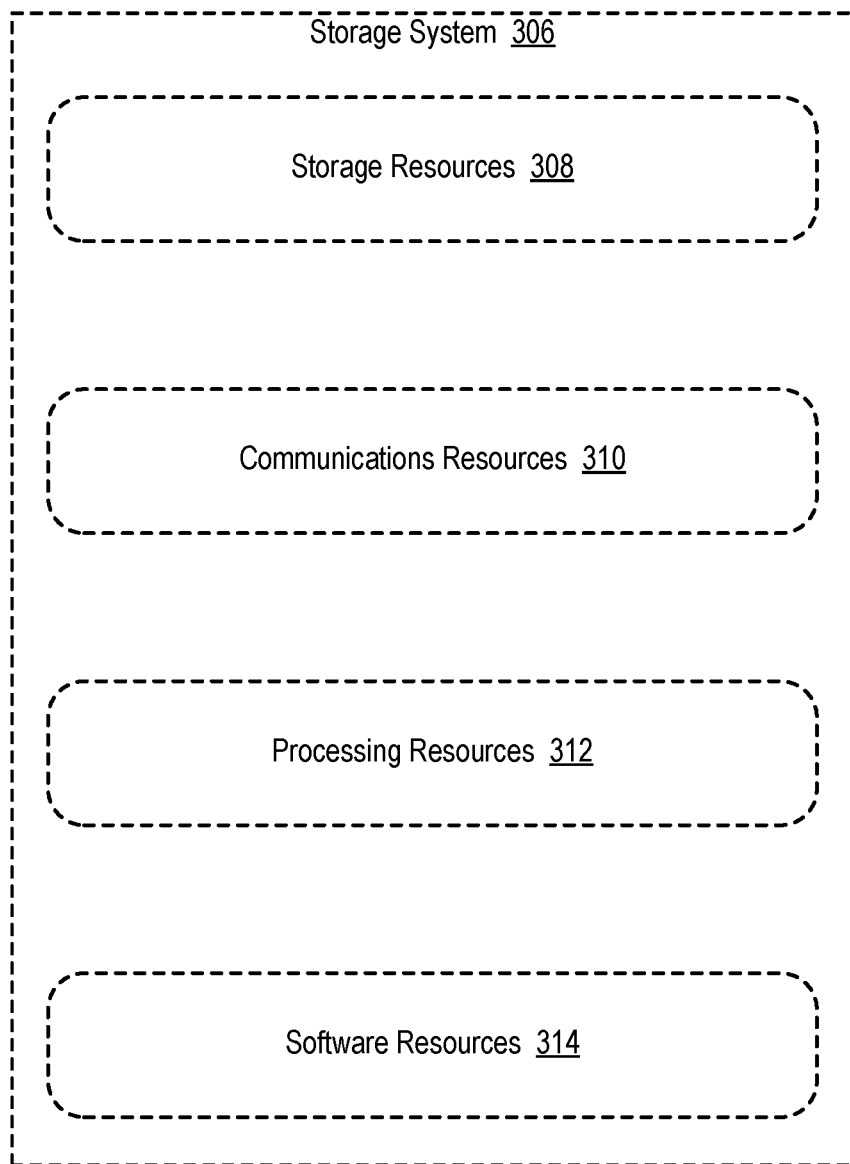
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 308 depicted in FIG. 3B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 306 depicted in FIG. 3B may leverage the storage resources described above in a variety of different ways. For example, some portion of the storage resources may be utilized to serve as a write cache, storage resources within the storage system may be utilized as a read cache, or tiering may be achieved within the storage systems by placing data within the storage system in accordance with one or more tiering policies.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that may be useful in facilitating data communications between components within the storage system 306, as well as data communications between the storage system 306 and computing devices that are outside of the storage system 306.

The storage system 306 depicted in FIG. 3B also includes processing resources 312 that may be useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques. Such data protection techniques may be carried out, for example, by system software executing on computer hardware within the storage system, by a cloud services provider, or in other ways. Such data protection techniques can include data archiving, data backup, data replication, data snapshotting, data and database cloning, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage system 306. For example, the software resources 314 may include software modules that perform various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
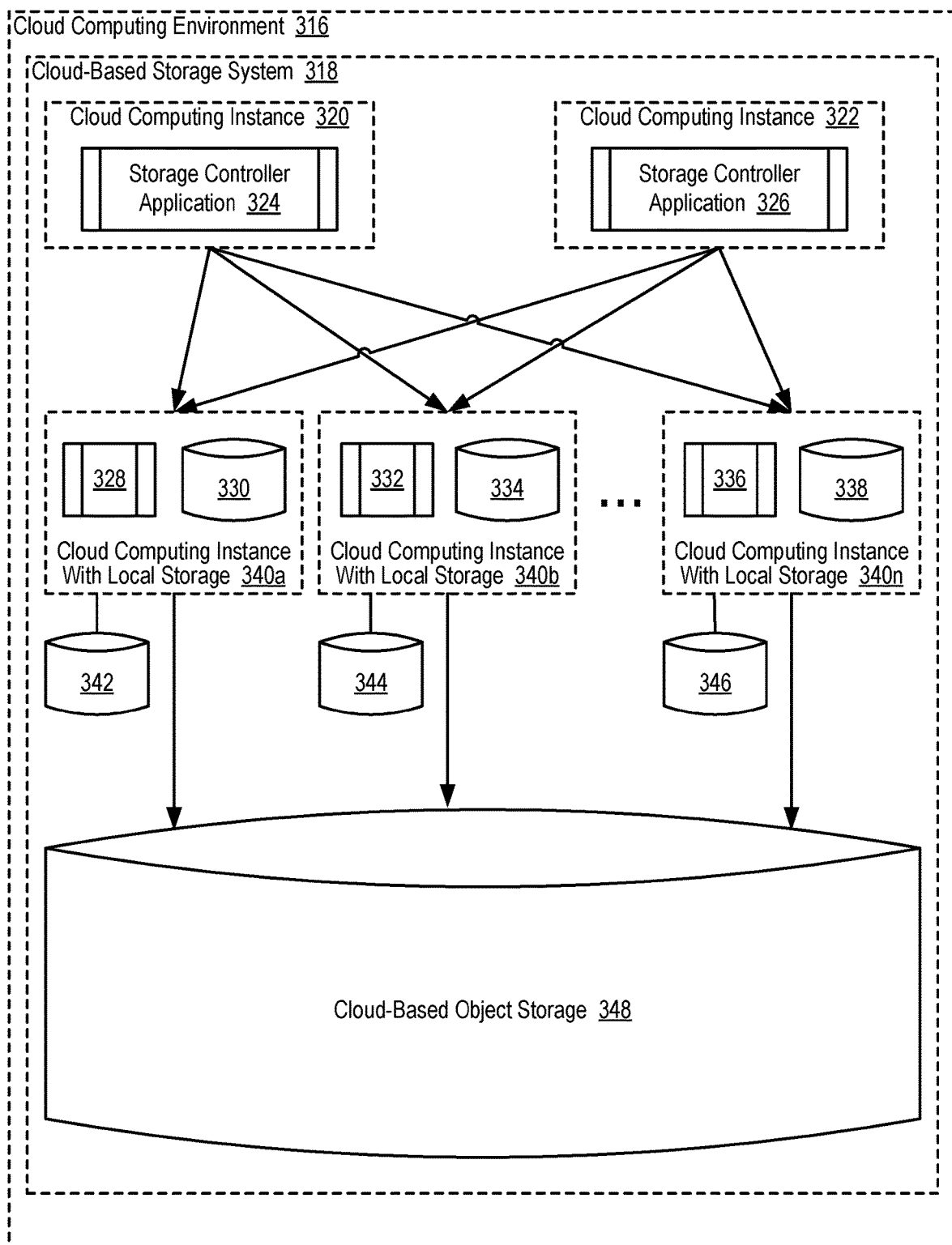
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS')™, Microsoft Azure™ Google Cloud Platform™, IBM Cloud™, Oracle Cloud™, and others. The cloud-based storage system 318 may be used to provide services similar to the services that may be provided by the storage systems described above.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. For example, each of the cloud computing instances 320, 322 may execute on an Azure VM, where each Azure VM may include high speed temporary storage that may be leveraged as a cache (e.g., as a read cache). In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data to the cloud-based storage system 318, erasing data from the cloud-based storage system 318, retrieving data from the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322 such as distinct EC2 instances.

Readers will appreciate that other embodiments that do not include a primary and secondary controller are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 13 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block storage 342, 344, 346 that is offered by the cloud computing environment 316 such as, for example, as Amazon Elastic Block Store ('EBS') volumes. In such an example, the block storage 342, 344, 346 that is offered by the cloud computing environment 316 may be utilized in a manner that is similar to how the NVRAM devices described above are utilized, as the software daemon 328, 332, 336 (or some other module) that is executing within a particular cloud computing instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud computing instance 340a, 340b, 340n. In an alternative embodiment, rather than using the block storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

The storage controller applications 324, 326 may be used to perform various tasks such as deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

When a request to write data is received by a particular cloud computing instance 340a, 340b, 340n with local storage 330, 334, 338, the software daemon 328, 332, 336 may be configured to not only write the data to its own local storage 330, 334, 338 resources and any appropriate block storage 342, 344, 346 resources, but the software daemon 328, 332, 336 may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3'). In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348. In other embodiments, rather than using both the cloud computing instances 340a, 340b, 340n with local storage 330, 334, 338 (also referred to herein as 'virtual drives') and the cloud-based object storage 348 to store data, a persistent storage layer may be implemented in other ways. For example, one or more Azure Ultra disks may be used to persistently store data (e.g., after the data has been written to the NVRAM layer).

While the local storage 330, 334, 338 resources and the block storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. The software daemon 328, 332, 336 may therefore be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block storage 342, 344, 346 resources that are utilized by the cloud computing instances 340a, 340b, 340n is relatively straightforward as 5 blocks that are 1 MB in size are written to the local storage 330, 334, 338 resources and the block storage 342, 344, 346 resources that are utilized by the cloud computing instances 340a, 340b, 340n. In such an example, the software daemon 328, 332, 336 may also be configured to create five objects containing distinct 1 MB chunks of the data. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data). Readers will appreciate that the cloud-based object storage 348 may be incorporated into the cloud-based storage system 318 to increase the durability of the cloud-based storage system 318.

In some embodiments, all data that is stored by the cloud-based storage system 318 may be stored in both: 1) the cloud-based object storage 348, and 2) at least one of the local storage 330, 334, 338 resources or block storage 342, 344, 346 resources that are utilized by the cloud computing instances 340a, 340b, 340n. In such embodiments, the local storage 330, 334, 338 resources and block storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block storage 342, 344, 346 resources that are utilized by the cloud computing instances 340a, 340b, 340n.

One or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. For example, if the cloud computing instances 320, 322 that are used to support the execution of a storage controller application 324, 326 are undersized and not sufficiently servicing the I/O requests that are issued by users of the cloud-based storage system 318, a monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described in this disclosure may be useful for supporting various types of software applications. In fact, the storage systems may be 'application aware' in the sense that the storage systems may obtain, maintain, or otherwise have access to information describing connected applications (e.g., applications that utilize the storage systems) to optimize the operation of the storage system based on intelligence about the applications and their utilization patterns. For example, the storage system may optimize data layouts, optimize caching behaviors, optimize 'QoS' levels, or perform some other optimization that is designed to improve the storage performance that is experienced by the application.

As an example of one type of application that may be supported by the storage systems described herein, the storage system 306 may be useful in supporting artificial intelligence ('AI') applications, database applications, XOps projects (e.g., DevOps projects, DataOps projects, MLOps projects, ModelOps projects, PlatformOps projects), electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson™, Microsoft Oxford™, Google DeepMind™, Baidu Minwa™, and others.

The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia™ GPUs and the storage systems may support GPUDirect Storage ('GDS') software, or have similar proprietary software, that enables the storage system to transfer data to the GPUs via RDMA or similar mechanism.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains and derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics, including being leveraged as part of a composable data analytics pipeline where containerized analytics architectures, for example, make analytics capabilities more composable. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa™, Apple Siri™, Google Voice™, Samsung Bixby™, Microsoft Cortana™, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming through the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

The storage systems described herein may be used to form a data lake. A data lake may operate as the first place that an organization's data flows to, where such data may be in a raw format. Metadata tagging may be implemented to facilitate searches of data elements in the data lake, especially in embodiments where the data lake contains multiple stores of data, in formats not easily accessible or readable (e.g., unstructured data, semi-structured data, structured data). From the data lake, data may go downstream to a data warehouse where data may be stored in a more processed, packaged, and consumable format. The storage systems described above may also be used to implement such a data warehouse. In addition, a data mart or data hub may allow for data that is even more easily consumed, where the storage systems described above may also be used to provide the underlying storage resources necessary for a data mart or data hub. In embodiments, queries the data lake may require a schema-on-read approach, where data is applied to a plan or schema as it is pulled out of a stored location, rather than as it goes into the stored location.

The storage systems described herein may also be configured to implement a recovery point objective ('RPO'), which may be establish by a user, established by an administrator, established as a system default, established as part of a storage class or service that the storage system is participating in the delivery of, or in some other way. A "recovery point objective" is a goal for the maximum time difference between the last update to a source dataset and the last recoverable replicated dataset update that would be correctly recoverable, given a reason to do so, from a continuously or frequently updated copy of the source dataset. An update is correctly recoverable if it properly takes into account all updates that were processed on the source dataset prior to the last recoverable replicated dataset update.

In synchronous replication, the RPO would be zero, meaning that under normal operation, all completed updates on the source dataset should be present and correctly recoverable on the copy dataset. In best effort nearly synchronous replication, the RPO can be as low as a few seconds. In snapshot-based replication, the RPO can be roughly calculated as the interval between snapshots plus the time to transfer the modifications between a previous already transferred snapshot and the most recent to-be-replicated snapshot.

If updates accumulate faster than they are replicated, then an RPO can be missed. If more data to be replicated accumulates between two snapshots, for snapshot-based replication, than can be replicated between taking the snapshot and replicating that snapshot's cumulative updates to the copy, then the RPO can be missed. If, again in snapshot-based replication, data to be replicated accumulates at a faster rate than could be transferred in the time between subsequent snapshots, then replication can start to fall further behind which can extend the miss between the expected recovery point objective and the actual recovery point that is represented by the last correctly replicated update.

The storage systems described above may also be part of a shared nothing storage cluster. In a shared nothing storage cluster, each node of the cluster has local storage and communicates with other nodes in the cluster through networks, where the storage used by the cluster is (in general) provided only by the storage connected to each individual node. A collection of nodes that are synchronously replicating a dataset may be one example of a shared nothing storage cluster, as each storage system has local storage and communicates to other storage systems through a network, where those storage systems do not (in general) use storage from somewhere else that they share access to through some kind of interconnect. In contrast, some of the storage systems described above are themselves built as a shared-storage cluster, since there are drive shelves that are shared by the paired controllers. Other storage systems described above, however, are built as a shared nothing storage cluster, as all storage is local to a particular node (e.g., a blade) and all communication is through networks that link the compute nodes together.

In other embodiments, other forms of a shared nothing storage cluster can include embodiments where any node in the cluster has a local copy of all storage they need, and where data is mirrored through a synchronous style of replication to other nodes in the cluster either to ensure that the data isn't lost or because other nodes are also using that storage. In such an embodiment, if a new cluster node needs some data, that data can be copied to the new node from other nodes that have copies of the data.

In some embodiments, mirror-copy-based shared storage clusters may store multiple copies of all the cluster's stored data, with each subset of data replicated to a particular set of nodes, and different subsets of data replicated to different sets of nodes. In some variations, embodiments may store all of the cluster's stored data in all nodes, whereas in other variations nodes may be divided up such that a first set of nodes will all store the same set of data and a second, different set of nodes will all store a different set of data.

Readers will appreciate that RAFT-based databases (e.g., etcd) may operate like shared-nothing storage clusters where all RAFT nodes store all data. The amount of data stored in a RAFT cluster, however, may be limited so that extra copies don't consume too much storage. A container server cluster might also be able to replicate all data to all cluster nodes, presuming the containers don't tend to be too large and their bulk data (the data manipulated by the applications that run in the containers) is stored elsewhere such as in an S3 cluster or an external file server. In such an example, the container storage may be provided by the cluster directly through its shared-nothing storage model, with those containers providing the images that form the execution environment for parts of an application or service.

Figure 3D:
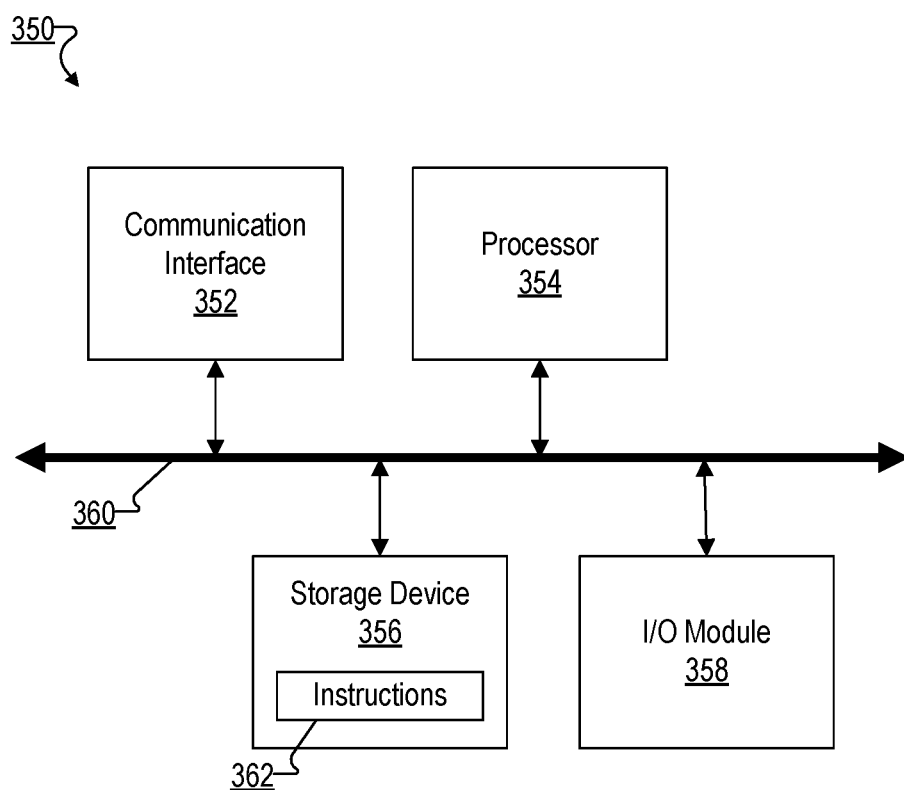
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 3E:
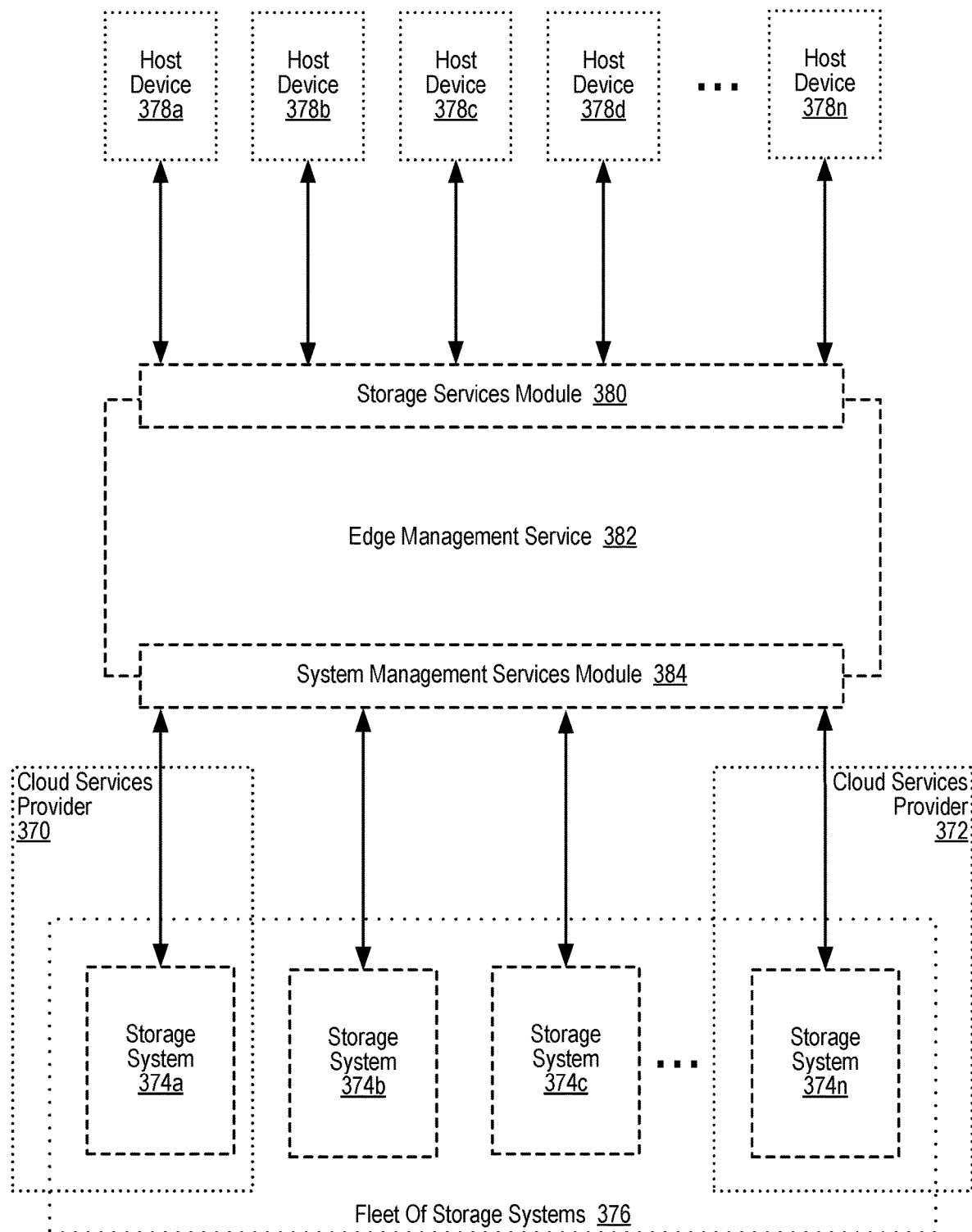
FIG. 3E illustrates an exemplary fleet of storage systems that provide storage services in accordance with some embodiments of the present disclosure.

For further explanation, FIG. 3E illustrates an example of a fleet of storage systems 376 for providing storage services (also referred to herein as 'data services'). The fleet of storage systems 376 depicted in FIG. 3E includes a plurality of storage systems 374a, 374b, 374c, 374d, 374n that may each be similar to the storage systems described herein. The storage systems 374a, 374b, 374c, 374d, 374n in the fleet of storage systems 376 may be embodied as identical storage systems or as different types of storage systems. For example, two of the storage systems 374a, 374n depicted in FIG. 3E are depicted as being cloud-based storage systems, as the resources that collectively form each of the storage systems 374a, 374n are provided by distinct cloud services providers 370, 372. For example, the first cloud services provider 370 may be Amazon AWS™ whereas the second cloud services provider 372 is Microsoft Azure™, although in other embodiments one or more public clouds, private clouds, or combinations thereof may be used to provide the underlying resources that are used to form a particular storage system in the fleet of storage systems 376.

The example depicted in FIG. 3E includes an edge management service 382 for delivering storage services in accordance with some embodiments of the present disclosure. The storage services (also referred to herein as 'data services') that are delivered may include, for example, services to provide a certain amount of storage to a consumer, services to provide storage to a consumer in accordance with a predetermined service level agreement, services to provide storage to a consumer in accordance with predetermined regulatory requirements, and many others.

The edge management service 382 depicted in FIG. 3E may be embodied, for example, as one or more modules of computer program instructions executing on computer hardware such as one or more computer processors. Alternatively, the edge management service 382 may be embodied as one or more modules of computer program instructions executing on a virtualized execution environment such as one or more virtual machines, in one or more containers, or in some other way. In other embodiments, the edge management service 382 may be embodied as a combination of the embodiments described above, including embodiments where the one or more modules of computer program instructions that are included in the edge management service 382 are distributed across multiple physical or virtual execution environments.

The edge management service 382 may operate as a gateway for providing storage services to storage consumers, where the storage services leverage storage offered by one or more storage systems 374a, 374b, 374c, 374d, 374n. For example, the edge management service 382 may be configured to provide storage services to host devices 378a, 378b, 378c, 378d, 378n that are executing one or more applications that consume the storage services. In such an example, the edge management service 382 may operate as a gateway between the host devices 378a, 378b, 378c, 378d, 378n and the storage systems 374a, 374b, 374c, 374d, 374n, rather than requiring that the host devices 378a, 378b, 378c, 378d, 378n directly access the storage systems 374a, 374b, 374c, 374d, 374n.

The edge management service 382 of FIG. 3E exposes a storage services module 380 to the host devices 378a, 378b, 378c, 378d, 378n of FIG. 3E, although in other embodiments the edge management service 382 may expose the storage services module 380 to other consumers of the various storage services. The various storage services may be presented to consumers via one or more user interfaces, via one or more APIs, or through some other mechanism provided by the storage services module 380. As such, the storage services module 380 depicted in FIG. 3E may be embodied as one or more modules of computer program instructions executing on physical hardware, on a virtualized execution environment, or combinations thereof, where executing such modules causes enables a consumer of storage services to be offered, select, and access the various storage services.

The edge management service 382 of FIG. 3E also includes a system management services module 384. The system management services module 384 of FIG. 3E includes one or more modules of computer program instructions that, when executed, perform various operations in coordination with the storage systems 374a, 374b, 374c, 374d, 374n to provide storage services to the host devices 378a, 378b, 378c, 378d, 378n. The system management services module 384 may be configured, for example, to perform tasks such as provisioning storage resources from the storage systems 374a, 374b, 374c, 374d, 374n via one or more APIs exposed by the storage systems 374a, 374b, 374c, 374d, 374n, migrating datasets or workloads amongst the storage systems 374a, 374b, 374c, 374d, 374n via one or more APIs exposed by the storage systems 374a, 374b, 374c, 374d, 374n, setting one or more tunable parameters (i.e., one or more configurable settings) on the storage systems 374a, 374b, 374c, 374d, 374n via one or more APIs exposed by the storage systems 374a, 374b, 374c, 374d, 374n, and so on. For example, many of the services described below relate to embodiments where the storage systems 374a, 374b, 374c, 374d, 374n are configured to operate in some way. In such examples, the system management services module 384 may be responsible for using APIs (or some other mechanism) provided by the storage systems 374a, 374b, 374c, 374d, 374n to configure the storage systems 374a, 374b, 374c, 374d, 374n to operate in the ways described below.

In addition to configuring the storage systems 374a, 374b, 374c, 374d, 374n, the edge management service 382 itself may be configured to perform various tasks required to provide the various storage services. Consider an example in which the storage service includes a service that, when selected and applied, causes personally identifiable information ('PII') contained in a dataset to be obfuscated when the dataset is accessed. In such an example, the storage systems 374a, 374b, 374c, 374d, 374n may be configured to obfuscate PII when servicing read requests directed to the dataset. Alternatively, the storage systems 374a, 374b, 374c, 374d, 374n may service reads by returning data that includes the PII, but the edge management service 382 itself may obfuscate the PH as the data is passed through the edge management service 382 on its way from the storage systems 374a, 374b, 374c, 374d, 374n to the host devices 378a, 378b, 378c, 378d, 378n.

The storage systems 374a, 374b, 374c, 374d, 374n depicted in FIG. 3E may be embodied as one or more of the storage systems described above with reference to FIGS. 1A-3D, including variations thereof. In fact, the storage systems 374a, 374b, 374c, 374d, 374n may serve as a pool of storage resources where the individual components in that pool have different performance characteristics, different storage characteristics, and so on. For example, one of the storage systems 374a may be a cloud-based storage system, another storage system 374b may be a storage system that provides block storage, another storage system 374c may be a storage system that provides file storage, another storage system 374d may be a relatively high-performance storage system while another storage system 374n may be a relatively low-performance storage system, and so on. In alternative embodiments, only a single storage system may be present.

The storage systems 374a, 374b, 374c, 374d, 374n depicted in FIG. 3E may also be organized into different failure domains so that the failure of one storage system 374a should be totally unrelated to the failure of another storage system 374b. For example, each of the storage systems may receive power from independent power systems, each of the storage systems may be coupled for data communications over independent data communications networks, and so on. Furthermore, the storage systems in a first failure domain may be accessed via a first gateway whereas storage systems in a second failure domain may be accessed via a second gateway. For example, the first gateway may be a first instance of the edge management service 382 and the second gateway may be a second instance of the edge management service 382, including embodiments where each instance is distinct, or each instance is part of a distributed edge management service 382.

As an illustrative example of available storage services, storage services may be presented to a user that are associated with different levels of data protection. For example, storage services may be presented to the user that, when selected and enforced, guarantee the user that data associated with that user will be protected such that various recovery point objectives ('RPO') can be guaranteed. A first available storage service may ensure, for example, that some dataset associated with the user will be protected such that any data that is more than 5 seconds old can be recovered in the event of a failure of the primary data store whereas a second available storage service may ensure that the dataset that is associated with the user will be protected such that any data that is more than 5 minutes old can be recovered in the event of a failure of the primary data store.

An additional example of storage services that may be presented to a user, selected by a user, and ultimately applied to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on.

Consider an example in which a particular data compliance service is designed to ensure that a user's datasets are managed in a way so as to adhere to the requirements set forth in the GDPR. While a listing of all requirements of the GDPR can be found in the regulation itself, for the purposes of illustration, an example requirement set forth in the GDPR requires that pseudonymization processes must be applied to stored data in order to transform personal data in such a way that the resulting data cannot be attributed to a specific data subject without the use of additional information. For example, data encryption techniques can be applied to render the original data unintelligible, and such data encryption techniques cannot be reversed without access to the correct decryption key. As such, the GDPR may require that the decryption key be kept separately from the pseudonymised data. One particular data compliance service may be offered to ensure adherence to the requirements set forth in this paragraph.

In order to provide this particular data compliance service, the data compliance service may be presented to a user (e.g., via a GUI) and selected by the user. In response to receiving the selection of the particular data compliance service, one or more storage services policies may be applied to a dataset associated with the user to carry out the particular data compliance service. For example, a storage services policy may be applied requiring that the dataset be encrypted prior to being stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a storage services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

The storage systems 374a, 374b, 374c, 374d, 374n in the fleet of storage systems 376 may be managed collectively, for example, by one or more fleet management modules. The fleet management modules may be part of or separate from the system management services module 384 depicted in FIG. 3E. The fleet management modules may perform tasks such as monitoring the health of each storage system in the fleet, initiating updates or upgrades on one or more storage systems in the fleet, migrating workloads for loading balancing or other performance purposes, and many other tasks. As such, and for many other reasons, the storage systems 374a, 374b, 374c, 374d, 374n may be coupled to each other via one or more data communications links in order to exchange data between the storage systems 374a, 374b, 374c, 374d, 374n.

The storage systems described herein may support various forms of data replication. For example, two or more of the storage systems may synchronously replicate a dataset between each other. In synchronous replication, distinct copies of a particular dataset may be maintained by multiple storage systems, but all accesses (e.g., a read) of the dataset should yield consistent results regardless of which storage system the access was directed to. For example, a read directed to any of the storage systems that are synchronously replicating the dataset should return identical results. As such, while updates to the version of the dataset need not occur at exactly the same time, precautions must be taken to ensure consistent accesses to the dataset. For example, if an update (e.g., a write) that is directed to the dataset is received by a first storage system, the update may only be acknowledged as being completed if all storage systems that are synchronously replicating the dataset have applied the update to their copies of the dataset. In such an example, synchronous replication may be carried out through the use of I/O forwarding (e.g., a write received at a first storage system is forwarded to a second storage system), communications between the storage systems (e.g., each storage system indicating that it has completed the update), or in other ways.

In other embodiments, a dataset may be replicated through the use of checkpoints. In checkpoint-based replication (also referred to as 'nearly synchronous replication'), a set of updates to a dataset (e.g., one or more write operations directed to the dataset) may occur between different checkpoints, such that a dataset has been updated to a specific checkpoint only if all updates to the dataset prior to the specific checkpoint have been completed. Consider an example in which a first storage system stores a live copy of a dataset that is being accessed by users of the dataset. In this example, assume that the dataset is being replicated from the first storage system to a second storage system using checkpoint-based replication. For example, the first storage system may send a first checkpoint (at time t=0) to the second storage system, followed by a first set of updates to the dataset, followed by a second checkpoint (at time t=1), followed by a second set of updates to the dataset, followed by a third checkpoint (at time t=2). In such an example, if the second storage system has performed all updates in the first set of updates but has not yet performed all updates in the second set of updates, the copy of the dataset that is stored on the second storage system may be up-to-date until the second checkpoint. Alternatively, if the second storage system has performed all updates in both the first set of updates and the second set of updates, the copy of the dataset that is stored on the second storage system may be up-to-date until the third checkpoint. Readers will appreciate that various types of checkpoints may be used (e.g., metadata only checkpoints), checkpoints may be spread out based on a variety of factors (e.g., time, number of operations, an RPO setting), and so on.

In other embodiments, a dataset may be replicated through snapshot-based replication (also referred to as 'asynchronous replication'). In snapshot-based replication, snapshots of a dataset may be sent from a replication source such as a first storage system to a replication target such as a second storage system. In such an embodiment, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

A checkpoint can be defined as a point in time that temporally divides modifications to a dataset between those that precede the checkpoint and those modifications that follow the checkpoint. Those modifications that precede the checkpoint are included in the dataset the checkpoint represents. Those modifications that follow are excluded from the dataset the checkpoint represents. Snapshots represent one example of a checkpoint although checkpoints have uses other than snapshots. Checkpoints may or may not be persistent, and may be used for a variety of internal uses such as, for example, low RPO replication, as part of a continuous data protection implementation, or in forming crash recovery points within or between transaction engines. Establishing a checkpoint for crash consistent snapshot across multiple storage systems can require a full distributed quiescence in which all of the storage systems involved in the checkpoint stop processing I/O operations and wait for pending operations to complete before establishing the checkpoint. The unavailability of a dataset during this period can create problems for the hosts that utilize the dataset as well as a backlog of pending operations that must be processed when I/O operations resume. Furthermore, it is difficult to enable checkpointing across multiple storage systems that utilize different storage implementations and/or that utilize different checkpoint protocols. As set forth in detail below, a variety of embodiments in accordance with the present disclosure provide a mechanism for coordinating snapshots for data stored across distinct storage environments with the requirement of a full distributed quiescence of storage operations.

Figure 4:
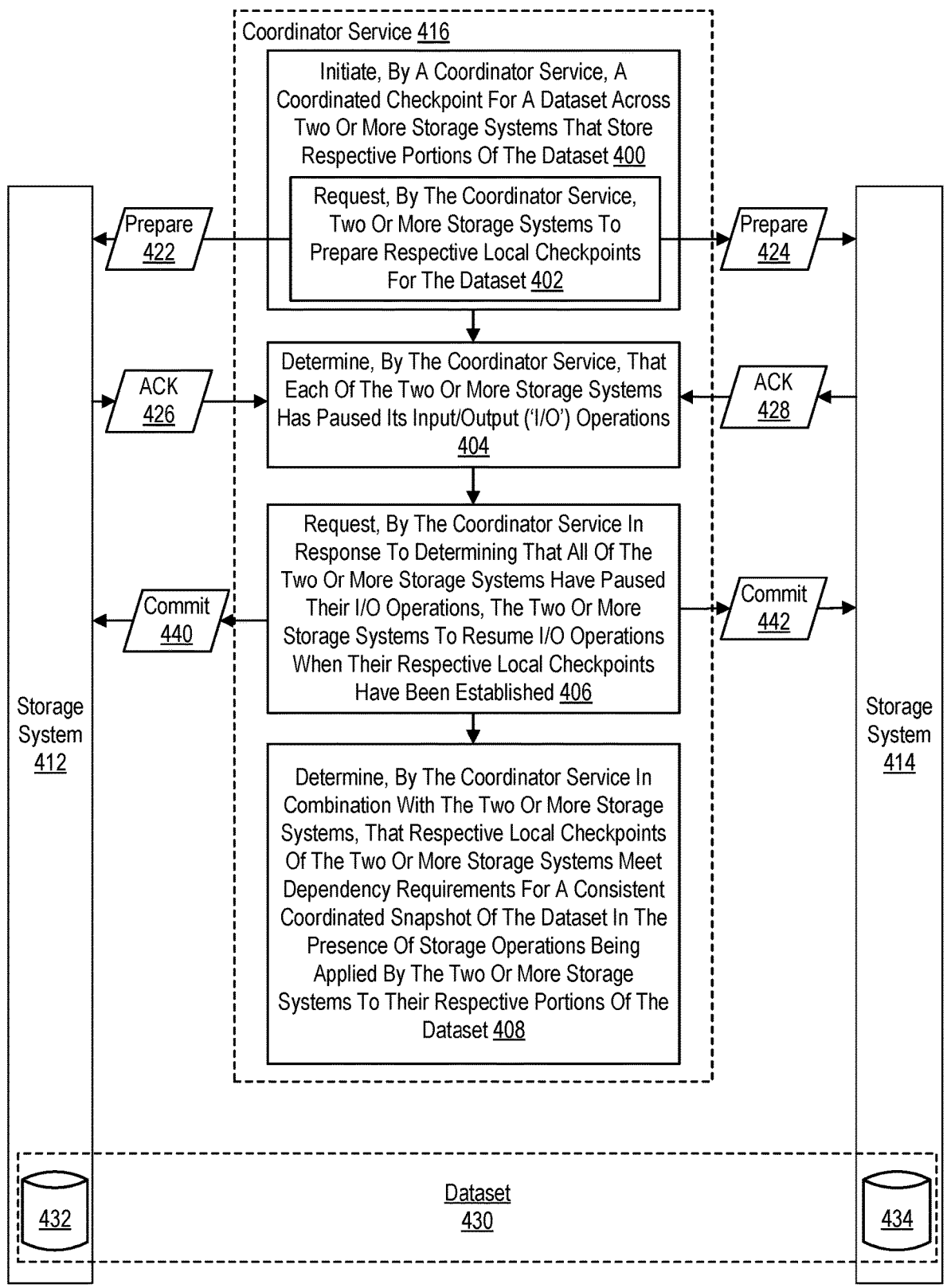
FIG. 4 sets forth a flow chart illustrating an example method of coordinated snapshots for data stored across distinct storage environments in accordance with some embodiments of the present disclosure.

For further explanation FIG. 4 shows a flowchart of an example method for coordinated snapshots for data stored across distinct storage environments. The example depicted in FIG. 4 can include two or more storage systems 412, 414 and a coordinator service 416, where the coordinator service orchestrates a coordinated checkpoint for a dataset 430 across the two or more storage systems. Each storage system, such as storage systems 412, 414 in this particular example, may be similar to the storage systems described above, including any combination of the storage systems described above. In fact, the storage systems 412, 414 depicted in FIG. 4 may include the same, fewer, or additional components as the storage systems described above. In various implementations, the coordinator service 416 can be embodied as computer executable instructions that execute on processing resources of one of the storage systems 412, 414, an administrative server, or on some other computing device.

In the example depicted in FIG. 4, a first portion 432 of the dataset 430 is stored on storage system 412 and a second portion 434 of the dataset 430 is stored on storage system 414.

In some examples, the two or more storage systems 412, 414 have different implementations and storage environments (although the storage systems 412, 414 being dissimilar is not a requirement for all embodiments of the present disclosure). For example, a storage system environment can implement a particular type of storage, such as block storage, file system storage, object storage, and database storage. In one non-limiting example, a storage system 412 can store a block volume that is a first portion 432 of the dataset 430 and another storage system 414 can store a file system that is a second portion 434 of the dataset 430. Thus, in some examples, the storage systems 412, 414 can employ different storage environments to implement data types of storage. Accordingly, orchestrating a coordinated checkpoint for the dataset 430 can include coordinating local checkpoints on the storage systems 412, 414 that have distinct storage implementations.

In some examples, when an I/O request has been completed, the storage systems 412, 414 signal a completion by returning results of a read request along with a success code or by acknowledging that write modification has been applied through, for example, returning a success code. A host process that initiates I/O accesses to the dataset 430 can learn that a modification has been applied by receiving a completion notification or any host could learn of a modification by reading from the dataset 430 and observing the results of the modification. Note that this read issue only arises for reads that could read the results of writes that were not signaled as completed. Because of this, many of the discussions in this patent that discuss delaying reads can often be relaxed to cover only reads that might return data from not-yet completed writes. In some discussions where write processing is delayed entirely, reads may not have the opportunity to read the problematic not-yet-completed writes and reads may not have to be delayed at all. In some cases, I/O accesses to the first portion 432 of the dataset 430 serviced by the storage system 412 can causally depend on I/O accesses to second portion 434 of the dataset 430 serviced by the storage system 414, and vice versa. For example, a modification of the first portion 432 of the dataset 430 can causally depend on the result of a modification that has been applied to the second portion 434 of the dataset 430. Thus, orchestrating a coordinated checkpoint for the dataset 430 can include coordinating local checkpoints on the storage systems 412, 414 such that modifications included in the local checkpoint on one storage system do not depend on modifications that have been excluded from the local checkpoint on another storage system.

The example method of FIG. 4 includes initiating 400, by a coordinator service 416, a coordinated checkpoint for a dataset across two or more storage systems that store respective portions of the dataset. In some examples, initiating 400 the coordinated checkpoint includes requesting 402, by the coordinator service 416, two or more storage systems 412, 414 to prepare respective local checkpoints for the dataset 430. The coordinator service 416 directs the storage systems 412, 414 to create a local checkpoint for the dataset 430 through a sequence of messages to the storage systems 412, 414. In some examples, the coordinator service 416 sends a prepare message 422 to the first storage system 412 and a prepare message 424 to the second storage system 414, where the prepare messages 422, 424 reflect that I/O operations should be paused prior to establishing a local checkpoint corresponding to the coordinated checkpoint on each storage system 412, 414.

The example method of FIG. 4 also includes determining 404, by the coordinator service 416, that each of the two or more storage systems has paused its I/O operations. Once determined, the coordinator service 416 can further send a resume (or "commit") message to the two or more systems indicating that all of the two or more storage systems paused their I/O processing or completion acknowledgements and that all of the storage systems can now resume I/O processing. When each of the two or more storage systems 412, 414 receives this indication, each of the storage systems 412, 414 will resume I/O processing after ensuring that its corresponding local checkpoint has been established. The point between pausing I/O processing and resuming I/O processing where the storage system establishes its local checkpoint can depend on what part of I/O processing that storage system pauses. An individual storage system can pause I/O completions and establish its local checkpoint prior to responding to the coordinator service that it has paused I/O processing, resuming I/O completion processing after receiving the "commit" message. Alternately, an individual storage system can pause starting or completing I/O processing and can establish the storage system's local checkpoint at any point after pausing and before the resuming I/O processing that occurs as a result of receiving the "commit" message. Alternately, a storage system can pause the starting of I/O processing and can wait until receiving the "commit" message to establish the storage system's local checkpoint after which it will resume I/O processing. However, the coordinator service 416 is agnostic to the specific choice of delaying and local checkpoint establishing utilized by the storage systems to create the local checkpoints. For the coordinator service 416, it suffices that all storage systems, in response to the prepare messages 422, 424, arrive at a state in which no further modifications of the dataset 430 are made that would be observable by other storage systems or hosts. In some examples, the coordinator service 416 determines 404 that the storage systems 412, 414 are prepared to establish the checkpoint by receiving an acknowledgement-ready message 426, 428 from each of the two or more storage systems 412, 414. The acknowledgement-ready messages 426, 428 can indicate that the storage systems 412, 414 have at least paused I/O operations for the dataset 430.

The example method of FIG. 4 also includes requesting 406, by the coordinator service 416 in response to determining that all of the storage systems 412, 414 have paused their I/O operations, the two or more storage systems 412, 414 to two or more store systems to resume I/O operations when their respective local checkpoints have been established. Based on receiving both acknowledgement messages 426, 428, the coordinator service 416 may conclude that the storage systems 412, 414 have paused the I/O operations and are either prepared to establish their local checkpoints or have already established their local checkpoints. Thus, the coordinated checkpoint, embodied by respective local checkpoints on the storage systems 412, 414, represents a version of the dataset that does not include any modification that could depend on a result of any other modification not included in the version of the dataset. Accordingly, the coordinated checkpoint can be safely relied upon as a recovery point. Thus, in some examples, the coordinator service 416 requests 406 that the storage systems resume I/O operations when their local checkpoints have been established by sending commit messages 440, 442 to the two or more storage systems 412,414, where the commit messages 440, 442 indicate to the storage systems 412, 414 that I/O operations can be safely resumed.

It should be appreciated that the coordinator service 416 does not require each storage system 412, 414 to quiesce storage operations before the coordinator service sends the request 406 to the storage systems 412, 414 to commit the local checkpoint. It should also be appreciated that the coordinator service 416 does not require confirmation that a checkpoint has been established before the coordinator service sends the request 406 to the storage systems 412, 414 to commit the local checkpoint. Further, in some implementations, if the coordinator service 416 does not receive all of the ready messages 426, 428 within some predefined timeout period, the coordinator service can instead send an abort message to the storage systems 412, 414.

The method of FIG. 4 also includes determining 408, by the coordinator service 416 in combination with the two or more storage systems 412, 414, that respective local checkpoints of the two or more storage systems 412, 414 meet dependency requirements for a consistent coordinated snapshot of the dataset 430 in the presence of storage operations being applied by the two or more storage systems to their respective portions of the dataset. If the two or more storage systems 412, 414 all successfully complete their local checkpoint, which is to say that no storage system 412, 414 aborts their local checkpoint, the coordinated checkpoint can be successfully completed. As a result of the overlap in the delay in I/O processing and/or I/O completion acknowledgements, it can be guaranteed that the local checkpoints were established such that no local checkpoint includes any modification that depends on a result of any other modification that was excluded from another local checkpoint.

Figure 5:
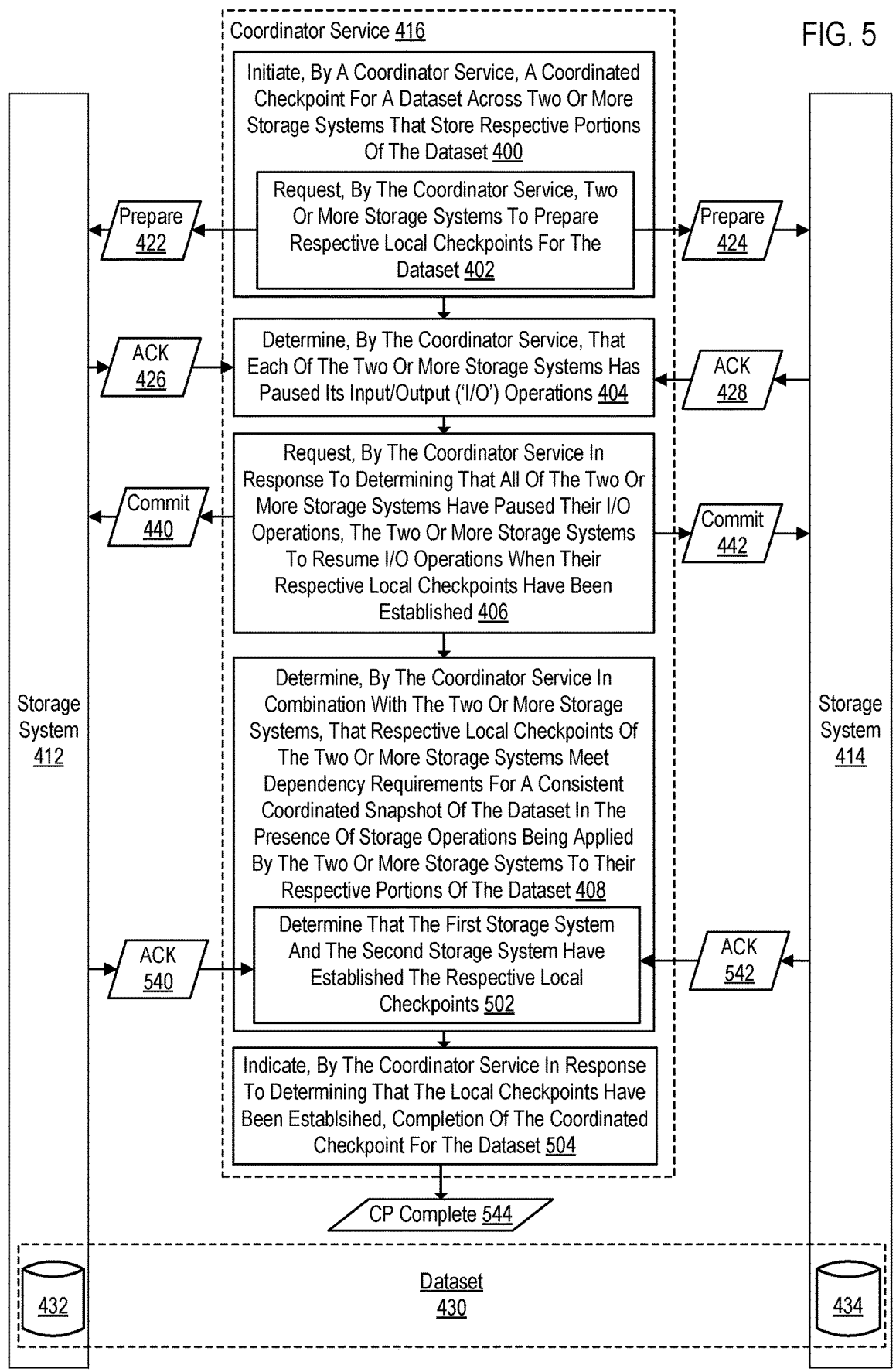
FIG. 5 sets forth a flow chart illustrating another example method of coordinated snapshots for data stored across distinct storage environments in accordance with some embodiments of the present disclosure.

For further explanation, FIG. 5 sets forth another example method of coordinated snapshots for data stored across distinct storage environments in accordance with some embodiments of the present disclosure. The example depicted in FIG. 5 includes many of the same elements as the figures described above. In the example method of FIG. 5, however, determining 408 that respective local checkpoints of the two or more storage systems meet dependency requirements also includes determining 502 that the first storage system 412 and the second storage system 414 have established the respective local checkpoints. In some examples, the coordinator service 416 receives acknowledgement messages 540, 542 from the two or more storage systems 412, 414 indicating that the respective local checkpoints have been successfully established and I/O operations have resumed. Due to message or processing delays, the times at which the acknowledgement messages 540, 542 are received by the coordinator service 416 can differ, perhaps substantially. In some examples, the acknowledgement messages 540, 542 further indicate that the storage systems 412, 414 have persisted their respective local checkpoints. For example, a storage system may use the checkpoint to generate a snapshot, where the snapshot is persisted in response to receiving the commitment message.

In some implementations, waiting for the receipt of the acknowledgement messages 540, 542 before the coordinator service 416 signals the coordinated checkpoint as complete, further facilitates fault handling mechanisms. For example, one or more storage systems 412, 414 may implement a time out procedure such that if the commitment message is not received within a certain time period, the local checkpoint will be aborted. For example, the first storage system 412 may prepare its local checkpoint and start a counter. Due to messaging or other delays, the second storage system 414 may acknowledge that it is prepared to establish its local checkpoint to the coordinator service 416 at a substantially later time. If the first storage system 412 does not receive the commit message 440 within a particular time period, the first storage system may abort its local checkpoint and resume I/O operations on the dataset 430. When the first storage system 412 does eventually receive the commitment message, it may respond to the coordinator service 416 that the local checkpoint has been aborted.

Consider an example where it may be presumed that, under reasonable circumstances, preparation of the checkpoint will not take longer than X seconds, and message delays will not be more than Y seconds, then a storage system 412 can safely set a timeout of Z seconds (where Z>X+Y) once it has received the prepare message 422, such that if it does not receive the commit message 440 within Z seconds, it can locally abort the checkpoint request and respond with 'aborted' when it does receive the commit message 440. The coordinator service 416 could then retry the operation. The time period selected for the timeout may need increase as the number of involved storage systems and technologies increases. In some examples, the timeout can be configured on the storage systems 412, 414 or set as a parameter received by the coordinator service 416. The timeout could also be tuned based on prior behavior, or a set of test round trips may be performed prior to sending a prepare message that will result in pausing the I/O operations and establishing a coordinated checkpoint. It may be advantageous to perform such a test prior to establishing the coordinated checkpoint to ensure that all storage systems and technologies are running and communicating.

The method of FIG. 5 also includes indicating 504, by the coordinator service 416 in response to determining that the local checkpoints have been established, completion of the coordinated checkpoint for the dataset 430. In some examples, indicating 504 that the coordinated checkpoint is complete may be carried out by sending a completion message 544 to the management service indicating that the coordinated checkpoint is complete once both success messages 540, 542 have been received from the storage systems 412, 414. In some examples, persistence of a local checkpoint may be disassociated from establishing the checkpoint. It is advantageous that the checkpoint ready messages 440, 442 are provided to the coordinator service 416 as quickly as possible, but it may also be necessary for the storage systems to indicate that the local checkpoint is persistent. In this case, additional messages indicating that the local checkpoint has been persisted may be provided by the storage systems 412, 414 to the coordinator service 416. The coordinator service 416 can consider the coordinated checkpoint complete when all persisted messages have been received from all storage systems 412, 414 indicating that they have persisted their local checkpoint, which can then be dissociated from resuming of I/O operations. If all storage systems and checkpoint technologies support dissociating persistence from the establishment of the checkpoint relative to the I/O stream, then the duration of paused I/O operations or I/O completions can be reduced, in some cases substantially.

Figure 6:
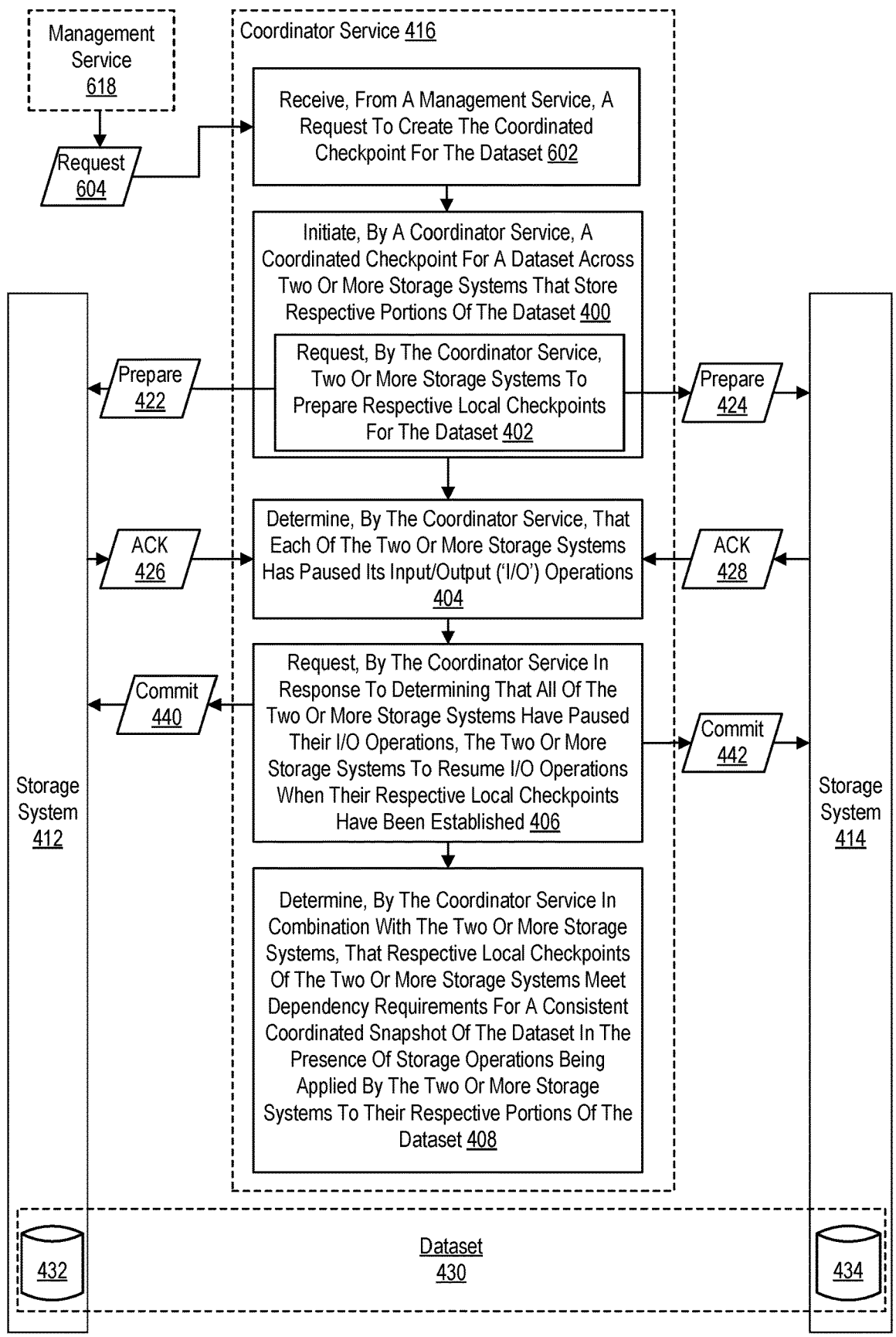
FIG. 6 sets forth a flow chart illustrating another example method of coordinated snapshots for data stored across distinct storage environments in accordance with some embodiments of the present disclosure.

For further explanation, FIG. 6 sets forth another example method of a coordinator service for coordinated snapshots for data stored across distinct storage environments in accordance with some embodiments of the present disclosure. The example depicted in FIG. 6 includes many of the same elements as the figures described above. The example method of FIG. 6, however, also includes receiving 602, from a management service 618, a request 604 to create the coordinated checkpoint for the dataset 430. In some examples, the coordinator service 416 receives a request 406 to create the coordinated checkpoint for the dataset 430 from the management service 618. The management service 618 requests and utilizes checkpoints. In one example, the management service 618 provides an interface through which a user (e.g., storage administrator) configures storage services that rely on checkpoints. For example, the management service 618 can facilitate the scheduling of snapshots, the configuration of recovery point objectives, the configuration of replication services, and so on. In some examples, the request 604 from the management service can be received in a message or through an API call. In response to the request, directs the two or more storage systems 412, 414 to prepare the respective local checkpoints. In some implementations, the management service 618 and the coordinator service 416 may be hosted on the same computing device.

Figure 7:
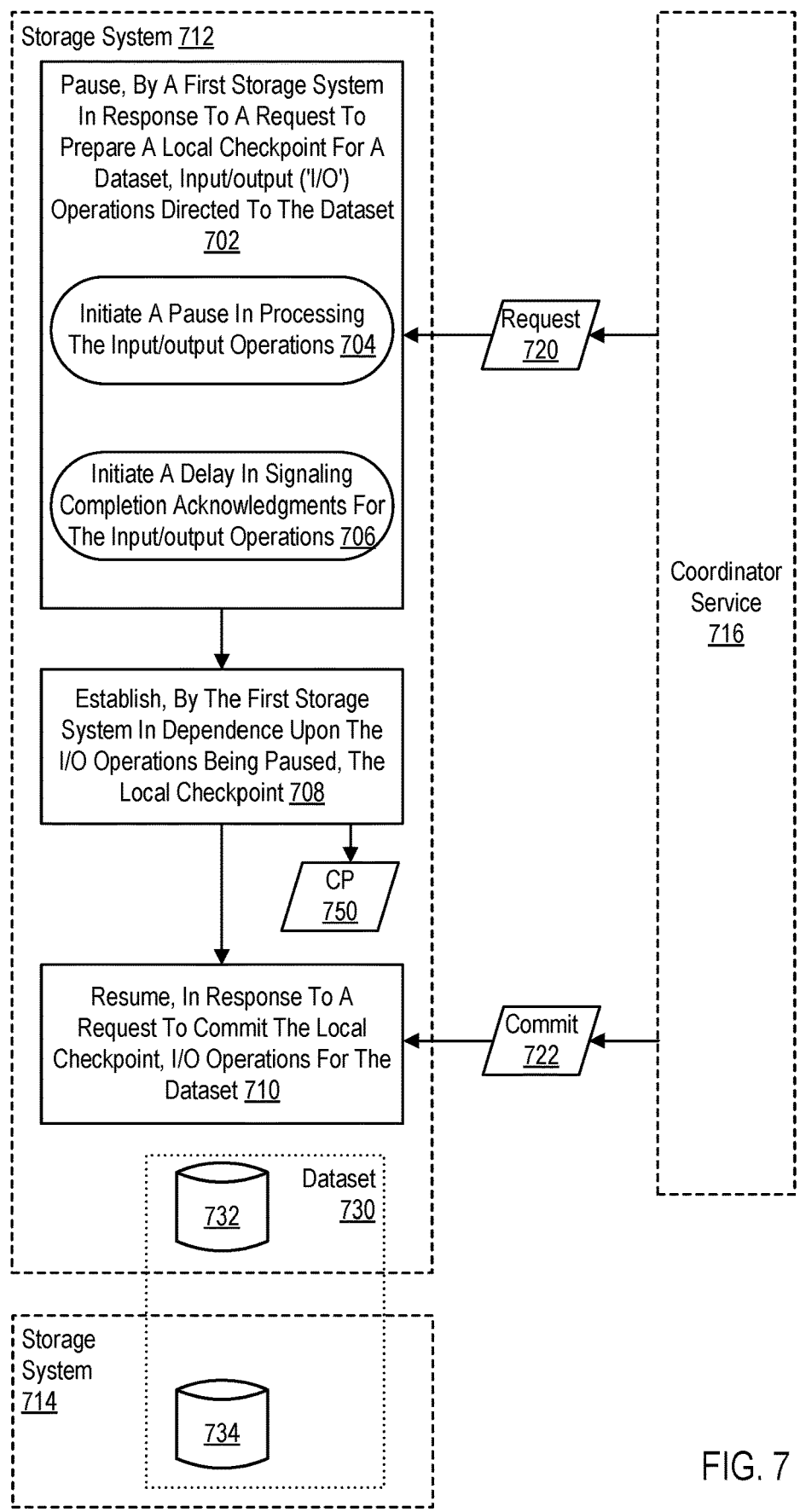
FIG. 7 sets forth a flow chart illustrating another example method of coordinated snapshots for data stored across distinct storage environments in accordance with some embodiments of the present disclosure.

For further explanation, FIG. 7 sets forth an example method of a storage system for coordinated snapshots for data stored across distinct storage environments in accordance with some embodiments of the present disclosure. The example depicted in FIG. 7 can include two or more storage systems 712, 714 and a coordinator service 716, where the coordinator service 716 may coordinate a checkpoint for a dataset 730 across the two or more storage systems 712, 714 in this particular example. Each storage system 712, 714 may be similar to the storage systems described above, including any combination of the storage systems described above. In fact, the storage systems 712, 714 depicted in FIG. 4 may include the same, fewer, or additional components as the storage systems described above. The coordinator service 716 may be similar to the coordinator service 416 described above.

In some examples, each storage system 712, 714 stores a portion of the dataset 730, where a first portion 732 of the dataset 730 is stored on one storage system 712 and a second portion 734 of the dataset 730 is stored on another storage system 714 in this particular example. Although only two storage systems and two portions of the dataset 730 are illustrated, it should be recognized that there may be any number of storage systems storing additional portions of the dataset 730. As described above, in some examples, the storage systems 712, 714 may employ different storage implementations or storage environments. As such, the dataset 730 may include different types of storage objects distributed across multiple storage systems with different storage environments. For example, a storage environment for the portion 732 of the dataset 730 on one storage system 712 may implement either block storage, a file system, a database, or an object store. Likewise, a storage environment for the portion 734 of the dataset 730 on another storage system may also implement either block storage, a file system, a database, or an object store. However, in some examples, the respective storage environments are different. For example, a first portion 732 of the dataset 730 may include a block volume stored on storage system 712 and the second portion 734 of the dataset 730 may include parts or all of a file system on storage system 714.

In some examples, the storage systems 712, 714 handle the processing and acknowledgment of I/O requests as discussed above. For example, when a write request directed to the dataset 730 is received, the write request is processed and the requested modification is applied to the dataset 730. After the requested modification has been applied and persisted, the storage system acknowledges completion of the requested modification. Until the completion has been indicated, the results of the modification should not be relied upon for any other I/O operation. In some examples, signaling the completion of an I/O request to modify the dataset may be carried out by sending a completion acknowledgement message to the requestor indicating that the request is completed. In some examples, signaling the completion of an I/O request to read from the dataset 730 may be carried out by simply returning the result of the read operation.

In some examples, the creation of checkpoints can be optimized given that a checkpoint only needs to represent a plausible crash recovery point for a dataset. A plausible crash recovery point can be expressed as a version of a dataset that does not include any modifications that could causally depend on the results of any other modification that is not included in that version of dataset. Thus, as described below, a storage system can manipulate these causal relationships by delaying the processing or completion of operations.

The example method of FIG. 7 includes pausing 702, by a first storage system 712 in response to a request 720 to prepare a local checkpoint for a dataset 730, I/O operations directed to the dataset 730, wherein the first storage system 712 stores a first portion 732 of the dataset 730. For example, the request 720 may be a prepare message, such as the prepare message 422 in FIG. 4, received from the coordinator 716. In some examples, I/O operations are paused by a storage controller of the storage system 712 setting a state in the storage system 712 that can be checked during I/O request processing. Whether a particular operation is included in the checkpoint can depend on where an in-flight request is in its processing at the time of this state change. In various implementations, pausing I/O operations can mean either delaying the processing of I/O requests (such as by adding the I/O request to a delay queue early in I/O processing logic before the request has been substantially acted on) or delaying the signaling of I/O requests even if they have completed internally.

In some implementations, pausing 702 the I/O operations includes initiating 704 a pause in processing the I/O operations. In these implementations, once the pause is initiated, received I/O requests directed the dataset 730 are not processed, which means that any modifications to the dataset 730 included in those I/O requests will not be applied until the processing of I/O requests resumes. Where the I/O requests are read requests, the time at which data will be read from the dataset will be shifted forward until the processing of I/O requests resumes. For write operations that are in process during the state change, the storage system 712 may elect to delay signaling completion of the request or provide the completion acknowledgement. For example, a particular processing stage may be selected as a cutoff point.

In other implementations, pausing 702 the I/O operations includes initiating 706 a delay in signaling completion acknowledgments for the I/O operations. In these implementations, any modifications to the dataset 730 included in those I/O requests will be applied but completion acknowledgements for the I/O requests will not be provided until the signaling of completions resumes. Where the I/O requests are read requests, the requested data may be read but is not returned until I/O operations for the dataset resume, thus the results of the read request cannot be relied upon for any future writes until the signaling of completions resumes. For write operations that are in process during the state change, the storage system 712 may elect to delay signaling completion of the request or provide the completion acknowledgement. For example, a particular processing stage may be selected as a cutoff point.

In still further implementations, pausing 702 the I/O operations includes both initiating 704 a pause in processing the I/O operations and initiating 706 a delay in signaling completion acknowledgments for the I/O operations. In these implementations, the processing of new I/O requests is suspended and completion acknowledgements for any in-progress operations will be delayed. Such implementations do not need to also wait for in-progress operations to complete before proceeding with the coordination protocol.

The example method of FIG. 7 also includes establishing 708, by the first storage system 712 in dependence upon the I/O operations being paused, the local checkpoint 750. In some examples, the local checkpoint is established 708 by updating data structures to establish a checkpoint boundary, such as where modifications received whose processing proceeded to some point are included in the checkpoint and where modifications whose processing had not yet proceeded to that point are excluded from the checkpoint. For example, this boundary can be embodied as a state change. The point in time for that state change may be different for different threads or processes, so long as the state change occurs after I/O processing is paused and before processing resumes. In some examples, the local checkpoint is used to create a named snapshot of the first portion 732 of the dataset 730.

In an implementation that pauses completions, the local checkpoint should take place at the time a storage system starts delaying completions. In an implementation that pauses all processing of modifications and that delays completion signaling, the local checkpoint can be established anywhere between the pause and the resuming of I/O processing, including right before the resume. This is because any operations that arrive at the storage system after the pause will not be processed at all, which means they are excluded from the local checkpoint. Further, it is not necessary for two storage systems to implement the same checkpoint establishment procedure or timing to participate in the same coordinated checkpoint. Thus, in some examples, two storage systems 412, 414 can implement different checkpoint establishment procedures.

Because the implementations for pausing I/O operations (either I/O processing or I/O completions) and establishing a local checkpoint simply depends on read-type and modify-type operations being paused, and further depends on modify-type operations being included in a checkpoint, these implementations can work for any combination of storage technologies that support checkpoints that establish a temporal boundary for modify-type operations. If the only form of checkpoints supported by some technology is a full persistent and named snapshot operation, then at least that storage technology can be used for checkpoints that represent snapshots. So, for example, one or more block volumes, scale-up file systems, and scale-out file systems can be leveraged to generate consistent coordinated snapshots as long as their implementations conform to the above-described protocol employed by the coordinator service 716.

The method of FIG. 7 also includes resuming 710, in response to a request 722 to commit the local checkpoint, I/O operations for the dataset 730. Once the checkpoint is established, the storage system cannot resume I/O operations until the storage system receives the request 722 to commit the checkpoint. For example, the request 722 may be a commit message, such as the commit message 440 in FIG. 4, received from the coordinator 716. The request 722 to commit the checkpoint represents that other storage systems that also store portions of the dataset 730, such as storage system 714, have also paused I/O operations for the dataset 730. Thus, the local checkpoint on the first storage system 712 can be safely relied upon for the coordinated checkpoint such that I/O operations may resume. In some implementations, where I/O processing was paused, resuming 710 I/O operations for the dataset 730 can include resuming the processing of I/O operations that are pending such as those received while I/O processing was paused. In other implementations, where the signaling of completions was paused, resuming 710 I/O operations for the dataset 730 can include resuming the signaling of completions for requested modifications, including modification that were applied but not signaled while completion acknowledgement was paused.

In some examples, resuming 710 I/O operations for the dataset 730 can further include acknowledging successful commitment of the local checkpoint in that the local checkpoint has been established and I/O operations have resumed. For example, the storage system 712 may provide an acknowledgement message, such as the acknowledgement message 540 in FIG. 4, to the coordinator service 716. However, the storage system 712 may also employ a fault handling mechanism in which the storage system 712 operates a timer after the prepare message is received, which times out if the commit request 722 is not received within a particular time period. In that scenario, the storage system 712 will abort the local checkpoint and resume I/O operations. In such a scenario, if the commit request 722 is received after expiration of the timer and I/O operations have resumed, the storage system may respond to the request 722 with an acknowledgement message indicating that the local checkpoint was aborted.

Figure 8:
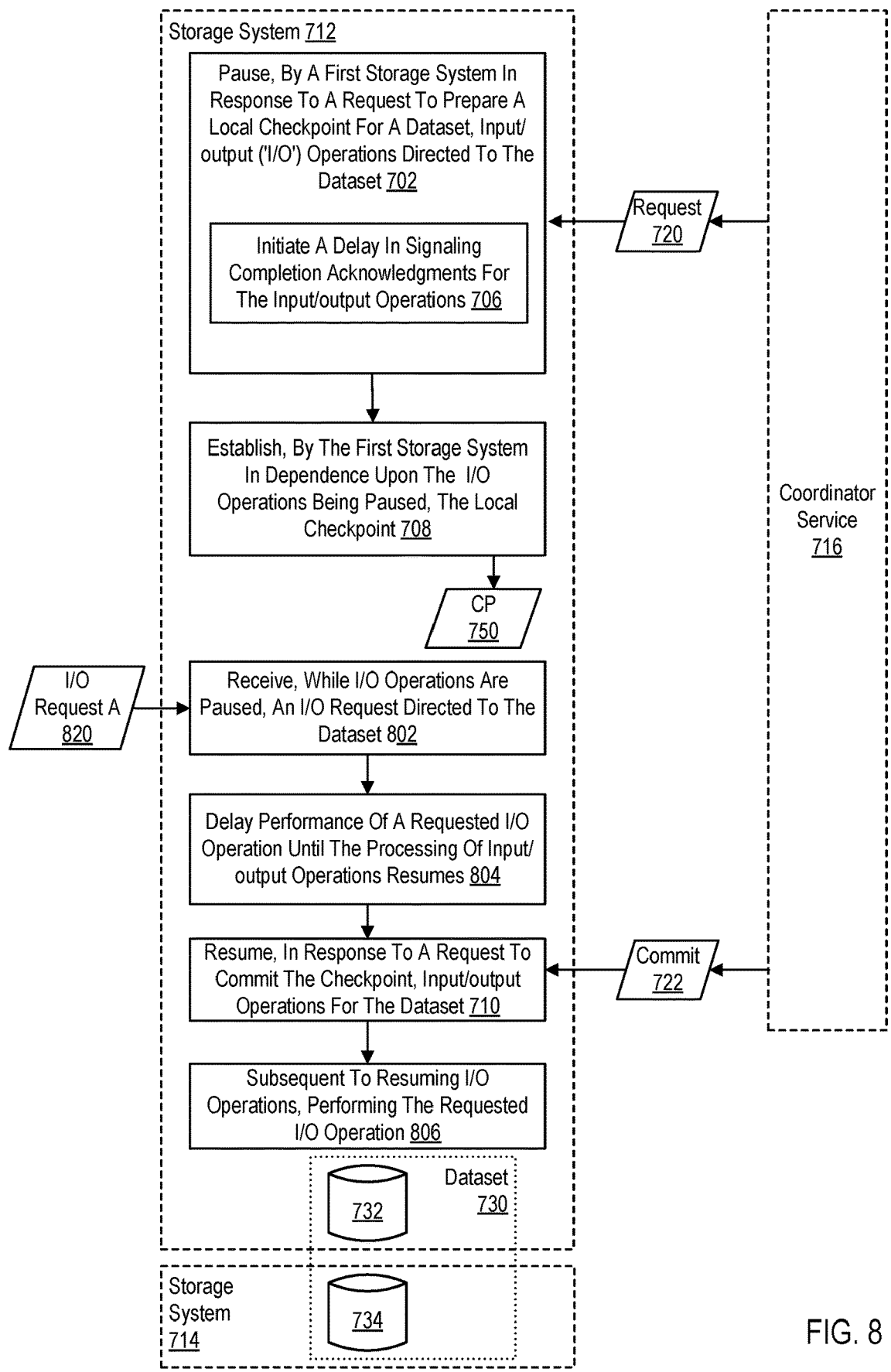
FIG. 8 sets forth a flow chart illustrating another example method of coordinated snapshots for data stored across distinct storage environments in accordance with some embodiments of the present disclosure.

For further explanation, FIG. 8 sets forth another example method of a storage system for coordinated snapshots for data stored across distinct storage environments in accordance with some embodiments of the present disclosure. The example depicted in FIG. 8 includes many of the same elements as the figures described above. The example method of FIG. 8, however, also includes receiving 802, while the processing of I/O operations is paused, an I/O request 820 directed to the dataset 730. In some examples, the storage system 712 receives a request to read or write data that is directed to the first portion 732 of the dataset 730 after the storage system 712 has paused the processing of I/O requests and before the processing of I/O requests resumes.

The example method of FIG. 8 also includes delaying 804 performance of a requested I/O operation until the processing of I/O operations resumes. In some examples, a storage controller of the storage system 712 identifies that a state set for the first portion 732 of the dataset 730 indicates I/O processing is paused, and queues the I/O request 820 for later processing when the state has changed to indicate that I/O processing is not paused. Thus, where the request 820 includes a request to read data, that data is not read from the first portion 732 of the dataset 730 unit I/O processing resumes. Where the request 820 includes a request to write data, the modification is not applied to the dataset the first portion 732 of the dataset 730 unit I/O processing resumes.

The example method of FIG. 8 also includes, performing 806, subsequent to resuming 710 I/O operations, the requested I/O operation. In some examples, performing 806 the requested operation can include reading data in the first portion 732 of the dataset 730 or applying a requested modification to the first portion 732 of the dataset 730.

Figure 9:
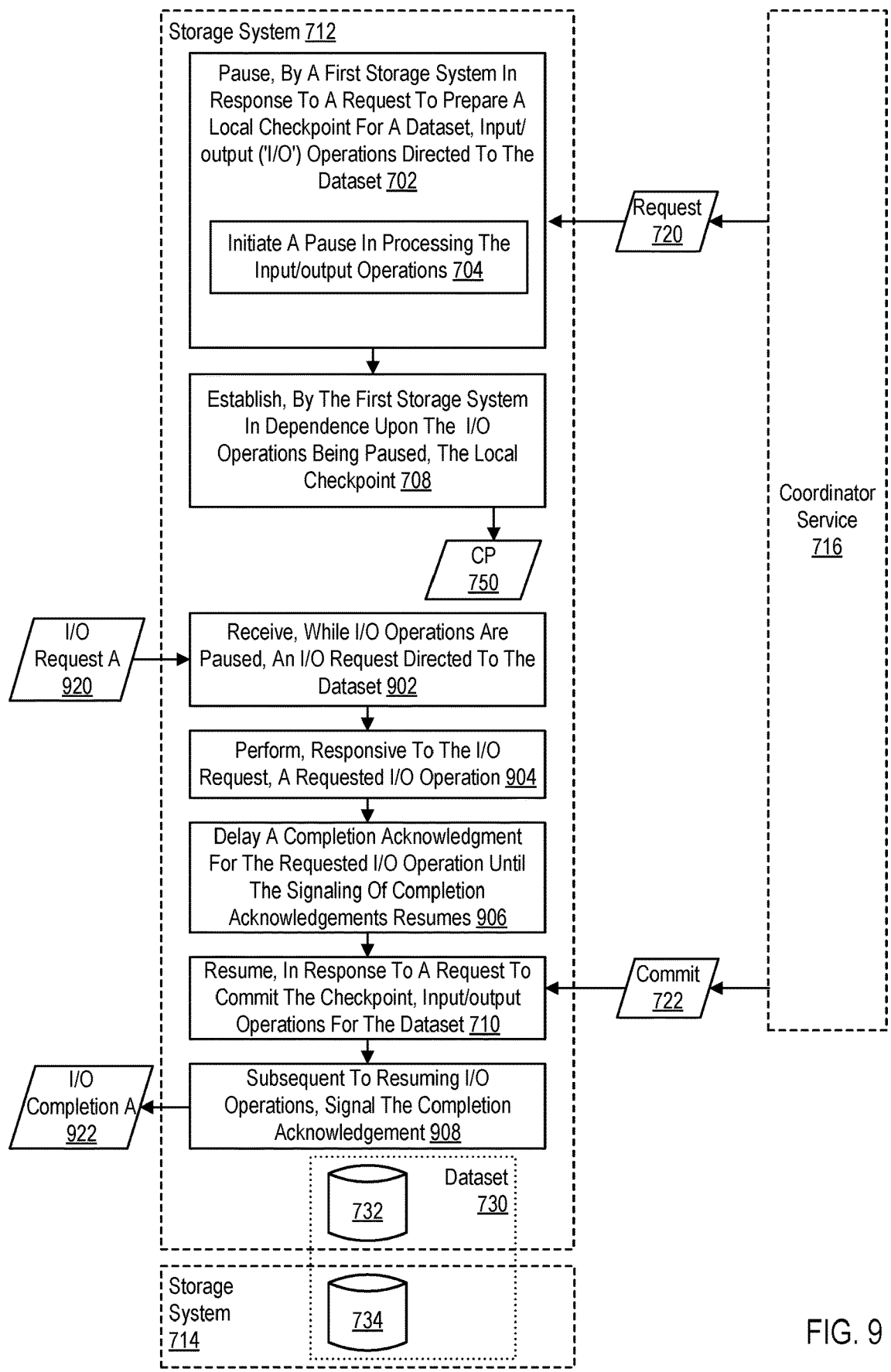
FIG. 9 sets forth a flow chart illustrating another example method of coordinated snapshots for data stored across distinct storage environments in accordance with some embodiments of the present disclosure.

For further explanation, FIG. 9 sets forth another example method of a storage system for coordinated snapshots for data stored across distinct storage environments in accordance with some embodiments of the present disclosure. The example depicted in FIG. 9 includes many of the same elements as the figures described above. The example method of FIG. 9, however, also includes receiving 902, while I/O operations are paused, an I/O request 920 directed to the dataset 730. In some examples, a storage controller of the storage system 712 receives a request 920 to read or write data in the first portion 732 of the dataset 730 after the storage system 712 has paused the signaling of completion acknowledgments for I/O operations and before the signaling of completion acknowledgments resumes.

The example method of FIG. 9 also includes performing 904, responsive to the I/O request 920, a requested I/O operation. In some examples, performing 904 the requested operation includes reading data in the first portion 732 of the dataset 730 or applying a requested modification to the first portion 732 of the dataset 730. Here, a modification that is applied to the first portion 732 of the dataset 730 is not included in the checkpoint.

The example method of FIG. 9 also includes delaying 906 a completion acknowledgment 922 for the requested I/O operation until the signaling of completion acknowledgements resumes. In some examples, the storage controller of the storage system 712 identifies that a set state for the first portion 732 of the dataset 730 indicates completion acknowledgments are paused, and withholds the completion acknowledgment 922 for the request 920 until the state has changed to indicate that completion acknowledgements are not paused.

The example method of FIG. 9 also includes, signaling 908, subsequent to resuming 710 I/O operations, the completion acknowledgement 922. In some examples, signaling 908 the completion acknowledgement 922 includes sending the completion acknowledgement 922 for the I/O request 920 to the request initiator after the storage system 712 has resumed the signaling of completion acknowledgments for I/O requests directed to the first portion 732 of the dataset 730.

Figure 10:
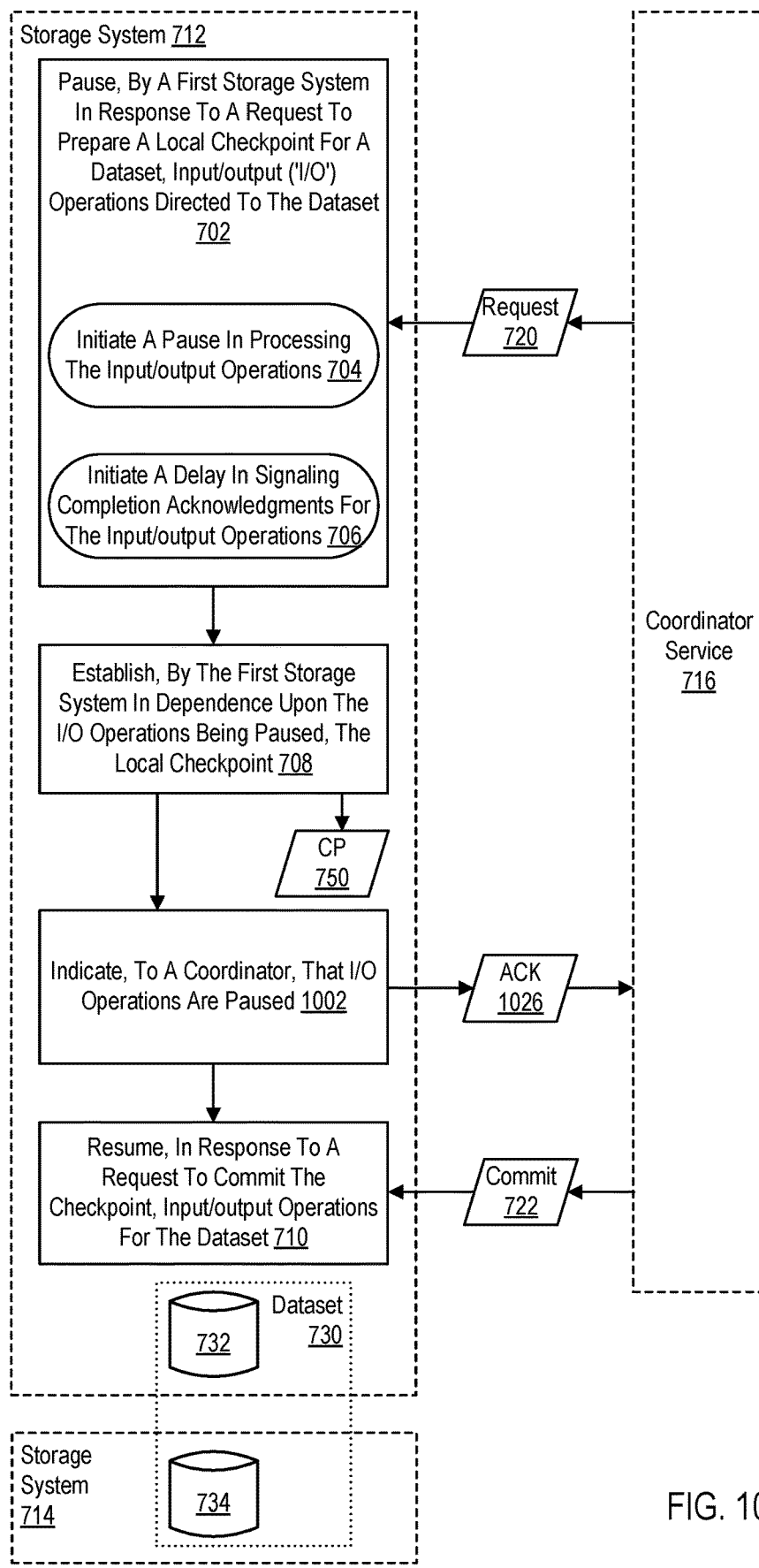
FIG. 10 sets forth a flow chart illustrating another example method of coordinated snapshots for data stored across distinct storage environments in accordance with some embodiments of the present disclosure.

For further explanation, FIG. 10 sets forth another example method of a storage system for coordinated snapshots for data stored across distinct storage environments in accordance with some embodiments of the present disclosure. The example depicted in FIG. 10 includes many of the same elements as the figures described above. The example method of FIG. 10, however, also includes indicating 1002, to a coordinator, that I/O operations are paused. In some examples, the storage system 712 provides a ready message 1026, such as the ready message 426 in FIG. 4, to the coordinator service 716 in acknowledgment that the storage system has paused I/O operations. In such examples, the indication that the I/O operations are paused is provided to the coordinator service 716 as soon as possible because the coordinator service 716 must receive this acknowledgement from the storage system 712 (and from other storage systems participating in the checkpoint for the dataset 730) before issuing the commit request 722. The sooner the ready message is provided to the coordinator service, the less time each storage system must wait on all other storage systems to pause I/O operations before resuming I/O operations. In various implementations, the storage system can indicate 1002 that I/O operations are paused before or after establishing 708 its local checkpoint.

In view of the above, it can be recognized that any I/O requests received by a storage system prior to receiving the commit message from the coordinator either depends only on prior requests that will be included in the coordinated checkpoint (the local checkpoint on any of the storage systems) or will be excluded from the storage system's local checkpoint. This can be guaranteed based on the following:

A delayed request (i.e., a delay in processing the request) cannot be observed and will not be included in a checkpoint.

A delayed response (i.e., a delay in acknowledging completion of the request) cannot be observed but could be included in a checkpoint (this essentially forces concurrency). It will be included if it is processed to internal completion (although not externally signaled) before the local checkpoint. It will be excluded if it is not internally processed until after the local checkpoint is established. An operation that is being internally processed at the same time as establishing checkpoint might or might be included.

A request can only depend on a prior request that could have been observed as a result of the completion of a read or modification request. However, care must be taken for reads since a read could observe the results of a modification even if the completion signal for the modification operation itself is delayed.

At the time a commit message is received by any storage system, all storage systems must have ensured that any operations that they could have been processed for inclusion in their local checkpoints can have depended only on included modifications by delaying the possibility for observing any modifications that might have been excluded (by delaying the modifications or responses to modifications as well as by delaying any reads that could have observed those modifications) until after any included operations could have possibly observed them.

As described above, there are three models that can accomplish this. In a first model, a storage system can respond to a prepare message with a ready response after it has arranged for all subsequent requests to be both excluded and delayed. It can do this by ensuring that the local checkpoint is established before responding with the ready message and by delaying completion signaling. In this case, any requests received after responding with the ready message will be excluded and any modifications whose inclusion or exclusion is ambiguous because they were concurrent with the local checkpoint operation cannot be observed because completion signaling is delayed.

In a second model, a storage system can delay both processing of new requests and completion signaling of prior received requests before responding with prepared and can then establish the local checkpoint at any time after the delaying and before resuming processing prior to responding with the success message. In this case, any requests received after the ready message will be excluded because they won't be processed at all, and the results of any modifications whose inclusion or exclusion is ambiguous cannot be observed because completion signaling is delayed.

In a third model, a storage system can start delaying the processing of new requests before responding with the ready message, without concern for delaying completion signaling, and can then wait until it receives the commit message to establish its local checkpoint after which processing of delayed requests will resume. In that case, all requests completed prior to receiving the commit message will be included and the only requests that could have observed a potentially excluded modification will be delayed.

If establishing a checkpoint (determining what concurrent modifications are excluded or excluded and ensuring that result) is very fast, the first model can have the least performance impact and may have the least impact on an existing storage system implementation because it allows the most regular concurrent processing and impacts only one point in the regular I/O path (completion signaling). With a very fast checkpoint, the third model can also be fast, and may be simpler if the storage system implementation makes it easier to queue incoming requests than to delay completions. If establishing checkpoints is slow, the second model may be preferable because it can start establishing the checkpoint but does not have to finish establishing it before unblocking the protocol. The second method basically allows for the most parallel operation across the storage systems storing portions of the dataset, but somewhat reduces parallel operation of storage requests within the local storage system using that method.

Figure 11:
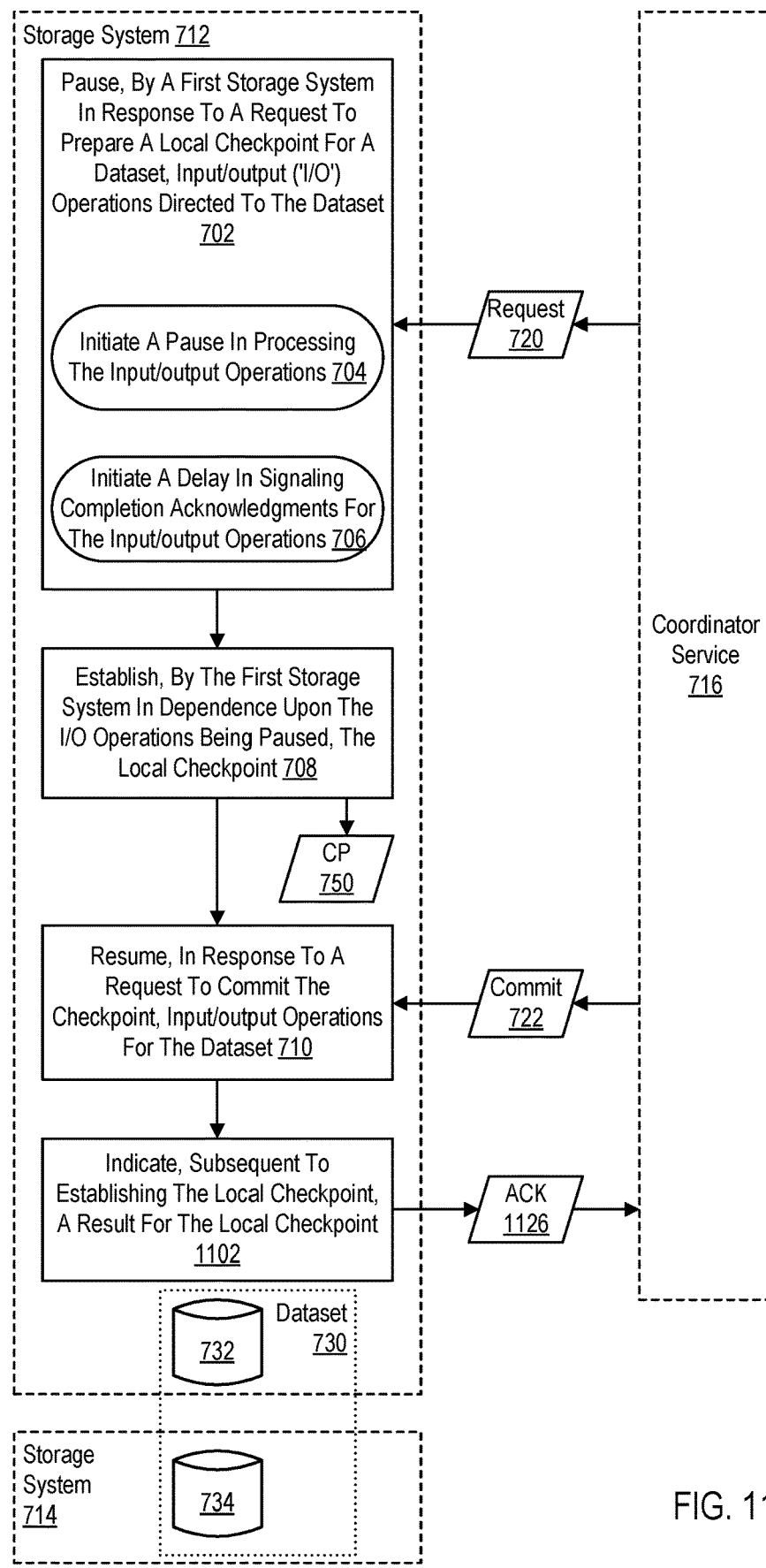
FIG. 11 sets forth a flow chart illustrating another example method of coordinated snapshots for data stored across distinct storage environments in accordance with some embodiments of the present disclosure.

For further explanation, FIG. 11 sets forth another example method of a storage system for coordinated snapshots for data stored across distinct storage environments in accordance with some embodiments of the present disclosure. The example depicted in FIG. 11 includes many of the same elements as the figures described above. The example method of FIG. 11, however, also includes indicating 1102, subsequent to establishing the local checkpoint, a result for the local checkpoint. In some examples, the storage system 712 acknowledges successful commitment of the checkpoint by providing an acknowledgement message 1126, such as the acknowledgement message 540 in FIG. 4, to the coordinator service 716 indicating that the checkpoint was successfully established and I/O operations have resumed. However, the storage system 712 may also employ a fault handling mechanism in which the storage system 712 operates a timer after the local checkpoint is established, and times out if the request 722 to commit the checkpoint is not received within a particular time period. In that scenario, the storage system 712 will abort the local checkpoint and resume I/O operations. Thus, in some examples, indicating 1102 a result for the local checkpoint can include sending an acknowledgement message indicating that the local checkpoint was aborted.

Figure 12:
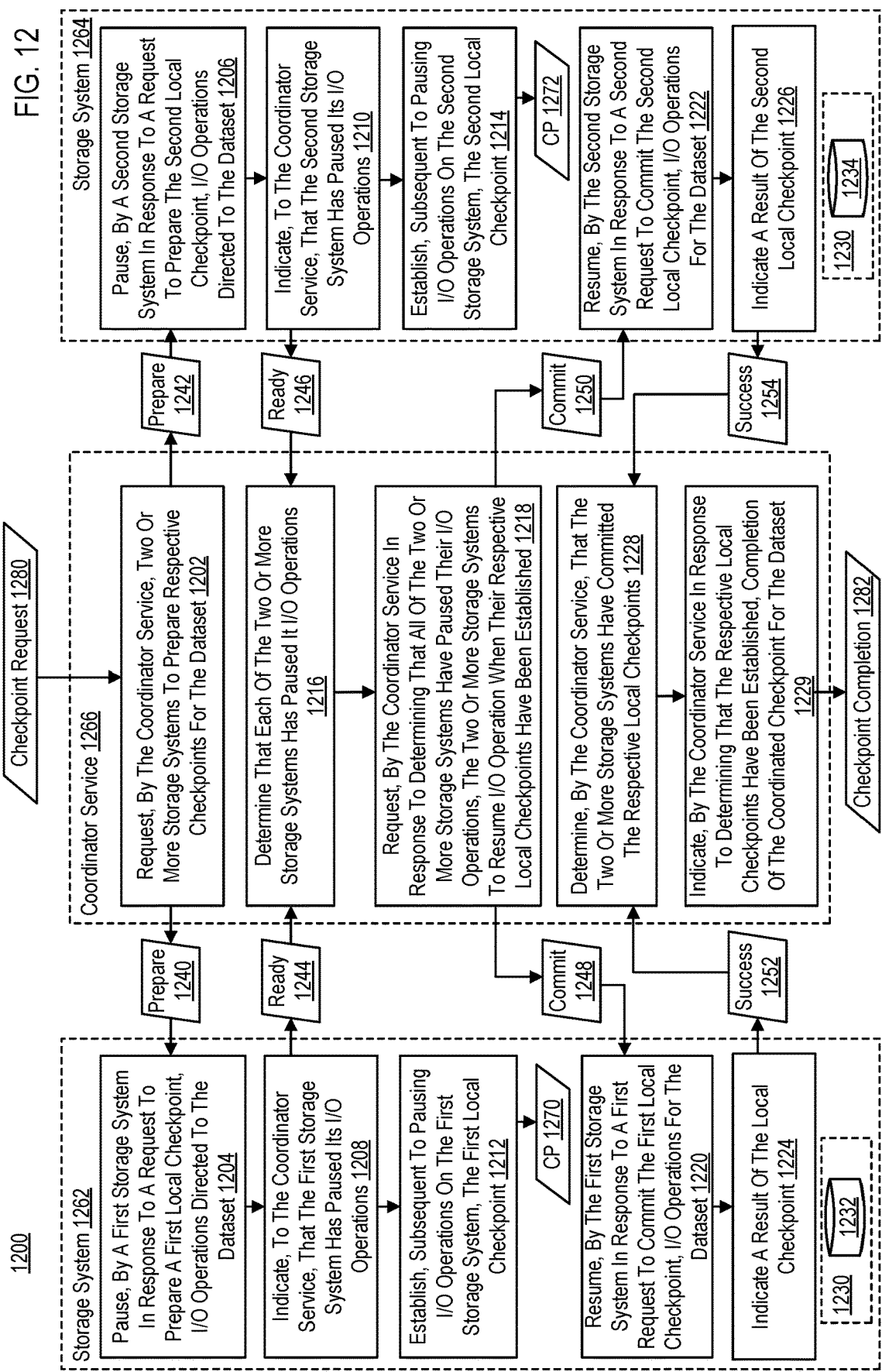
FIG. 12 sets forth a flow chart illustrating another example method of coordinated snapshots for data stored across distinct storage environments in accordance with some embodiments of the present disclosure.

For further explanation, FIG. 12 sets forth an example method of a storage environment 1200 for coordinated snapshots for data stored across distinct storage environments in accordance with some embodiments of the present disclosure. The example storage environment 1200 depicted in FIG. 12 can include two or more storage systems 1262, 1264 and a coordinator service 1266, where the coordinator service 1266 may orchestrate a coordinated checkpoint for a dataset across the two or more storage systems 1262, 1264 in this particular example. Each storage system 1262, 1264 may be similar to any of the storage systems described above, including any combination of the storage systems described above. In fact, the storage systems 1262, 1264 depicted in FIG. 4 may include the same, fewer, or additional components as the storage systems described above. The coordinator service 1266 may be similar to the coordinator service 416 described above and may be embodied as computer executable instructions that execute on processing resources of a storage system 1262, 1264, or a separate computing device.

As discussed above, each storage system 1262, 1264 stores a portion of the dataset (not shown), where a first portion 1232 of the dataset 1230 is stored on one storage system 1262 and a second portion 1234 of the dataset 1230 is stored on another storage system 1264 in this particular example. Although only two storage systems and two portions of the dataset 1230 are illustrated, it should be recognized that there may be any number of storage systems storing additional portions of the dataset and thus can participate in the checkpoint. As described above, in some examples, the storage systems 1262, 1264 may employ different storage implementations or storage environments. As such, the dataset may include different types of storage objects distributed across multiple storage systems with different storage environments. For example, a storage environment for the portion 1232 of the dataset 1230 on one storage system 1262 may implement either block storage, a file system, a database, or an object store. Likewise, a storage environment for the portion 1234 of the dataset 1230 on another storage system may also implement either block storage, a file system, a database, or an object store. However, in some examples, the respective storage environments are different. For example, a first portion 1232 of the dataset may include a block volume stored on storage system 1262 and the second portion 1234 of the dataset may include a file stored on storage system 1264.

The example method of FIG. 12 includes requesting 1202, by the coordinator service 1266, two or more storage systems 1262, 1264 to prepare respective checkpoints for the dataset 1230 (e.g., the dataset 430 in FIG. 4 or the dataset 730 in FIG. 7). In some examples, the coordinator service 1266 receives a create checkpoint request 1280 from a management service (e.g., the management service 618 in FIG. 6). In response to the request, coordinator service 1266 directs the storage systems 1262, 1264 to create a coordinated checkpoint for the dataset 1230 through a sequence of messages to the storage systems 1262, 1264. In some examples, the coordinator service 1266 provides a prepare message 1240, 1242 to the two or more storage systems, where the prepare messages 1240, 1242 request that a local checkpoint for the dataset 730 be prepared on the storage systems 1262, 1264.

The method of FIG. 12 also includes pausing 1204, by a first storage system 1262 in response to a request to prepare the first local checkpoint, I/O operations directed to the dataset 1230. In response to receiving the prepare message 1240 from the coordinator service 1266, the first storage system 1262 pauses 1204 I/O operations. In some examples, the storage systems 1262 pauses 1204 I/O operations in the manners discussed above, for example, with respect to pausing 702 I/O operations in FIG. 7. The method of FIG. 12 also includes pausing 1206, by a second storage system 1264 in response to a request to prepare the second local checkpoint, I/O operations directed to the dataset 1230. In some examples, the storage system 1264 pauses 1206 I/O operations in the manners discussed above, for example, with respect to pausing 702 I/O operations in FIG. 7. In some cases, for example, due to messaging delays, the storage systems 1262, 1264 receive the prepare messages 1240, 1242 at different times. Thus, in some examples, the storage systems 1262, 1264 pause I/O operations for the dataset 1230 at different times. As such, one storage system 1264 may continue I/O operations on one portion 1234 of the dataset 1230 while the other storage system 1262 has already paused I/O operations for its portion 1232 of the dataset 1230.

Consider an example where the first storage system 1262 pauses 1204 I/O operations at time t, and the second storage system 1264 pauses 1206 I/O operations at time $t_{n+10}$, where time period P is the time between $t_n$ and $t_{n+10}$. In this example, during time period P, the storage system 1264 is active for I/O operations on its portion 1234 of the dataset 1230 the storage system 1262 that has paused I/O operations for its portion of the dataset. If, during time period P, the second storage system receives an I/O request, and that I/O request is dependent upon the results of an earlier I/O request that has been signaled as complete by the first storage system 1262, that dependent I/O request may be processed and signaled as complete by the second storage system 1264. In other words, the results of the earlier I/O request are observable by the second storage system 1264. Thus, it is safe for the later I/O request to be included in the local checkpoint of the second storage system 1264 because the later I/O request could not depend on a modification that was excluded from the local checkpoint on the first storage system 1262.

In some examples, the storage systems 1262, 1264 utilize different mechanisms for pausing I/O operations. For example, the first storage system 1262 may pause the signaling of completion acknowledgments, whereas the second storage system 1264 may pause I/O processing altogether. It is not necessary for the storage systems 1262, 1264 to cooperate on mechanism for pausing I/O operations or even have an awareness of how or when the other is pausing I/O operations for checkpoint establishment.

The example method of FIG. 12 also includes indicating 1208, by the first storage system 1262 to the coordinator service 1266, that the first storage system has paused its I/O operations. In some examples, the first storage system 1262 sends a ready acknowledgement 1244 to the coordinator service 1266 indicating that it has paused I/O operations for the first portion 1232 of the dataset 1230. The example method of FIG. 12 also includes indicating 1210, by the second storage system 1264 to the coordinator service 1266, that the second storage system has paused its I/O operations. In some examples, the second storage system 1264 sends a ready acknowledgement 1246 to the coordinator service 1266 indicating that it has paused I/O operations for the second portion of the dataset.

The example method of FIG. 12 also includes establishing 1212, subsequent to pausing I/O operations on the first storage system 1262, the first local checkpoint 1270. In some examples, the storage system 1262 establishes 1208 a first local checkpoint 1270 in the same manner as discussed above with respect to establishing 708 the checkpoint in FIG. 7. The local checkpoint 1270 is a checkpoint for the first portion 1232 of the dataset 1230. The method of FIG. 12 also includes establishing 1214, subsequent to pausing I/O operations on the second storage system 1264, the second local checkpoint 1272. In some examples, the second storage system 1264 establishes its local checkpoint 1272 as discussed above with respect to establishing 708 the checkpoint in FIG. 7. The local checkpoint 1272 is a checkpoint for the second portion 1234 of the dataset 1230. The first local checkpoint 1270 does not include any modifications that rely on a result that was excluded from the second local checkpoint 1272, and vice versa, even though the storage systems 1262, 1264 do depend on each other to pause I/O operations before establishing the respective local checkpoints 1270, 1272. This is because excluded results on one storage system cannot be observed to become a dependency for modifications on the other storage system.

As discussed above, each storage system 1262, 1264 can establish its local checkpoint by applying a write boundary that determines which pending or in-progress modifications will be included in the local checkpoint and which of those that will be excluded. For read operations, a read boundary determines the pending or in-progress read operations for which read results will be returned. These boundaries can be determined based on where a particular operation is in its stage of processing. Further, the boundaries can be established on a per thread or per process basis, such that boundaries can be applied differently to different streams of I/O, in that different cutoff points can be selected for the processing stage that determines whether an I/O operation will be included or excluded. In some examples, one or more of the storage systems 1262, 1264 establishes its checkpoint without quiescing storage operations for its portion of the dataset. That is, the storage system establishes its checkpoint while at least one I/O operation for the dataset is in progress or has not been acknowledged as complete. It should be recognized that the storage systems 1262, 1264 can establish the respective local checkpoints at substantially different times. For example, where the storage system 1262 employs a delay in completion acknowledgements to pause I/O operations, its local checkpoint may be established prior to or concurrently with sending its ready message; and where the storage system 1264 employs a delay in I/O processing to pause I/O operations, its local checkpoint may be established after receiving a commit message from the coordinator service. However, because the was a point in time where both storage systems 1262, 1264 had paused their I/O operations for the dataset, a time boundary exists during which no storage system has applied a modification that could have been observable to create a dependency for some other I/O operation.

The example method of FIG. 12 also includes determining 1216 that each of the two or more storage systems 1262, 1264 has paused its I/O operations. For example, the coordinator service may determine that all ready messages 1244, 1246 have been received from the storage systems 1262, 1264.

The example method of FIG. 12 also includes requesting 1218, by the coordinator service 1266 in response to determining that all of the two or more storage systems 1262, 1264 have paused their I/O operations, the two or more storage systems 1262, 1264 to resume I/O operation when their respective local checkpoints have been established. In some examples, the coordinator service 1266 requests the storage systems 1262, 1264 to commit the checkpoint as discussed above with respect to requesting 406 the I/O operations to be resumed when the local checkpoints are established in FIG. 4. For example, the coordinator service 1266 sends commit messages 1248, 1250 indicating that the storage systems 1262, 1264 should resume I/O operation when their respective local checkpoints have been established. The commit messages 1248, 1250 indicates that all storage systems 1262, 1264 participating in the checkpoint have paused their I/O operations.

The example method of FIG. 12 also includes resuming 1220, by the first storage system 1262 in response to a first request 1248 to commit the first local checkpoint, I/O operations for the dataset 1230. In some examples, the first storage system 1262 resumes 1220 I/O operations in a manner as discussed above with respect to resuming 710 I/O operations in FIG. 7. Where I/O processing was paused, the storage system 1262 will begin processing pending I/O requests as well new requests. Where completion acknowledgments were paused, the storage system 1262 will begin providing completion acknowledgments for I/O requests that were processed during the pause as well as for new I/O requests that are received. The example method of FIG. 12 also includes resuming 1222, by the second storage system 1264 in response to a second request 1250 to commit the second local checkpoint, I/O operations for the dataset 1230. In some examples, the second storage system 1264 resumes 1222 I/O operations in a manner as discussed above with respect to resuming 710 I/O operations in FIG. 7. Where I/O processing was paused, the storage system 1264 will begin processing pending I/O requests as well as new requests. Where completion acknowledgments were paused, the storage system 1264 will begin providing completion acknowledgments for I/O requests that were processed or applied during the pause as well as for new I/O requests that are received.

The example method of FIG. 12 also includes indicating 1224, by the first storage system 1262 subsequent to establishing the first local checkpoint, a result of the local checkpoint. In some examples, the first storage system 1262 can indicate 1224 a result of the checkpoint as discussed above with respect to indicating 1102 a result of the checkpoint. For example, the first storage system 1262 may send a message 1252 acknowledging that the first local checkpoint 1270 was successfully established and that I/O operations have resumed. The example method of FIG. 12 also includes indicating 1226, by the second storage system 1264 subsequent to establishing the second local checkpoint, commitment of the checkpoint. In some examples, the second storage system 1264 can indicate 1226 a result of the checkpoint as discussed above. For example, the second storage system 1264 may send a message 1254 acknowledging that the second local checkpoint 1272 was successfully established and that I/O operations have resumed.

The example method of FIG. 12 also includes determining 1228, by the coordinator service 1266, that the two or more storage systems 1262, 1264 have established the respective local checkpoints. In some examples, the coordinator service 1266 can determine 1228 that the respective local checkpoints have been established as discussed above with respect to determining 502 establishment of the local checkpoints in FIG. 5. For example, the coordinator service 1266 can determine that the respective local checkpoints have been established once all acknowledgment messages 1252, 1254 have been received from the two or more storage systems 1262, 1264.

The example method of FIG. 12 also includes indicating 1229, by the coordinator service 1266 in response to determining that the respective local checkpoints have been established, completion of the coordinated checkpoint for the dataset 1230. In some examples, the coordinator service 1266 can indicated completion of the coordinated checkpoint as discussed above with respect to indicating 504 completion of the coordinated checkpoint in FIG. 5. For example, the coordinator service 1266 may provide a checkpoint completion message 1282 to the requestor of the checkpoint.

Figure 13:
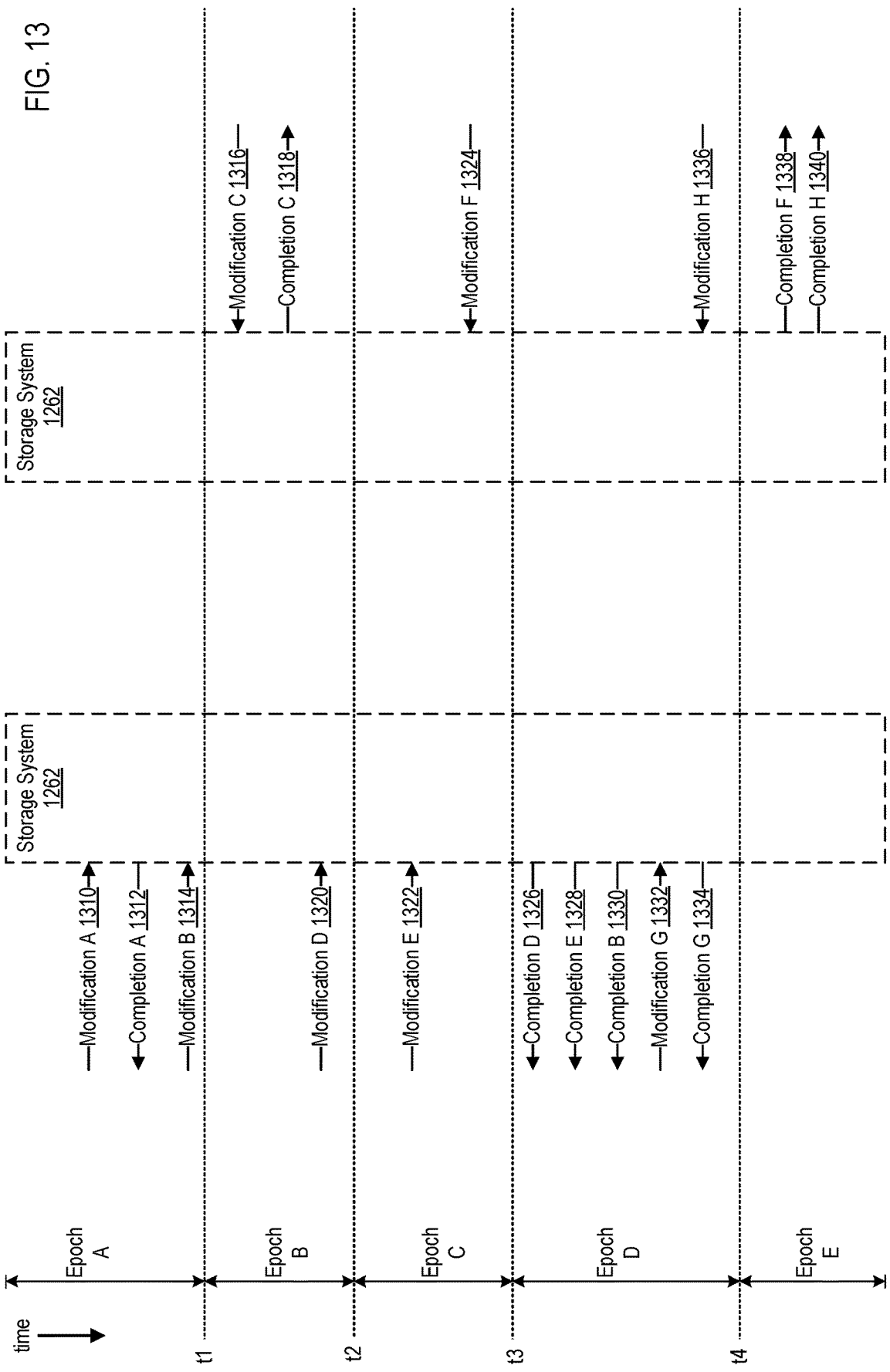
FIG. 13 sets forth a flow diagram illustrating an example of coordinated snapshots for data stored across distinct storage environments in accordance with some embodiments of the present disclosure.

Consider an example, as depicted in FIG. 13, where epoch A is a time period prior to either storage system 1262, 1264 pausing I/O operations and establishing a local checkpoint. In this particular example, both storage systems 1262, 1264 pause I/O operations by continuing to process I/O requests but delaying the signaling of completion acknowledgments. For example, an I/O request 1310 for modification A is received, the modification is applied, and a completion acknowledgement 1312 for I/O request A is provided. In epoch A, operations received on storage system 1262 that complete before the pause, such as modification A, can be a dependency for any following operation. An operation that comes in near the time system 1262 pauses and checkpoints, such as modification B in I/O request 1314, may be included or excluded in the checkpoint, which may depend on a progress of the modification. Technically, any modification that is included in the checkpoint can be safely completed without pausing. However, excluding the modification may be safer and simpler to implement. At time t1, storage system 1262 has paused the signaling of completion acknowledgements and establishes its local checkpoint.

In the example of FIG. 13, epoch B is a time period between storage system 1262 pausing completions and establish its local checkpoint at time t1 and storage system 1264 pausing completions and establishing its local checkpoint at time t2. No modification, such as modification C from I/O request 1316, that is received by storage system 1264 within epoch B could depend on a modification that was excluded from the local checkpoint on storage system 1262. That is, no results could have been returned from epoch B that modification C could possibly have relied on. Thus, completion 1318 for modification C can be signaled. In the example of FIG. 13, modification C depends on modification A. Modification A was processed and returned before the checkpoint was established, so it is included in the checkpoint and modification C can depend on it. Whereas, modification B, which is excluded from the checkpoint, cannot have been observed to become a dependency. Subsequently, I/O request 1320 that includes modification D is received by storage system 1262, where modification D depends on modification A and modification C. Modification D is applied but the completion acknowledgment is delayed. At time t3, storage system 1264 has paused the signaling of completion acknowledgements and establishes its local checkpoint.

In the example of FIG. 13, epoch C is a time period during which both storage systems 1262, 1264 have paused the signaling of completion acknowledgements and established their local checkpoints, so any new modifications will be excluded consistently, such as modification E from I/O request 1322 received by storage system 1262 and modification F from I/O request 1324 received by storage system 1264. Since the implementation is only pausing completions, modifications such as modifications E and F (which may depend on modifications A and C, for example) can proceed through the storage systems 1262, 1264, which is one of the performance advantages over a full distributed quiesce. Further, both storage systems have indicated to the coordinator service that the local checkpoints have been prepared.

In the example of FIG. 13, epoch D is a time period between storage system 1262 resuming the signaling of completion acknowledgments at time t3 and storage system 1264 resuming the signaling of completion acknowledgments at time t4. In response to the commit message from the coordinator service, storage system 1262 resumes the signaling of completion acknowledgements, such as completion acknowledgement 1326 for modification D, completion acknowledgement 1328 for modification E, and completion acknowledgement 1330 for modification B. As a result, modification requests to either storage system can now depend on any operations new or previously paused operations on storage system 1262. For example, new I/O request 1332 for modification G received at storage system 1262 can depend on modifications A, B, C, D, and E. A completion acknowledgement 1334 is provided for modification G. An I/O request 1336 for modification H received at storage system 1264 can then depend on modifications A, B, C, D, E, and G.

In the example of FIG. 13, epoch E is a time period after which storage system 1264 resumes the signaling of completion acknowledgements at time t4. In response to the commit message from the coordinator service, storage system 1264 resumes the signaling of completion acknowledgements, such as completion acknowledgement 1338 for modification F and completion acknowledgement 1340 for modification H. Thus, full normal operation has resumed.

Figure 14:
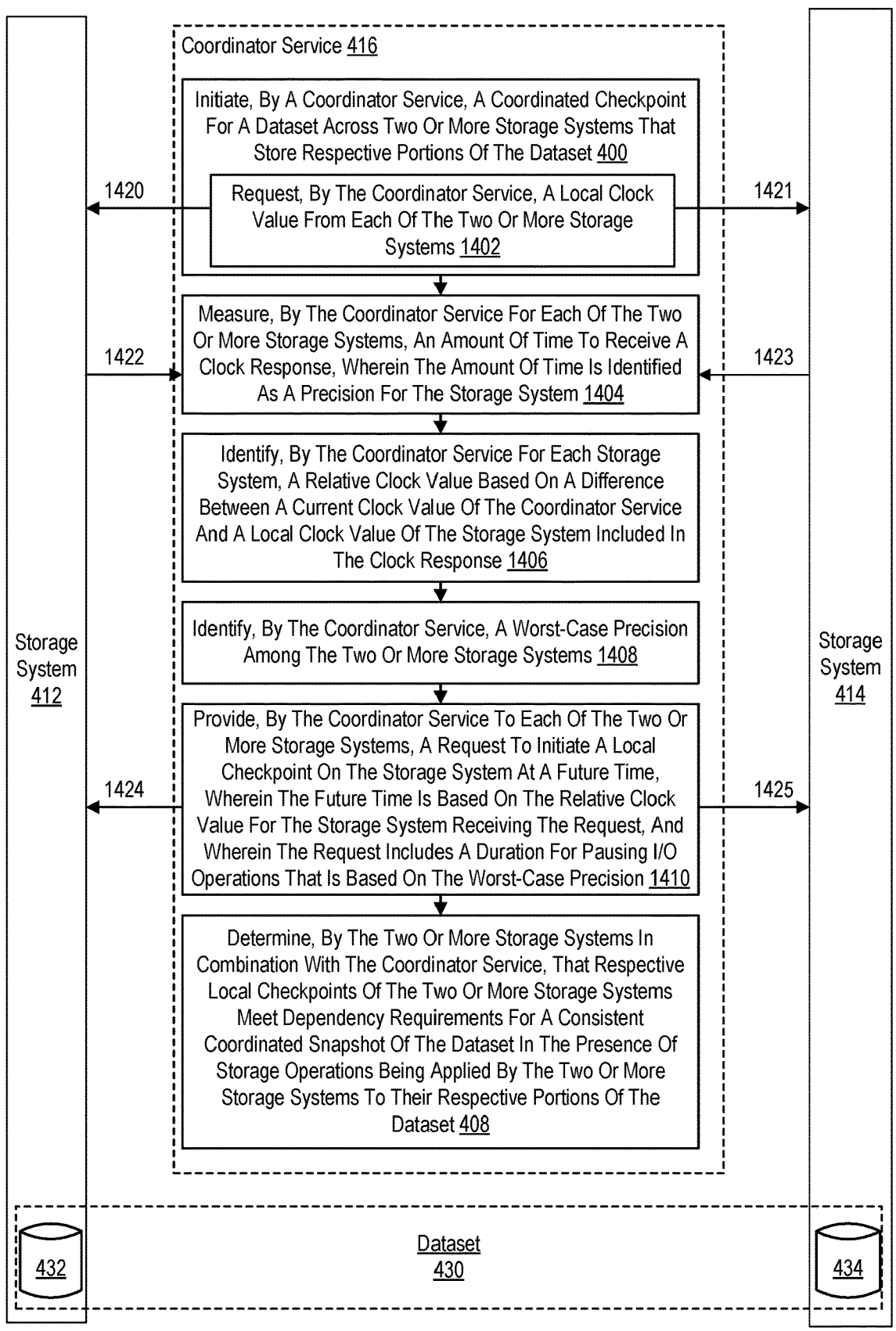
FIG. 14 sets forth a flow chart illustrating another example method of coordinated snapshots for data stored across distinct storage environments in accordance with some embodiments of the present disclosure.

For further explanation, FIG. 14 sets forth another example method of a storage system for coordinated snapshots for data stored across distinct storage environments in accordance with some embodiments of the present disclosure. The example depicted in FIG. 14 is similar to the example in FIG. 4 and may include many of the same elements as described above. However, in the example of FIG. 14, initiating 400 a coordinated checkpoint includes requesting 1402, by the coordinator service 416, a local clock value from each of the two or more storage systems 412, 414. To reduce the amount of time that storage systems are waiting for each to pause I/O operations, the coordinator service 416 can schedule at point in time at which all storage systems participating in the coordinated checkpoint should pause I/O operations (without a full quiescence) and establish their respective local checkpoints. However, system clocks on the various storage systems are not synchronized to the precision necessary to establish the coordinated checkpoint without some additional clock synchronization mechanism. Thus, in some implementations, the coordinator service 416 obtains the local clock values of the participating storage systems 412, 414. For example, at a time $T_{c0}$ that is local to the coordinator service 416, the coordinator service 416 sends requests 1420, 1421 to retrieve local clock values from the storage systems 412, 414.

The example of FIG. 14 also includes measuring 1404, by the coordinator service 416 for each of the two or more storage systems 412, 414, an amount of time to receive a clock response 1422, 1423, wherein the amount of time is identified as a precision for the storage system. The coordinator service 416 uses round-trip messages to determine the approximate value of each storage system's clock, with a precision value derived from the time for a round trip (the cumulative time between sending the request for a storage system's cock value and receiving a response indicating the storage system's clock value). A lowest precision for a storage system can be determined by sending multiple such round-trip requests and using a lower precision value derived from those requests. Thus, when each storage system 412, 414 receives the request 1420 at some time after $T_{c0}$, it responds with a clock response message 1422, 1423 that includes the local time on that storage system. The coordinator service 416 measures the difference between $T_{c0}$ and $T_{cs}$, where $T_{cs}$ is the time on the coordinator service's clock at which a clock response message is received from storage system 's.' The difference between $T_{c0}$ and $T_{cs}$ is selected as the precision for that storage system.

The example of FIG. 14 also includes identifying 1406, by the coordinator service for each storage system 412, 414, a relative clock value based on a difference between a current clock value of the coordinator service and a local clock value of the storage system included in the clock response 1422, 1423. For example, the coordinator service 416 receives a clock response 1422, 1423 from each storage system 412, 414, where the clock response includes a time $T_{s0}$, where 's' is the identifier of a particular storage system. This time $T_{s0}$ and the time $T_c$ on the coordinator service's clock is the relative clock value for that storage system that will be used for scheduling the local checkpoint on that storage system.

The example of FIG. 14 also includes identifying 1408, by the coordinator service 416, a worst-case precision among the two or more storage systems 412, 414. The (the largest) precision value determined from the set of two or more storage systems 412, 414 can be used to calculate a delay that can be used to ensure a duration of time for delaying or pausing I/O operations, which can ensure an overlap in paused I/O among the storage systems (and thus avoidance of causal I/O relationships within that duration of time). When the coordinator service 416 has received the clock response messages 1422, 1423, it knows that each storage system's clock value was obtained sometime between the time the coordinator service 416 sent out the clock request message 1420, 1421 and the time the clock response message 1422, 1423 was received. The worst case (e.g., the time at which the last received clock response) can be selected as the time granularity $T_G$ for the coordinated checkpoint. The time granularity represents the worst-case variation in the actual times that each of the storage systems looked at their clocks. This also represents an amount of time that the coordinator service 416 can use to coordinate an overlapping time-span for paused I/O given the uncertainty the coordinator service 416 has for each storage system's actual local clock. Thus, in some examples, the last clock response message that is received by the coordinator service represents the longest (or worst case) messaging delay among the storage systems 412, 414. Consider an example where the clock response message 1422 from storage system 412 is received after the clock response message 1423 from storage system 414 (where only storage systems 412, 414 store portions of the dataset and are thus participating in the coordinated checkpoint). In this example, the amount of time between the transmission of the clock request message 1420 at $T_{c0}$ and the receipt of the clock response message 1422 at $T_{cs}$ represents the granularity $T_G$ for the coordinated checkpoint (i.e., $T_G=T_{cs}-T_{c0}$).

The example method of FIG. 14 also includes providing 1410, by the coordinator service 416 to each of the two or more storage systems 412, 414, a request to initiate a local checkpoint on the storage system at a future time, wherein the future time is based on the relative clock value for the storage system receiving the request, and wherein the request includes a duration for pausing I/O operations that is based on the worst-case precision. In some examples, the coordinator service determines a point in time in the future that is adjusted for each of the two or more storage system's clock values, along with a delay value that is derived from the largest precision value among the two or more storage systems. The coordinator can then send this adjusted future point in time and delay value to each of the two more storage systems that store a portion of the dataset. For example, the coordinator service 416 determines a future time for storage system 412 to initiate its local checkpoint based on the relative clock value for storage system 412 that was derived from its clock response message 1422. The coordinator service 416 sends a checkpoint request 1424 to storage system 412 that includes this future time and a duration for pausing I/O operations that is derived from $T_G$. Likewise, the coordinator service 416 determines a future time for storage system 414 to initiate its local checkpoint based on the relative clock value for storage system 414 that was derived from its clock response message 1423. The coordinator service 416 sends a checkpoint request 1425 to storage system 414 that includes this future time and a duration for pausing I/O operations that is derived from $T_G$.

In response, each storage system waits until its clock reaches that adjusted point in time in the future, delays I/O processing, starts delaying I/O processing, waits a duration of time corresponding to the delay value, establishes a checkpoint, and then resumes I/O processing. If all of this proceeded correctly, then the storage system can respond to the coordinator with a success. If any part failed (or if the point in time in the future was actually already passed such as because the message was not received before that time) then the storage system can respond to the coordinator with an abort indication.

In one example, the coordinator service 416 determines, for each storage system, a relatively safe relative time in each storage system's future, where this future time $T_{sp}=T_{s0}+2T_G+e$, where e is selected as a buffer to provide the coordinator service 416 with assurance that it can get a message to all storage systems 412, 414 before hitting that future time. The coordinator service sends $T_{sp}$ and $T_G$ to all systems. Each storage system's time range from $T_{sp}$ to $T_{sp}+T_G$ is guaranteed to have some overlap with every other storage system. Each storage system waits until their respective future time (e.g., $T_{sp}$) according to their local clock and at that time pauses I/O operations, as discussed above, for the specified duration (e.g., $T_G$). Each storage system 412, 414 then initiates its respective local checkpoint. When a storage system reaches its future local time (e.g., $T_{sp}$) plus the delay time (e.g., $T_G$) and completes the establishment of its local checkpoint, it responds to the coordinator service 416 indicating that it is done establishing its local checkpoint. When the coordinator service 416 receives a done message from all storage systems, the coordinated checkpoint is considered established.

Thus, the worst-case duration for pausing I/O operations by any storage system is bounded by $T_G$ which is established before any I/O delays actually happen. Multiple tests for $T_G$ can be performed if any storage systems are unusually slow to respond, to try to get a reasonable lower bound on $T_G$. If, for example, three rounds of clock request/response messages were exchanged with each storage system, then each storage system's best-case round trip can be used towards the calculation of $T_G$ (that calculation being the maximum of the minimum response times from all storage systems). The value 'e' should be chosen to ensure that a higher than normal message delay would not normally cause any storage system to receive the checkpoint request message later than their local time $T_{sp}$. If a checkpoint request message is still received too late, the storage system can safely respond with an abort. If any storage system does not respond with a 'done' message after a reasonable period of time the coordinator may abandon the checkpoint and perform cleanup.

In view of the foregoing, establishing a coordinated checkpoint may be carried out through a messaging protocol using a variety of techniques. In a first model, a storage system can respond to a prepare message with a prepared response after it has arranged for all subsequent requests to be both excluded and delayed. It can do this by ensuring that the local checkpoint is established before responding with prepared and by delaying completion signaling. In this case, any requests received after responding with prepared will be excluded and any modifications who's inclusion or exclusion is ambiguous because they were concurrent with the local checkpoint operation cannot be observed because completion signaling is delayed.

In a second model, a storage system can delay both processing of new requests and completion signaling of prior received requests before responding with prepared and can then establish the local checkpoint at any time after the delaying and before resuming processing prior to responding with the success message. In this case, any requests received after the prepared response will be excluded because they won't be processed at all, and the results of any modifications whose inclusion or exclusion is ambiguous cannot be observed because completion signaling is delayed.

In a third model, a storage system can start delaying the processing of new requests before responding with prepared, without concern for delaying completion signaling, and can then wait until it receives the commit message to establish its local checkpoint after which processing of delayed requests will resume. In that case, all requests completed prior to receiving the commit message will be included and the only requests that could have observed a potentially excluded modification will be delayed.

If establishing a checkpoint (determining what concurrent modifications are excluded or excluded and ensuring that result) is very fast, the first model may have the least performance impact and may have the least impact on an existing storage system implementation because it allows the most regular concurrent processing and impacts only one point in the regular I/O path (completion signaling). With a very fast checkpoint, the third model can also be fast, and may be simpler if the storage system implementation makes it easier to queue incoming requests than to delay completions. If establishing checkpoints is slow, the second model may be preferable since it can start establishing the checkpoint but doesn't have to finish establishing it before unblocking the protocol. The second model basically allows for the most parallel operation across the storage systems storing portions of the dataset, but somewhat reduces parallel operation of storage requests within the local storage system using that model. Since the guarantees are the same for all three models, each storage system can use whichever of the three general models work best without concern for the method used by any of the other storage systems.

In view of the foregoing, establishing a coordinated checkpoint may also be carried out through a clock-based protocol using a variety of techniques. In one model, the coordinator sends a message requesting a clock to all coordinating storage systems. When the coordinator has received the clock message it knows that each storage system's clock value was obtained sometime between the time the coordinator sent the request message and the time a response was received. The coordinator identifies the worst-case variation in the actual times each of the storage systems looked at their clocks and uses this to calculate a reasonably safe amount of time that can be added to each received clock value. This forms a safe time in the future that each storage system can receive a message with enough time to start delaying I/O processing and initiate a local checkpoint algorithm. The coordinator provides this local time delta to each storage system, and each storage system waits until this local future time and then delays completing writes and performing new reads, and then initiates the local checkpoint. The storage systems respond to the coordinator indicating that it is done establishing its local checkpoint.

To coordinate checkpoints and snapshots on several storage systems, the local checkpoints and snapshots are related together. This may include coordinated checkpoints that were in fact coordinated and that were coordinated successfully, or that were coordinated with some pieces missing that are considered genuinely persistently faulted. As each storage system's local checkpoints and snapshots are local to that storage system, and since separate technologies that are being coordinated by a coordinator can be quite different from each other, coordinator implementations may relate these together while allowing the several storage systems' implementations and internal data structures to be properly separate from each other, and while still being relatable to each other by higher level software. In some implementations, each local storage system checkpoint is marked in some way, for example, to associate it with the coordinated checkpoint. In one example, the coordinator controls checkpoint or snapshot names or identifiers. In another example, local checkpoints are tagged. An advantage of tags is that they can be added or removed fairly easily.

Different technologies might support different methods for naming or tagging, in which case the coordinator or a management layer may track of names or identifiers of local snapshots on some of the local storage systems and tags for others. As some storage systems might create their local snapshots for an attempted coordinated snapshot while others might fail to do so, or might crash or lose network access leaving the state of their local checkpoints/snapshots in doubt, the coordinator may handle such faults to ensure consistent naming or tagging of local snapshots. If a coordinator tries again to make a coordinated snapshot after a failed snapshot, for example, then the coordinator may coordinate replacement names or identifiers and/or parse tags that might or might not remain associated with local checkpoints.

As described above, a dataset may be replicated through the use of checkpoints. In one example of checkpoint-based replication (such as lightweight checkpointing or metadata only checkpoint), a set of updates to a dataset (e.g., one or more write operations directed to the dataset) may occur between different checkpoints, such that a dataset has been updated to a specific checkpoint only if all updates to the dataset prior to the specific checkpoint have been completed. In another example, where snapshots are utilized as checkpoints for a dataset, the dataset may be replicated through snapshot-based replication. In snapshot-based replication, snapshots of a dataset may be sent from a replication source storage system to a replication target storage system. In such an implementation, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way. Readers will further appreciate that various types of checkpoints may be used (e.g., metadata only checkpoints, snapshot checkpoints, or other types of checkpoints that will be recognized by those of skill in the art). Readers will further appreciate that checkpoints may be spread out based on a variety of factors (e.g., time, number of operations, an RPO setting), and so on.

When a dataset is distributed across multiple storage systems, where each storage system stores a distinct portion of the dataset, checkpoint replication requires additional coordination. For example, the source checkpoint for the dataset must be first coordinated across the set of source storage systems. Once the coordinated source checkpoint has been established to include consistent source checkpoints for each local portion of the dataset on each source storage system, the replication of those local source checkpoints to target storage systems must also be coordinated. Further, the replica checkpoints received by the target storage systems must also be coordinated to establish a coordinated checkpoint for a replica dataset that is distributed across the target storage systems. Mechanisms for coordinating a consistent replicated checkpoint on the target storage systems in accordance with the present disclosure are described with reference to figures, beginning with FIG. 15.

Figure 15:
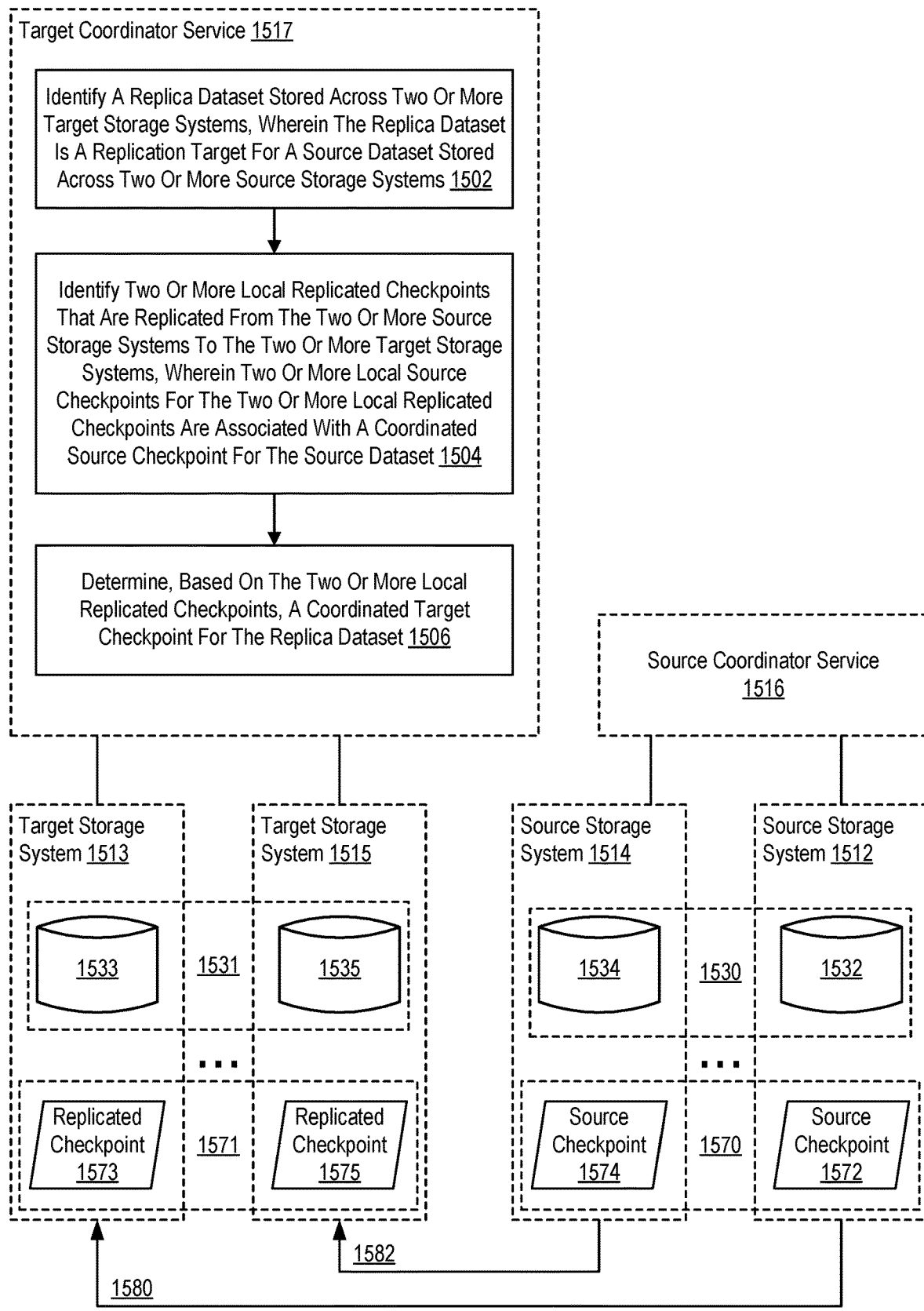
FIG. 15 sets forth a flow chart illustrating an example method for coordinated snapshots across multiple storage systems according to some embodiments of the present disclosure.

For further explanation FIG. 15 shows a flowchart of an example method for coordinated snapshots across multiple storage systems. The example depicted in FIG. 15 can include two or more source storage systems 1512, 1514 and a source dataset 1530 stored across the two or more storage systems 1512, 1514. The example depicted in FIG. 15 can also include two or more target storage system 1513, 1515 that store a replica dataset 1531 across the two or more target storage systems 1513, 1515. In this example the replica dataset 1531 is a replication target of the source dataset 1530. Each storage system, such as source storage systems 1512, 1514 and target storage systems 1513, 1515 in this particular example, may be similar to the storage systems described above, including any combination of the storage systems described above. In fact, source storage systems 1512, 1514 and target storage systems 1513, 1515 depicted in FIG. 15 may include the same, fewer, or additional components as the storage systems described above.

The example of FIG. 15 includes identifying 1502 a replica dataset 1531 stored across two or more target storage systems 1513, 1515, wherein the replica dataset 1531 is a replication target for a source dataset 1530 stored across two or more source storage systems 1512, 1514. In some examples, a target coordinator service 1517 identifies the replica dataset 1531 as a dataset for which the target coordinator service 1517 is tasked with orchestrating a coordinated target checkpoint for the replica dataset 1531 across the two or more target storage systems 1513, 1515. For example, the target coordinator service 1517 may be configured to coordinate the replica dataset 1531 by a user or administrator or some other management entity, the target coordinator service 1517 may discover the replica dataset 1531 based on monitoring of the target storage systems 1513, 1515, or the target coordinator service 1517 may identify the replica dataset 1531 based on a registration of the replica dataset with the target coordinator service 1517 by a target storage system or from a source coordinator service. As will be described in more detail below, a coordinated source checkpoint is replicated to the target storage systems 1513, 1515, and the target coordinator service 1517 coordinates the replicated checkpoint on the two or more target storage system 1513, 1515. In various implementations, the target coordinator service 1517 can be embodied as computer executable instructions that execute on processing resources of one of the target storage systems 1513, 1515, a management server, an administrative software plane, a cloud-based service, or on some other computing device.

The example of FIG. 15 can also include a source coordinator service 1516 that orchestrates a coordinated source checkpoint for the dataset 1530 across the two or more source storage systems 1512, 1514. In some examples, the source coordinator service 1516 and source storage systems 1512, 1514 are configured in the same way as, or similar to, the coordinator service 416 and the storage systems 412, 414 described above with respect to FIG. 4. Accordingly, in various examples, the source coordinator service 1516 can orchestrate a coordinated source checkpoint using any combination of the implementations and techniques described above with respect to FIGS. 4-14. In various implementations, the source coordinator service 1516 can be embodied as computer executable instructions that execute on processing resources of one of the source storage systems 1512, 1514, a management server, an administrative software plane, a cloud-based service, or on some other computing device.

In the example depicted in FIG. 15, the source dataset 1530 is coordinated across the two or more source storage system 1512, 1514. For example, a first portion 1532 of the source dataset 1530 is stored on source storage system 1512 and a second portion 1534 of the source dataset 1530 is stored on source storage system 1514. Thus, each source storage system 1512, 1514 stores a distinct local portion 1532, 1534 of the source dataset 1530. In some examples, the two or more source storage systems 1512, 1514 have different implementations and storage environments (although the storage systems 1512, 1514 being dissimilar is not a requirement for all embodiments of the present disclosure). For example, a storage system environment can implement a particular type of storage, such as block storage, file system storage, object storage, and database storage. In one non-limiting example, a source storage system 1512 can store a block volume that is a first portion 1532 of the dataset 1530 and another source storage system 1514 can store a file system that is a second portion 1534 of the dataset 1530. Thus, in some examples, the source storage systems 1512, 1514 can employ different storage environments to implement data types of storage.

In some examples, each source storage system 1512, 1514 is paired with a target storage system 1513, 1515 for replication of its local portion of the source dataset 1530 to its paired target storage system 1513, 1515. In some implementations, the source storage systems 1512, 1514 and the target storage systems 1513, 1515 are paired with respective replications links 1580, 1582, such as the replication link described above. The replication links 1580, 1582 can be representative of a communications path and replication protocol for replicating data of the local portions 1532, 1534 of source dataset 1530 from the source storage systems 1512, 1514 to the local portions of the replica dataset 1531 on the target storage systems 1513, 1515. In some examples, a replication link may specify a replication policy, where the replication policy may include or be exclusively snapshots, specify continuous, but not synchronous replication, or specify synchronous replication. A user may be provided with a single user interface, with a single workflow, for a replica link specification allowing for specification of one or more characteristics for data replication.

Thus, in some implementations, identifying 1502 a replica dataset 1531 stored across two or more target storage systems 1513, 1515, wherein the replica dataset 1531 is a replication target for a source dataset 1530 stored across two or more source storage systems 1512, 1514 may include determining which target storage systems store respective local portions 1533, 1535 of the replica dataset 1531, where respective local portions 1532, 1534 of the source dataset 1530 a replicated from the source storage systems 1512, 1514 to respective target storage systems 1513, 1515 through respective replication links 1580, 1582. Thus, in these examples, the local portions 1533, 1535 together constitute the replica dataset 1531 stored across the target storage systems 1513, 1515.

In the example depicted in FIG. 15, source storage system 1512 and target storage system 1513 form a replication pair through replication link 1580, in which the local portion 1533 of the replica dataset 1531 on target storage system 1513 is a replication target of the local source portion 1532 of source dataset 1530 on source storage system 1512. Likewise, source storage system 1514 and target storage system 1515 form a replication pair through replication link 1582, in which the local portion 1535 of the replica dataset 1531 on target storage system 1515 is a replication target of the local source portion 1534 of source dataset 1530 on source storage system 1514. In some examples, the replication links 1580, 1582 can utilize or implement different replication techniques. For example, source storage system 1512 and target storage system 1513 may implement snapshot-based replication through replication link 1580, whereas source storage system 1514 and target storage system 1515 may implement lightweight checkpoint replication through replication link 1582. In some examples, the replication frequency and timing with which local portions are replicated may be different across replication links 1580, 1582.

In some examples, the two or more target storage systems 1513, 1515 have different implementations and storage environments (although the target storage systems 1513, 1515 being dissimilar is not a requirement for all embodiments of the present disclosure). For example, a storage system environment can implement a particular type of storage, such as block storage, file system storage, object storage, and database storage. In one non-limiting example, a target storage system 1513 can store a block volume that is one local portion 1533 of the replica dataset 1531 and another target storage system 1515 can store a file system that is another local portion 1535 of the replica dataset 1531. Thus, in some examples, the source storage systems 1512, 1514 can employ different storage environments to implement data types of storage.

To illustrate the flexibility with which checkpoints can be coordinated across multiple disparate source storage systems and replicated to multiple disparate target storage systems, there may be an example where two source storage systems 1512, 1514 coordinating the source dataset 1530 implement different storage environments with respect to each other, the two source storage systems 1512, 1514 can implement different types of local checkpointing with respect to each other, and two replication links 1580, 1582 may implement different replication protocols with respect to each other. However, it should be recognized that any storage environments or replication techniques being dissimilar is not a requirement for all embodiments of the present disclosure.

The example method of FIG. 15 also includes identifying 1504 two or more local replicated checkpoints 1573, 1575 that are replicated from the two or more source storage systems 1512, 1514 to the two or more target storage systems 1513, 1515, wherein two or more local source checkpoints 1572, 1574 for the two or more local replicated checkpoints 1573, 1575 are associated with a coordinated source checkpoint 1570 for the source dataset 1530. In some examples, the source coordinator service 1516 orchestrates a coordinated source checkpoint 1570 for the source dataset 1530, for example, by coordinating local source checkpoints 1572, 1574 for local portions 1532, 1534 of the source dataset 1530 on each of the source storage systems 1512, 1514. In some implementations, the source coordinator service 1516 may orchestrate the coordinated source checkpoint 1570 as described above. For example, the coordinated source checkpoint 1570 is established using the message-based implementation described above and depicted in FIGS. 10-19. In another example, the coordinated source checkpoint 1570 is established using the clock-based implementation described above and depicted in FIG. 20. It will be recognized by those of skill in the art that other techniques for orchestrating a coordinated checkpoint for a dataset across multiple storage systems servicing respective portions of the dataset may be utilized without departing from the spirit of the present disclosure.

In some examples, through coordination with the source coordinator service 1516, each source storage system 1512, 1514 establishes a respective local source checkpoint 1572, 1574 for its local source portion 1532, 1534 of the source dataset 1530, where each local source checkpoint does not include any modification that could depend on a result of any other modification not included in another local source checkpoint 1572, 1574. When each of the source storage systems 1512, 1514 has established its local source checkpoint, the coordinated source checkpoint 1570 is recorded as complete by the coordinator service 1516. In one example, the local source checkpoints 1572, 1574 are snapshots of the respective local portions 1532, 1534 of the source dataset 1530, and the coordinated source checkpoint 1570 is a coordinated snapshot of the source dataset 1530 stored across the source storage systems 1512, 1514.

Subsequent to establishing the coordinated source checkpoint 1570, the local source checkpoints are replicated from each source storage system 1512, 1514 to the corresponding target storage system 1513, 1515 of each replicating pair. In some examples, the local checkpoints are delivered from the source storage system to the target storage system of a replicating pair using the mechanism employed by the particular replication link, which may include a variety of replication mechanisms that will be apparent to those of skill in the art. In some implementations, the local source checkpoints 1572, 1574 are replicated in response to a message from the source coordinator service 1516. For example, the message may be a message from the source coordinator service 1516 indicating that the coordinated source checkpoint has been successfully orchestrated across the set of source storage systems 1512, 1514. In response to such a message, the source storage systems 1512, 1514 may replicate their local source checkpoints to their paired target storage system. In other examples, the source coordinator service 1516 may send a separate message to the source storage systems 1512, 1514 specifically indicating that local source checkpoints associated with a coordinated checkpoint should be replicated. In some cases, the various local source checkpoints are replicated to the target storage systems at substantially different times, depending on the time a particular source storage system resolves its local checkpoint. Once replicated, the replicated checkpoints 1573, 1575 on each target storage system 1513, 1515 are stored in association with the respective local portions 1533, 1535 of the replica dataset 1531 that is local to that storage system.

In some examples, the target coordinator service 1517 identifies the local replicated checkpoints 1573, 1575 by monitoring the two or more target storage systems 1513, 1515 for the receipt of local replicated checkpoints and cataloging each local replicated checkpoint 1573, 1575 that is received by a particular target storage system 1513, 1515 from a local source storage system 1512, 1514. In some implementations, the target storage systems 1513, 1515 are monitored by inspecting the target storage systems 1513, 1515. For example, received checkpoints may be written to a data store for replicated checkpoints. In other implementations, the target storage systems 1513, 1515 are monitored by receiving messages from the target storage systems 1513, 1515 that report the receipt of a checkpoint. In such an example, the report may be a message indicating that the replicated checkpoint has been received and including identifying information for the replicated checkpoint. In some implementations, the target coordinator service 1517 catalogs the identified local replicated checkpoints 1573, 1575 in a data structure that associates each local replicated checkpoint with the local target storage system that received the checkpoint. In some examples, the local replicated checkpoints 1573, 1575 may be associated with identifying information such as a name, identifier, tag, or time value. Such identifying information may be included in metadata associated with the replicated checkpoint.

As described above, a set of consistent local checkpoints may be replicated from the set of source storage systems 1512, 1514 to the set of target storage systems 1513, 1515 through replicating pairs, potentially using different technologies and techniques of configuring for different replicating pairs. In implementations, consistency between a source dataset and a replica dataset may be ensured by relating local replication target checkpoints together as representing a consistent coordinated replica dataset 1531 or a consistent set of coordinated target checkpoints of a coordinated replica dataset 1531. Thus, in some examples, the target coordinator service 1517 manages the relationship between local replicated checkpoints 1573, 1575 on target storage systems that together form a coordinated target checkpoint 1571. In some implementations, a role of the target coordinator service 1517 is to relate consistent replicated images as a coordinated set of local images (local replicated checkpoints or local replicas) and to manage the consistent presentation and administration of individual (local) targets as if they were part of a coherent whole. It also may be a role of the target coordinator service 1517 to handle coordination in the face of separately faulted replicating pairs.

To that end, the example method of FIG. 15 also includes determining 1506, based on the two or more local replicated checkpoints 1573, 1575, a coordinated target checkpoint 1571 for the replica dataset 1531. In some examples, the target coordinator service 1517 determines 1506 the coordinated target checkpoint 1571 by relating two or more local replicated checkpoints 1573, 1575 as corresponding to the same coordinated source checkpoint 1570. For example, the cataloged local replicated checkpoints 1573, 1575 may be associated with information that relates the replicated checkpoints to the coordinated source checkpoint 1570, from which a relationship may be determined by the target coordinator service 1517. For example, the replicated checkpoints may include a name, identifier, tag, time value, or other information that relates the checkpoint to a coordinated source checkpoint. In some examples, this identifying information is attached to the local source checkpoints by the source storage systems 1512, 1514, which may associate their respective local source checkpoints 1572, 1574 with a name, tag, or time value. In some examples, the source coordinator service 1516 coordinates a name, tag, or time value that the source storage systems 1512, 1514 should use for their respective local source checkpoints 1572, 1574.

In some implementations, the target coordinator service 1517 receives information from the source coordinator service 1516 that may be used to relate the local replicated checkpoints 1573, 1575. For example, the source coordinator service 1516 may send a message to the target coordinator service 1517 indicating that a source checkpoint has been coordinated and including the name, tag, or time value associated with the coordinated source checkpoint, and perhaps even the names or identifiers of the local source checkpoints that have been or will be replicated. In other implementations, the target coordinator service 1517 relates the local replicated checkpoints 1573, 1575 by recognizing that a set of monitored replication target storage systems 1513, 1515 have received some or all parts of what appears to be a coordinated checkpoint, without any information from the source coordinator service 1516. For example, target coordinator service 1517 may identify that the monitored target storage systems 1513, 1515 have received local replicated checkpoints 1573, 1575 that are related by name, tag, identifier, and so on.

In some examples, the target coordinator service 1517 determines 1506 the coordinated target checkpoint 1571 by confirming that all local replicated checkpoints 1573, 1575 related to a coordinated source checkpoint 1570 have been received. In some examples, this is confirmed by determining a set of target storage systems 1513, 1515 that is expected to receive the replicated checkpoints 1573, 1575, and determining whether those local replicated checkpoints 1573, 1575 have been received. In some implementations, the set of storage systems expected to receive the replicated checkpoints can be determined based on information received by the target coordinator service 1517 from the source coordinator service 1516. For example, the source coordinator service 1516 may send a message to the target coordinator service 1517 indicating that a coordinated source checkpoint 1570 for the source dataset 1530 has been replicated and including an identifier of the source dataset 1530. In such an example, the target coordinator service 1517 can determine, based on a mapping of the source dataset identifier to a replica dataset identifier, which local target storage systems are expected to receive local replicated checkpoints for their portions of the replica dataset. In another example, the source coordinator service 1516 may indicate a set of source storage systems 1512, 1514 that have replicated local source checkpoints to their paired replication target storage systems, and the target coordinator service 1517 may identify, based on replication pair mappings, which target storage systems should have received local replicated checkpoints. In such an example, the target coordinator service 1517 may determine whether those target storage systems include a local replicated checkpoint that corresponds to the coordinated source checkpoint 1570.

Thus, replicas of all local source checkpoints 1572, 1574 corresponding to the coordinated source checkpoint 1570 are confirmed and recognized by the target coordinator service 1517 as completely received by paired local replication target storage systems 1513, 1515 in order to determine whether a coordinated target checkpoint 1571 can be considered complete. In the case of snapshot-based replication, for example, all local snapshots of a coordinated source snapshot may be confirmed and related together as representing the same coordinated snapshot by the source coordinator service 1516, and the completed receipt of all those related local source coordinated snapshots by their paired target systems are tracked and related together and confirmed by the target coordinator service 1517 before the coordinated snapshot can be considered completely replicated. The result is then a target-managed replica dataset 1531 that can be used as a consistent replicated image of the coordinated source dataset 1530, as an identifiable and usable coordinated replicated snapshot.

The use of snapshots as the mechanism for checkpointing and replication has the advantage that the checkpoints can be coordinated and replicated utilizing a variety of disparate technologies employed by the storage systems across which the dataset is stored, as the coordination is easily moved to an administrative control plane that is not dependent on specifics of the individual replication mechanisms, as long as there is some way to recognize the related local snapshots on the source storage systems such that the replicated images of those snapshots can be detected and related on the target storage systems. For example, the snapshots could be consistently named, numbered, or tagged, or their individual identities simply noted by the source coordinator service 1516 in a way that the names, numbers, tags, or individual identities can be communicated in such a way that the replicated snapshots can be recognized as a coordinated image by the target coordinator service 1517. The target coordinator service 1517 only needs to be able to determine the list of target storage systems expected to receive local replicated snapshots of a coordinated source snapshot, either by being informed directly (such as by the source coordinator service communicating this to the target coordinator service) or by the target coordinator recognizing that a set of monitored replication targets have received some or all parts of what appears to be a coordinated snapshot. This may be communicated to the target coordinator service 1517 from the source coordinator service 1516, or there may be a recognizable pattern in some identifiable characteristic of the received local snapshot replicas such as, for example, part of the name indicating that they were coordinated by the source coordinator service 1516 or relating to the name of the coordinated snapshot or replicated dataset.

In some examples, determining 1506 the coordinated target checkpoint 1571 includes persisting the relationship of the two or more local replicated checkpoints 1573, 1575 in a data structure such as a mapping table that maps the two or more local replicated checkpoints 1573, 1575 to the coordinated target checkpoint 1571. The target coordinator service 1517 may present the coordinated target checkpoint 1571 (e.g., through an administrative interface) as a checkpoint for the replica dataset 1531 stored across multiple target storage systems 1513, 1515 as if the multiple storage system 1513, 1515 were a coherent whole. Particularly, these target storage systems 1513, 1515 may differ in their storage implementations or storage environments. In one example, the coordinated target checkpoint 1571 is a coordinated replicated snapshot, where the coordinated replicated snapshot is a replica of a coordinated source snapshot of the source dataset 1530 stored across multiple source storage systems 1512, 1514.

In some implementations, determining 1506 the coordinated target checkpoint 1571 includes providing information about the coordinated target checkpoint 1571 to the target storage systems 1513, 1515. For example, the coordinated target checkpoint 1571 may confirm or indicate to the target storage systems 1513, 1515 that the coordinated target checkpoint 1571 has been established, or may provide information such as a name or other identifier for the coordinated target checkpoint 1571. In some implementations, in response to receiving confirmation that the coordinated target checkpoint 1571, a target storage system may persist the local replicated checkpoint for its local portion of the replica dataset 1531, or may mark the local replicated checkpoint to prevent the local replicated checkpoint from being discarded. In some implementations, in response to receiving a name or other identifier for the coordinated target checkpoint 1571, a target storage system may name or rename its local replicated checkpoint in accordance with the information provided by the target coordinator service 1517. In some examples, the information about the coordinated target checkpoint 1571 is provided in a message from the target coordinator service 1517 to the target storage systems 1513, 1515. In some implementations, the target coordinator service 1517 may confirm to the source coordinator service 1516 that the coordinated target checkpoint 1571 has been established.

Figure 16:
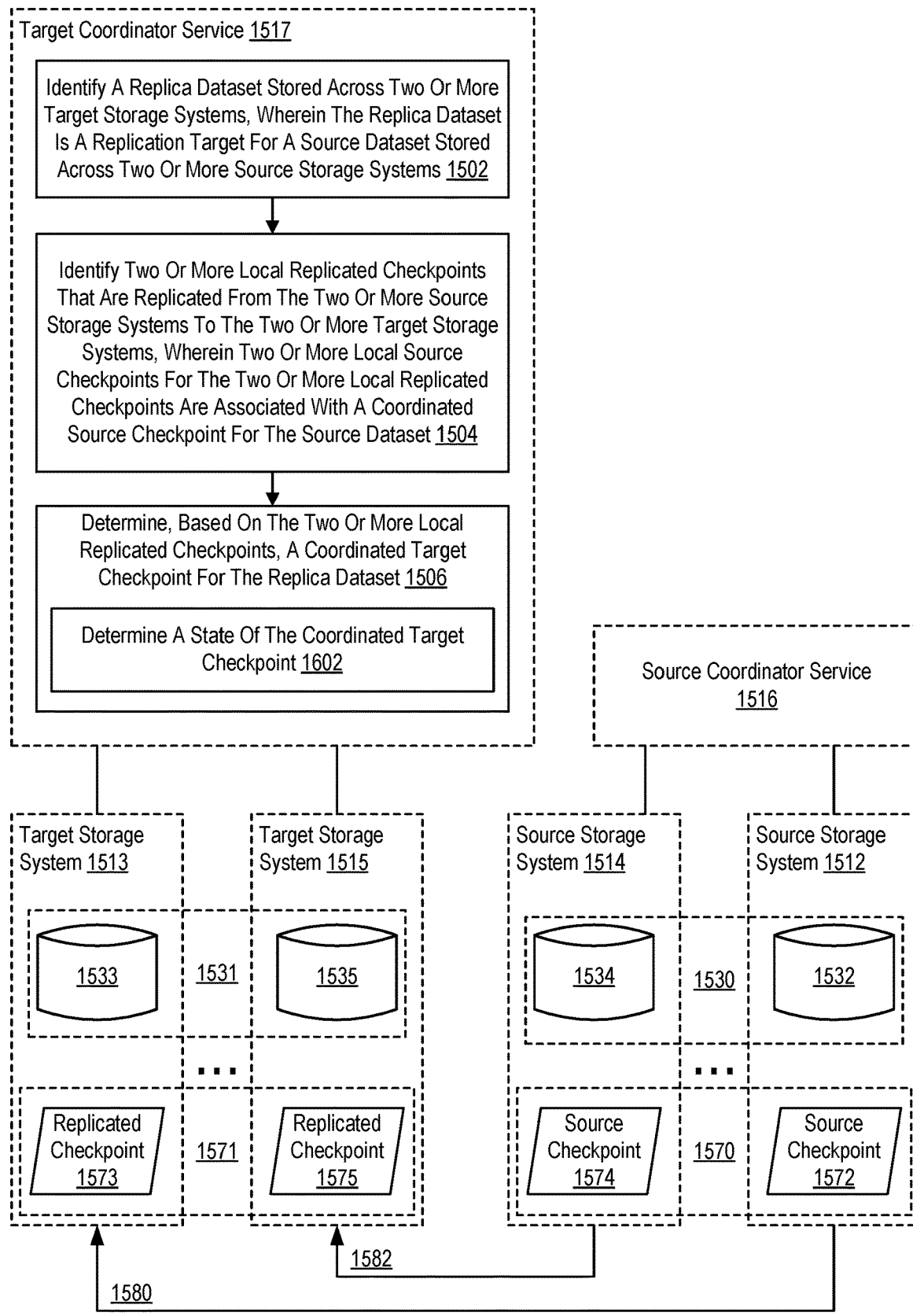
FIG. 16 sets forth a flow chart illustrating an additional example method for coordinated snapshots across multiple storage systems according to some embodiments of the present disclosure.

For further explanation, FIG. 16 sets forth another example method of coordinated snapshots across multiple storage systems in accordance with some embodiments of the present disclosure. The example depicted in FIG. 16 is similar to the example in FIG. 16 and may include many of the same elements as described above. However, in the example of FIG. 16, determining 1506, based on the two or more local replicated checkpoints 1573, 1575, a coordinated target checkpoint 1571 for the replica dataset 1531 includes determining 1602 a state of the coordinated target checkpoint 1571. In some implementations, the target coordinator service 1517 determines whether set of local replicated checkpoints 1573, 1575 constitutes a complete replica of the local source checkpoints 1572, 1574 of the coordinated source checkpoint 1570. For example, the target coordinator service 1517 may determine that all expected local replicated checkpoints 1573, 1575 have been received based on information received from the source coordinator service 1516 or based on a relationship of the local replicated checkpoints 1573, 1575 that can be inferred from information (e.g., names, tags, identifiers, etc.) associated with the local replicated checkpoints 1573, 1575. In such examples, the coordinated target checkpoint 1571 may be identified as complete and labeled as such.

However, faults can prevent the target coordinator service 1517 from establishing a complete coordinated target checkpoint 1571. For example, a fault in a local target storage system (or communications path thereto) may prevent the target coordinator service 1517 from confirming receipt of a replicated checkpoint. In another example, a fault in a replication link may prevent replication of a local source checkpoint (even if the coordinated source checkpoint was successful). In yet another example, a source-side fault may prevent the successful establishment of a complete coordinated source checkpoint. In some examples, the target coordinator service 1517 may identify faults based on reports provided by the target storage systems 1513, 1515, for example, indicating that a replication link has faulted or that an expected replicated checkpoint has not been receive after an elapsed period of time. In some examples, the target coordinator service 1517 may identify faults based on information provided by the source coordinator service 1516 such as, for example, an indication that a coordinate source checkpoint is incomplete or that a source storage system has faulted. In some examples, the target coordinator service 1517 may identify faults among the target storage systems, for example, based on the inability to communicate with a particular target storage system. However, in some cases, a coordinated target checkpoint 1571 may be incomplete due to a processing or communications delay, or due to a fault from which a recovery is expected. In such cases, the coordinated target checkpoint 1571 may be one that is simply waiting for completion. A coordinated target checkpoint that is not yet complete across all local replicating pairs of storage systems, but that are likely to complete soon, may be labeled as not yet complete or may not be presented (e.g., in an administrative interface) as a checkpoint at all while waiting to become complete across the target storage systems. Coordinated target checkpoints that are missing some pieces in the replicas may be identified and labeled as incomplete or partially faulted with a long enough wait or with a known faulted replication link.

In some implementations, the target coordinator service 1517 assigns a state to a coordinated target checkpoint 1571 based on the observed or expected completeness or incompleteness of the local replicated checkpoints 1573, 1575 that have been received by the target storage systems 1513, 1515, as well as reported faults in the coordination and replication of source checkpoints. In some implementations, the assigned state of the coordinated target checkpoint is presented to a user or administrator in an administrative interface.

In one example, a coordinated target checkpoint may be labeled as a complete coordinated target checkpoint when the target coordinator service 1517 has confirmed that all local target storage systems have received their respective local replicated checkpoint of the local source checkpoint of their paired sources.

In one example, a coordinated target checkpoint may be labeled as a waiting coordinated target checkpoint where some, but not all, local replicated checkpoints have been received and confirmed by the target coordinator service 1517. For example, communication delays or a recovery from a fault may result in a delay in receiving or confirming a local replicated checkpoint. The target coordinator service 1517 may wait for a period of time before determining that a fault or other error has occurred. In the absence of a reported fault, the target coordinator service 1517 may expect that the local replicated checkpoint will be received by the designated target storage system.

In one example, a coordinated target checkpoint may be labeled as an aborted coordinated target checkpoint where at least one of the source storage systems aborted the checkpoint coordination protocol. This could be communicated between replicating pairs or it could be communicated to the target coordinator service 1517 from the source coordinator service 1516. In some implementations, the source coordinator may handle this in such a way that any resulting local source checkpoints from the attempt at coordination will simply be ignored as coordinated target checkpoints.

In one example, a coordinated target checkpoint may be labeled as a completed partial coordinated target checkpoint if a source storage system had already faulted so it was no longer participating in coordinating with the source coordinator service 1516, and as such the coordinated source checkpoint itself is not complete and will not be complete. In that case, once all remaining non-faulted local source checkpoints have been replicated and confirmed to their paired target storage systems, the result is a completed partial coordinated checkpoint.

In one example, a coordinated target checkpoint may be labeled as a partially faulted coordinated target checkpoint where at least one expected local replicated checkpoint has not been received and confirmed due to some fault, or where the target coordinator service 1517 has given up on waiting. The fault could be a failure on a source storage system, on a target storage system, in the network between the two, or it could be a fault in communication with the target coordinator service 1517. This is potentially a temporary state for the coordinated target checkpoint. If the fault that is preventing the replication from being received and confirmed is repaired, then the particular coordinated target checkpoint could transition to a complete coordinated target checkpoint (or a completed partial coordinated target checkpoint). A subset of a partially faulted coordinated target checkpoint is a target checkpoint with a faulted local target storage system, which introduces additional issues as even out-of-date local replicated checkpoints cannot be accessed from the local target that is not available.

Figure 17:
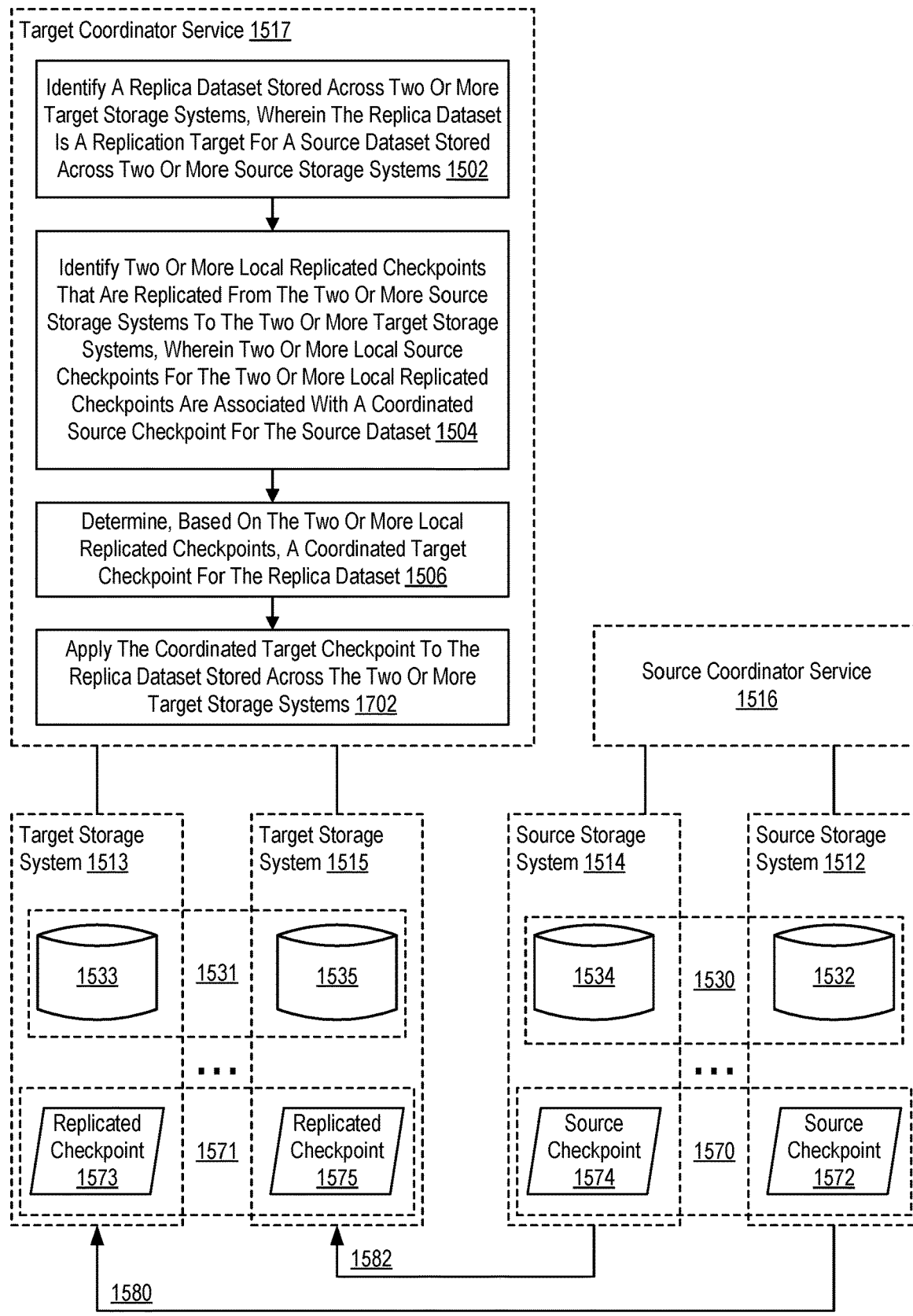
FIG. 17 sets forth a flow chart illustrating an additional example method for coordinated snapshots across multiple storage systems according to some embodiments of the present disclosure.

For further explanation, FIG. 17 sets forth another example method of coordinated snapshots across multiple storage systems in accordance with some embodiments of the present disclosure. The example depicted in FIG. 17 is similar to the example in FIG. 16 and may include many of the same elements as described above. However, the example method of FIG. 17 also includes applying 1702 the coordinated target checkpoint 1571 to the replica dataset 1531. In some examples, the target coordinator service 1517 applies the coordinated target checkpoint 1571 by sending a message (or otherwise indicating) to each target storage system 1513, 1515 that the respective local replicated checkpoints should be applied to the respective local portions 1533, 1535 of the replica dataset 1531. In response to the indication from the target coordinator service 1517, each target storage system 1513, 1515 applies the respective local replicated checkpoint 1573, 1575 that is associated with the coordinated target checkpoint 1571 the respective local portions 1533, 1535 of the replica dataset 1531. In some examples, a message to apply the checkpoint identifies which local replicated checkpoint(s) is associated with the coordinated target checkpoint 1571. In the case of lightweight or metadata-only checkpoints, the checkpoint may be applied by converting the checkpoint to a named, tagged or otherwise identifiable snapshot and persisting the snapshot. In the case of snapshot-based checkpoints, the checkpoint may be applied by naming, tagging, or otherwise labeling the snapshot and persisting the snapshot. It should be appreciated that the various replication links 1580, 1582 may employ different replication mechanisms; as such, it may be the case that one local replicated checkpoint is a metadata-only or lightweight checkpoint while another local replicated checkpoint is a snapshot. In some examples, the target coordinator service 1517 provides a name, tag, or other identifier that should be used to the label the snapshot.

Figure 18:
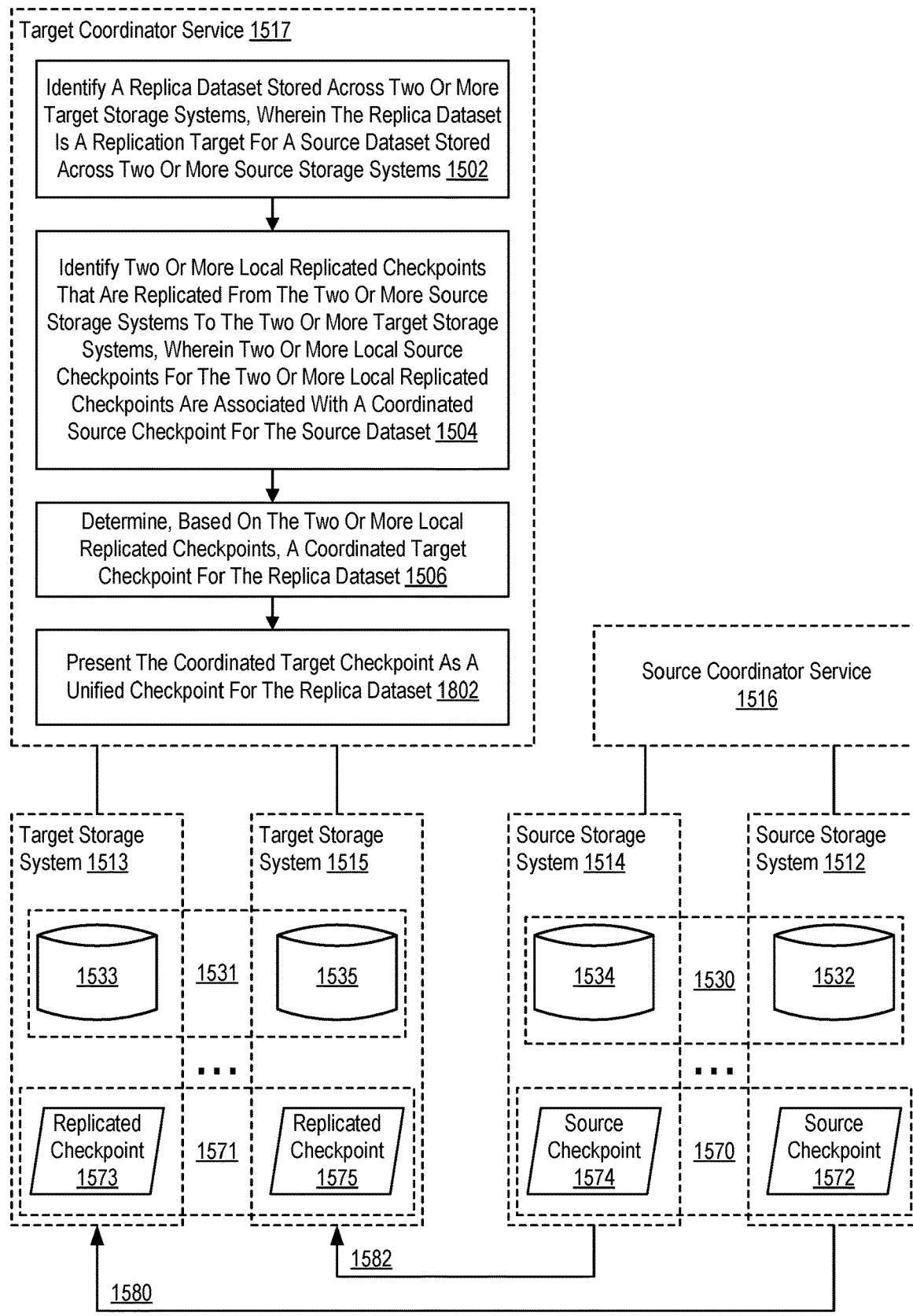
FIG. 18 sets forth a flow chart illustrating an additional example method for coordinated snapshots across multiple storage systems according to some embodiments of the present disclosure.

For further explanation, FIG. 18 sets forth another example method of coordinated snapshots across multiple storage systems in accordance with some embodiments of the present disclosure. The example depicted in FIG. 18 is similar to the example in FIG. 16 and may include many of the same elements as described above. However, the example method of FIG. 18 also includes presenting 1802 the coordinated target checkpoint 1571 as a unified checkpoint for the replica dataset 1531. In some example, the target coordinator service 1517 presents the composition of multiple local replicated checkpoints 1573, 1575 for the replica dataset 1531 as a single managed object representing a checkpoint for the replica dataset 1531. For example, the coordinated target checkpoint 1571 may be represented as a unitary checkpoint to a user in an administrative interface, or as a single object to a management service. In such an implementation, the fact that the coordinated target checkpoint 1571 is composed of multiple local replicated checkpoints, and that the replica dataset 1531 is composed of multiple local portions 1533, 1535 of the replica dataset 1531 stored across multiple storage systems, is obfuscated through the presentation of the coordinated target checkpoint 1571 as a single managed object.

For example, an administrative interface using the coordinated target checkpoint 1571 may provide a mechanism to make a clone of a coordinated replicated snapshot across all the source-target replicating pairs and across the various technologies employed by those source-target replicating pairs. An administrative interface using the coordinated target checkpoint 1571 may provide a mechanism to pause replication, pause the source dataset, and flush a last coordinated source checkpoint to the coordinated target storage systems 1513, 1515. An administrative interface using the coordinated target checkpoint 1571 may provide a mechanism to use a snapshot or clone of the replica dataset 1531 for fire drill testing purposes or for target-side analytics, development, or testing, or for disaster failover purposes. In some examples, the administrative interface may provide a mechanism to reverse replication such that coordinated source and coordinated target are swapped. In some examples, the administrative interface may provide state information to allow a user or management entity to contend with incomplete or partial coordinated target checkpoints, particularly in the case of complex partial failures, crashes or network disconnects, or individual recoveries or reconnects that might recover a source-target pair at a later time, possibly finally replicating a local replicated checkpoint that may have been delayed by the crash or network disconnect. For example, the coordinated target checkpoint 1571 may be presented with an associated state, as described above.

Figure 19:
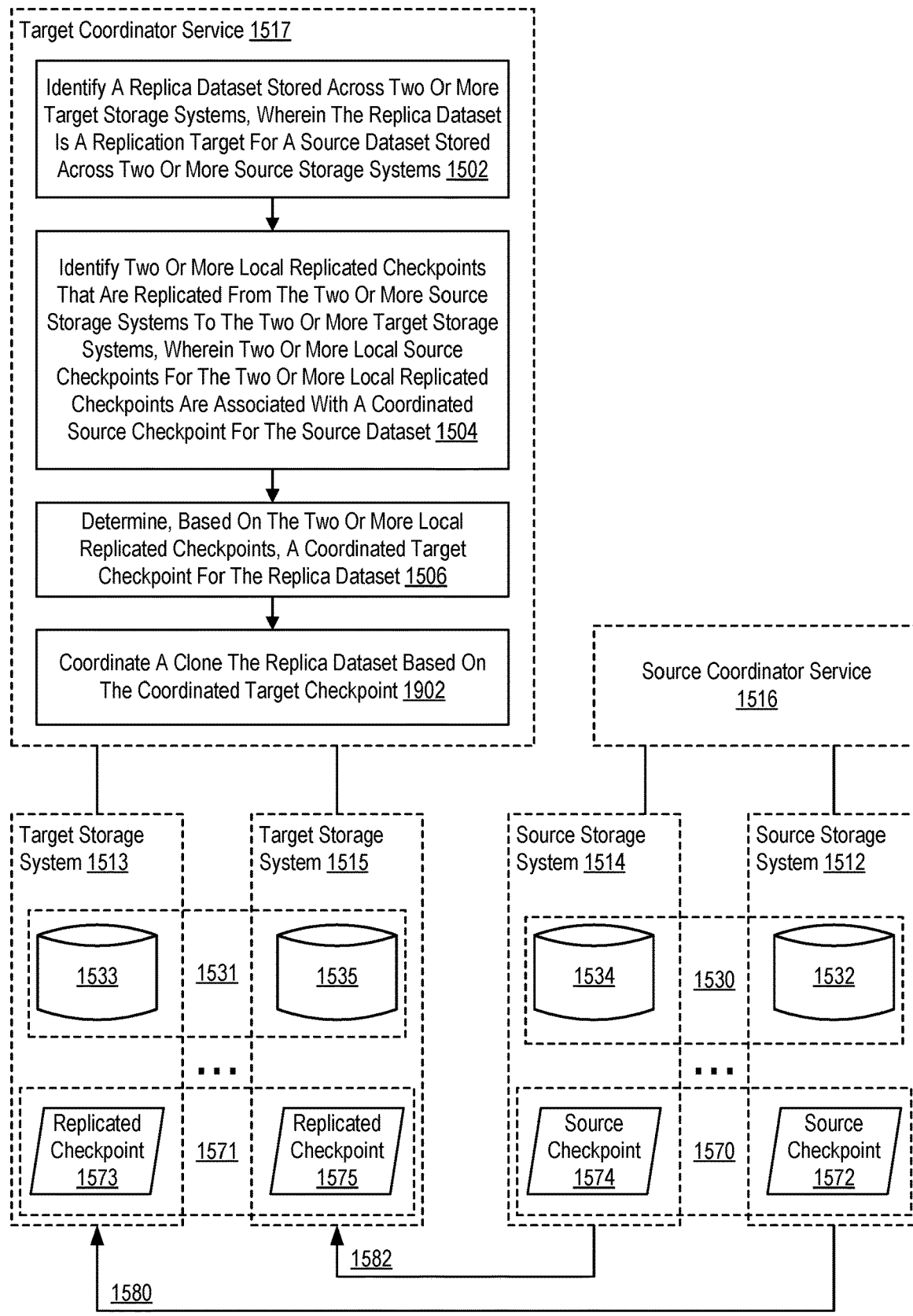
FIG. 19 sets forth a flow chart illustrating an additional example method for coordinated snapshots across multiple storage systems according to some embodiments of the present disclosure.

For further explanation, FIG. 19 sets forth another example method of coordinated snapshots across multiple storage systems in accordance with some embodiments of the present disclosure. The example depicted in FIG. 19 is similar to the example in FIG. 16 and may include many of the same elements as described above. However, the example method of FIG. 19 also includes coordinating 1902 a clone of the replica dataset 1531 based on the coordinated target checkpoint 1571. In some scenarios, the target coordinator service 1517 may receive a request to create a clone based on the coordinated target checkpoint, for example, for fire drill testing, failover, or development, testing, and analytics. In such cases, the target coordinator service 1517 may coordinate a clone by sending a message (or otherwise indicating) to each target storage system 1513, 1515 to clone their respective local replicated checkpoints 1573, 1575 for the replica dataset 1531. In response to the indication from the target coordinator service 1517, if the local replicated checkpoint is a lightweight checkpoint, the target storage system 1513, 1515 converts its respective local replicated checkpoint 1573, 1575 to a local snapshot and clones the snapshot to create a local clone. If the local replicated checkpoint is a snapshot, the target storage system 1513, 1515 clones the local snapshot to create a local clone. The target coordinator service 1517 may track the local clones created by the target storage systems 1513, 1515 and present the local clones as a unified coordinated clone dataset that is a clone of the coordinated replica dataset.

Figure 20:
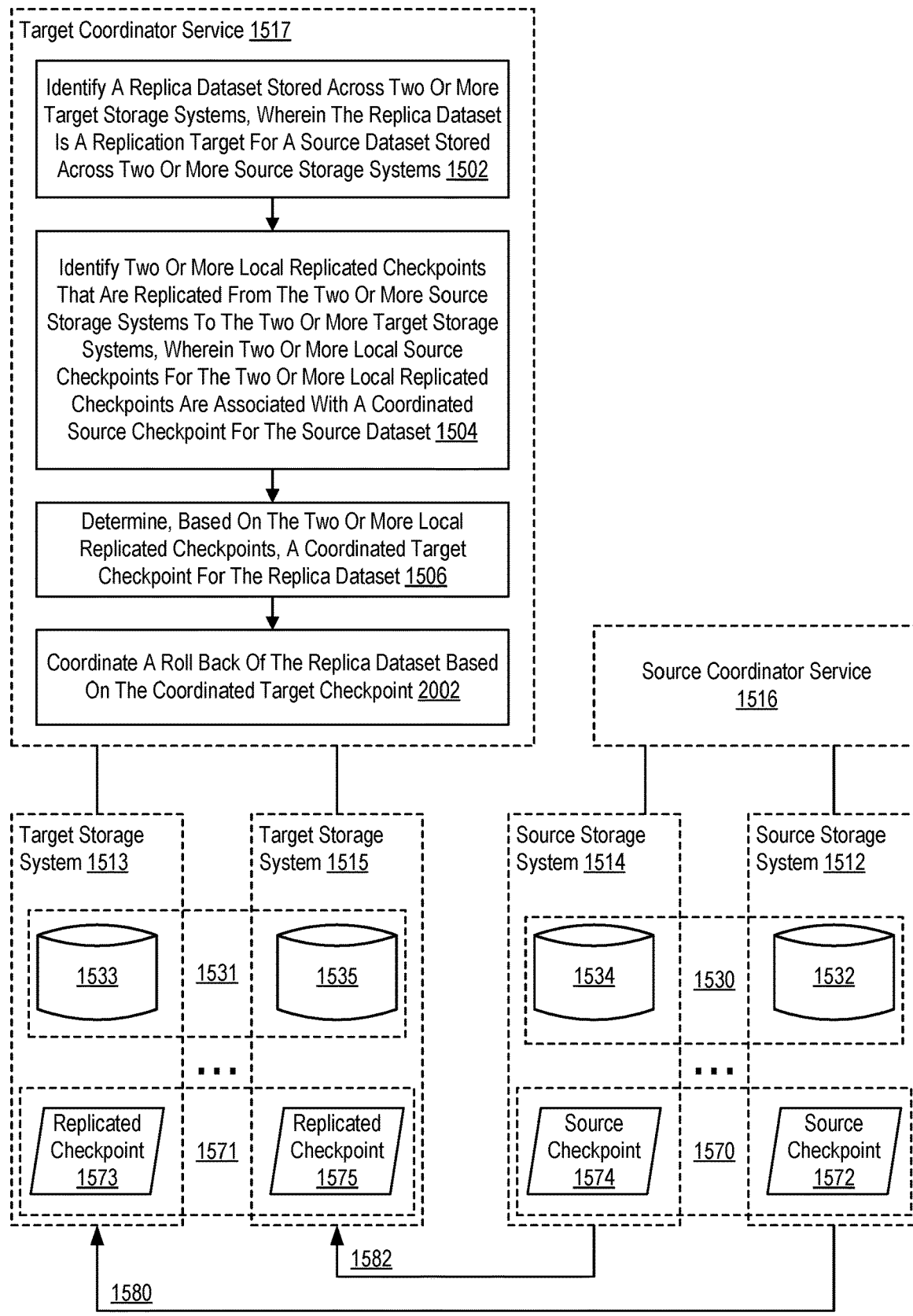
FIG. 20 sets forth a flow chart illustrating an additional example method for coordinated snapshots across multiple storage systems according to some embodiments of the present disclosure.

For further explanation, FIG. 20 sets forth another example method of coordinated snapshots across multiple storage systems in accordance with some embodiments of the present disclosure. The example depicted in FIG. 20 is similar to the example in FIG. 16 and may include many of the same elements as described above. However, the example method of FIG. 20 also includes coordinating 2002 a roll back of the replica dataset 1531 based on the coordinated target checkpoint 1571. In some scenarios, the target coordinator service 1517 may receive a request to roll back the replica dataset 1531 to coordinated target checkpoint. In such cases, the target coordinator service 1517 may coordinate the roll back by sending a message (or otherwise indicating) to each target storage system 1513, 1515 to roll back their respective local portions 1533, 1535 of the replica dataset 1531 to respective local replicated checkpoints 1573, 1575 associated with the coordinated target checkpoint 1571. In response to the indication from the target coordinator service 1517, each target storage system 1513, 1515 rolls back its respective local portion 1533, 1535 of the replica dataset 1531 to a local replicated checkpoint 1573, 1575 associated with the coordinated target checkpoint 1571. For example, a message from the target coordinator service 1517 may specify a local replicated checkpoint on each target storage system that should be used for the roll back, or each target storage system may map local replicated checkpoints to previously established coordinated target checkpoints.

The above-described coordinated checkpoint model is amenable to environments that use multiple technologies to maintain and replicate a dataset, particularly where snapshots are used as checkpoints for replication. Such environments may employ different storage environments, storage formats, replication mechanism, and replication policies among different replication pairs for a dataset, where each replication pair replicates a portion of the dataset. Moreover, snapshots can generally be paired with some form of optimized replication, even if it is just based on sending differences from one snapshot to the next to some target to be applied in some simple manner, or even if (for file systems) based on just running the open-source rsync to send files that have changed since the last snapshot. As long as these snapshots can be replicated on a replication target storage systems, and as long as the original snapshots can themselves be coordinated by the source coordinator, the coordinated replication implementations described above can be used across multiple technologies where each technology provides a mechanism for establishing snapshots (and coordinating them with a checkpoint coordinator), and where it can be determined when the contents of a source snapshot have been replicated to a paired target, and where a target coordinator can match up a replica with a coordinated source checkpoint. In these cases, the coordinated replicated snapshot may allow for the cloning, snapshotting, and/or roll back a replica dataset.

In some implementations, to alleviate the vulnerability of the target coordinator service 1517, the target coordinator service 1517 may be made into a highly available service with failover, or by tying it to some highly available service such as Etcd or some other highly available key-value store. The target coordinator service 1517 may also run on one or more of the target storage systems 1513, 1515 either as a highly available service on those systems or as a clustered service that runs on multiple systems with fault handling.

Figure 21:
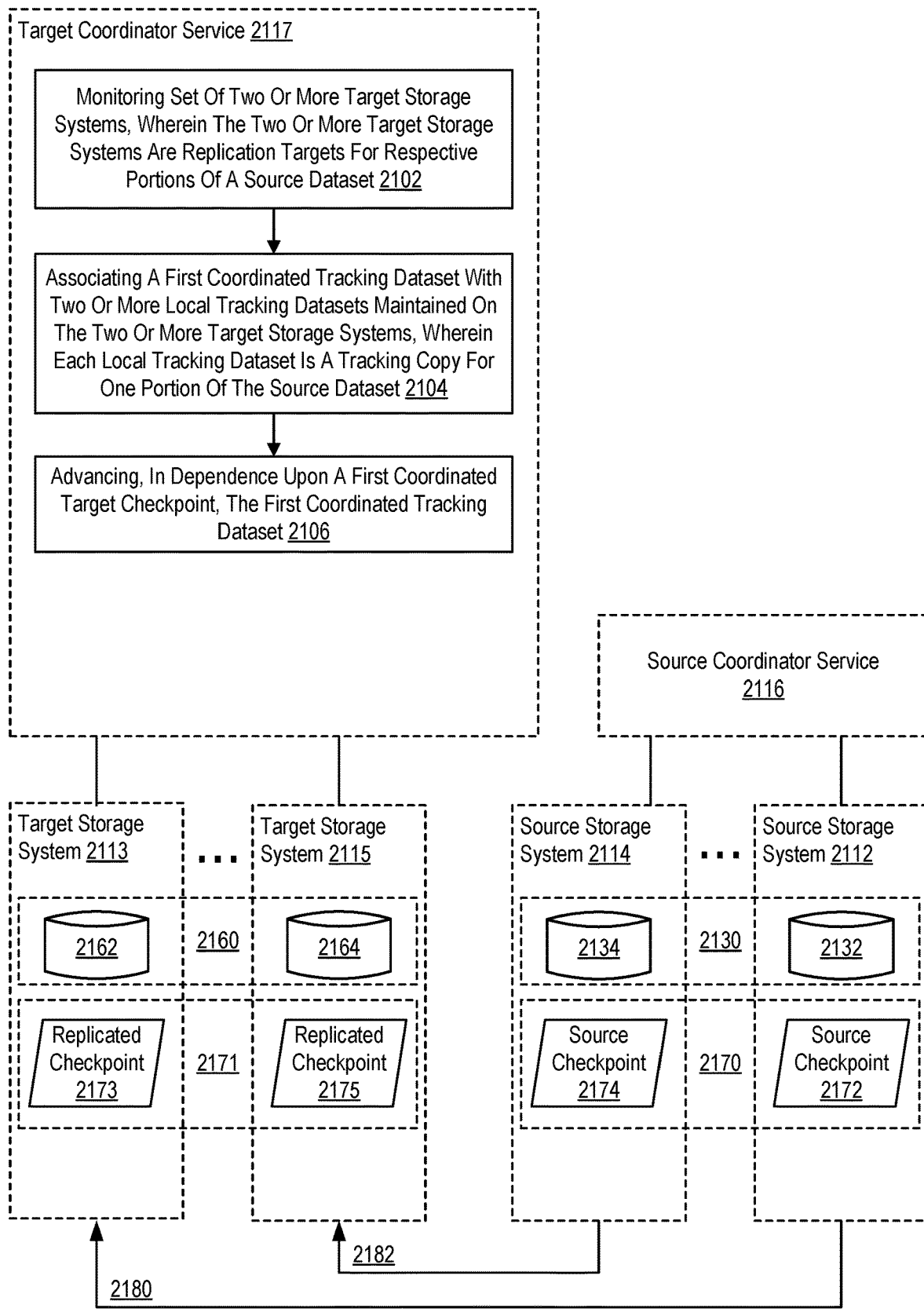
FIG. 21 sets forth a flow chart illustrating an example method for coordinated snapshots among storage systems implementing a promotion/demotion model according to some embodiments of the present disclosure.

For further explanation FIG. 21 shows a flowchart of an example method for coordinated snapshots among storage systems implementing a promotion/demotion model. The example depicted in FIG. 21 can include two or more source storage systems 2112, 2114 and a source dataset 2130 stored across the two or more storage systems 2112, 2114. The example depicted in FIG. 21 can also include two or more target storage system 2113, 2115 that are replication targets for the source dataset 2130. Each storage system, such as source storage systems 2112, 2114 and target storage systems 2113, 2115 in this particular example, may be similar to the storage systems described above, including any combination of the storage systems described above. In fact, source storage systems 2112, 2114 and target storage systems 2113, 2115 depicted in FIG. 21 may include the same, fewer, or additional components as the storage systems described above.

In the example depicted in FIG. 21, the source dataset 2130 is coordinated across the two or more source storage system 2112, 2114. For example, a first portion 2132 of the source dataset 2130 is stored on source storage system 2112 and a second portion 2134 of the source dataset 2130 is stored on source storage system 2114. Thus, each source storage system 2112, 2114 stores a distinct local portion 2132, 2134 of the source dataset 2130. In some examples, the two or more source storage systems 2112, 2114 have different implementations and storage environments (although the storage systems 2112, 2114 being dissimilar is not a requirement for all embodiments of the present disclosure). For example, a storage system environment can implement a particular type of storage, such as block storage, file system storage, object storage, and database storage. In one non-limiting example, a source storage system 2112 can store a block volume that is a first portion 2132 of the dataset 2130 and another source storage system 2114 can store a file system that is a second portion 2134 of the dataset 2130. Thus, in some examples, the source storage systems 2112, 2114 can employ different storage environments to implement data types of storage.

In some examples, the two or more target storage systems 2113, 2115 have different implementations and storage environments (although the storage systems 2113, 2115 being dissimilar is not a requirement for all embodiments of the present disclosure). For example, a storage system environment can implement a particular type of storage, such as block storage, file system storage, object storage, and database storage. In one non-limiting example, a target storage system 2113 can implement block storage to replicate a portion of the source dataset 2130 another target storage system 2115 can implement file storage to replicate another portion of the source dataset 2130. Thus, in some examples, the target storage systems 2113, 2115 can employ different storage environments to implement data types of storage.

In some examples, each source storage system 2112, 2114 is paired with a target storage system 2113, 2115 for replication of its local portion of the source dataset 2130 to its paired target storage system 2113, 2115. In some implementations, the source storage systems 2112, 2114 and the target storage systems 2113, 2115 are paired with respective replications links 2180, 2182, such as the replication link described above. The replication links 2180, 2182 can be representative of a communications path and replication protocol for replicating data of the local portions 2132, 2134 of source dataset 2130 from the source storage systems 2112, 2114 to the target storage systems 2113, 2115. In some examples, a replication link may specify a replication policy, where the replication policy may include or be exclusively snapshots, specify continuous, but not synchronous replication, or specify synchronous replication. A user may be provided with a single user interface, with a single workflow, for a replica link specification allowing for specification of one or more characteristics for data replication.

In the example depicted in FIG. 21, source storage system 2112 and target storage system 2113 form a replication pair through replication link 2180. Likewise, source storage system 2114 and target storage system 2115 form a replication pair through replication link 2182. In some examples, the replication links 2180, 2182 can utilize or implement different replication techniques. For example, source storage system 2112 and target storage system 2113 may implement snapshot-based replication through replication link 2180, whereas source storage system 2113 and target storage system 2115 may implement lightweight checkpoint-based replication through replication link 2182. In some examples, the replication frequency and timing with which local portions are replicated may be different across replication links 2180, 2182.

The example of FIG. 21 may include a source coordinator service 2116 that orchestrates a coordinated source checkpoint for the dataset 2130 across the two or more source storage systems 2112, 2114. In some examples, the source coordinator service 2116 may be similar to implementations of the coordinator service 416 described above with reference to FIGS. 4-14 and/or implementations of the source coordinator service 1516 described above with reference to FIGS. 15-20. Accordingly, in various examples, the source coordinator service 2116 may orchestrate a coordinated source checkpoint using any combination of the implementations and techniques described above with respect to FIGS. 4-20. In various implementations, the source coordinator service 2116 can be embodied as computer executable instructions that execute on processing resources of one of the source storage systems 2112, 2114, a management server, an administrative software plane, a cloud-based service, or on some other computing device.

In some implementations, through coordination with the source coordinator service 2116, each source storage system 2112, 2114 establishes a respective local source checkpoint 2172, 2174 for its local source portion 2132, 2134 of the source dataset 2130, where each local source checkpoint does not include any modification that could depend on a result of any other modification not included in another local source checkpoint 2172, 2174. When each of the source storage systems 2112, 2114 storing a portion of the source dataset 2130 has established its local source checkpoint, the local source checkpoints 2172, 2174 are persisted by the source storage systems 2112, 2114 and the coordinated source checkpoint 2170 is recorded as complete by the coordinator service 2116, which may present the coordinated local source checkpoints 2172, 2174 as a single coordinated checkpoint for the source dataset 2130. In one example, the local source checkpoints 2172, 2174 are snapshots of the respective local portions 2132, 2134 of the source dataset 2130, and the coordinated source checkpoint 2170 is a coordinated snapshot of the source dataset 2130 stored across the source storage systems 2112, 2114.

Subsequent to establishing the coordinated source checkpoint 2170, the local source checkpoints 2172, 2174 associated with the coordinated source checkpoint 2170 are replicated from each source storage system 2112, 2114 to the corresponding target storage system 2113, 2115 of each replicating pair. In some examples, the local checkpoints are delivered from the source storage system to the target storage system of a replicating pair using the mechanism employed by the particular replication link, which may include a variety of replication mechanisms that will be apparent to those of skill in the art.

The example method of FIG. 21 includes monitoring 2102 set of two or more target storage systems 2113, 2115, wherein the two or more target storage systems 2113, 2115 are replication targets for respective portions 2132, 2134 of a source dataset 2130. In some examples, the target coordinator service 2117 monitors the target storage systems 2113, 2115 by monitoring local replicated checkpoints 2173, 2175 that have been received by the target storage systems 2113, 2115. In some implementations, the target coordinator service 2117 is configured for communication with the two or more target storage systems 2113, 2115, for example, by the transmission of messages using a standard communication protocol over one or more networks. In some implementations, the target coordinator service 2117 may be similar to implementations of the target coordinator service 1517 described above with reference to FIGS. 15-20.

In some implementations, the target storage systems 2113, 2115 are monitored by inspecting or querying the target storage systems 2113, 2115 to discover replicated checkpoints. In other implementations, the target storage systems 2113, 2115 are monitored by receiving checkpoint reporting from the target storage systems 2113, 2115. For example, each target storage system 2113, 2115 may report to the target coordinator service 2117 that a replicated checkpoint has been received. In such an example, the report may be a message indicating that the replicated checkpoint has been received and including identifying information for the replicated checkpoint. In some implementations, the target coordinator service 2117 receives information relating to the coordinated source checkpoint 2170, such as an indication that a coordinated source checkpoint has been established, an indication that the local source checkpoints have been replicated, an indication of which source storage systems replicated their local checkpoints, an indication of which target storage systems should have received local replicated checkpoints, and/or information identifying the local source checkpoints, such as a name, identifier, or tag associating the local source checkpoints with the coordinated source checkpoint. As described above, the target coordinator service 2117 may relate local replicated checkpoints to determine a coordinated target checkpoint.

In some examples, the target coordinator service 2117 monitors the target storage systems 2113, 2115 by monitoring local tracking datasets 2162, 2164 on the target storage systems 2113, 2115. For example, the target storage systems 2113, 2115 may report or identify local tracking datasets 2162, 2164 that are maintained by that target storage system. The target storage systems 2113, 2115 may report when a local tracking dataset 2162, 2164 has been advanced in association with a local replicated checkpoint that has been confirmed by the target coordinator service 2117. Further, the target coordinator service 2117 may track which local tracking datasets have been generated from, or are associated with, a coordinated target checkpoint. In some examples, as will be described in more detail below, a particular target storage system may maintain multiple tracking datasets for the same portion of the source dataset 2130.

In various implementations, lightweight checkpoints or snapshots are utilized to advance the local tracking datasets 2162, 2164. For example, lightweight checkpoints may include content identifier for data that has been replicated from a source storage system to a target storage system. Updates associated with a local lightweight checkpoint for a portion of the source dataset may be replayed by a target storage system to advance a local tracking dataset for that portion of the source dataset. In some implementations, some or all of the local tracking datasets 2162, 2164 are hidden snapshots that are used to track the updates to the portion of the source dataset. The target storage system updates the local tracking dataset to a new snapshot when that new snapshot is associated with a confirmed local replicated checkpoint. In these implementations described above, a target storage system utilizes designated local tracking datasets for tracking updates to the source dataset and for generating a replica dataset that is a version of the source dataset. However, in other implementations, a target storage system may not utilize a designated tracking dataset. Instead, the target storage system may simply receive snapshots that include differential updates to the source dataset, without an internal mechanism for optimizing replication using a tracking dataset. In such implementations, the target coordinator service 2117 may itself designate which snapshot on the target storage system is the local tracking dataset for that target storage system (in accordance with a particular coordinated target checkpoint) and record that designation, for example, by associating the name of the snapshot with the coordinated target checkpoint. It should be appreciated that the manner in which tracking datasets are employed by the target storage systems 2113, 2115 may vary from storage system to storage system. For example, a first target storage system may implement block-based volume storage and employ a tracking volume as a tracking dataset for replicated updates to a source volume of a source dataset 2130, while a second target storage system may implement file-based storage and employ snapshots to track replicated files in the source dataset 2130 that have changed since the last snapshot. In such an example, a snapshot based on the tracking dataset in the first storage system can be related with a snapshot based on file system differentials on the second storage system as corresponding to a coordinated target checkpoint.

The example of FIG. 21 also includes associating 2104 a first coordinated tracking dataset 2160 with two or more local tracking datasets 2162, 2164 maintained on the two or more target storage systems 2113, 2115, wherein each local tracking dataset 2162, 2164 is a tracking copy for one portion 2132, 2134 of the source dataset 2130. In some examples, a coordinated tracking dataset 2160 is an object that relates the local tracking datasets 2162, 2164 of the replication target storage systems 2113, 2115, where each local tracking dataset 2162, 2164 tracks a portion of the source dataset 2130 and may be updated in accordance with a particular coordinated target checkpoint. In some implementations, the coordinated tracking dataset may be embodied by a data structure that identifies the local tracking datasets 2162, 2164, for example, by a name, identifier, tag, time value, or other identifying information associated with the local tracking dataset 2162, 2164. In some examples, the target coordinator service 2117 associates a local tracking dataset with a coordinated tracking dataset by adding the name, identifier, or tag associated with the local tracking dataset to the data structure that embodies the coordinated tracking dataset 2160. As will be described in more detail below, the target coordinator service 2117 may manage multiple coordinated tracking datasets in accordance with multiple coordinated target checkpoints.

In some cases, where a tracking dataset model is native to the target storage system and is managed internally, names or identifiers of the internally-managed local tracking datasets may be reported to the target coordinator service 2117 by the target storage systems 2113, 2115. For example, the local tracking dataset may be reflected by a snapshot that is replaced by a newer snapshot as it is received by the target storage system. In one example, a target storage system may report the name of the local tracking dataset after it has been advanced in accordance with a coordinate target checkpoint. In other case, where a tracking dataset model is not native to the target storage system, the target coordinator service 2117 manages which snapshot received by a particular target storage system is designated as the tracking dataset. For example, the target coordinator service 2117 may identify a local snapshot that has been received by a target storage system as a replicated checkpoint associated with a coordinated target checkpoint. The target coordinator service 2117 may designate that local snapshot as the local tracking dataset for that storage system, and then relate the local tracking dataset to a coordinated tracking dataset 2160 that is associated with the coordinated target checkpoint. In some implementations, as part of coordinating the coordinated target checkpoint, the target coordinator service 2117 selects a name, identifier, or tag for the coordinated tracking dataset 2160 and indicates that the target storage systems should apply the name, identifier, or tag to the respective local tracking datasets. In some examples, this identifying information corresponds to identifying information for the local replicated checkpoint and/or the coordinated target checkpoint.

The method of FIG. 21 also includes advancing 2106, in dependence upon a first coordinated target checkpoint 2171, the first coordinated tracking dataset 2160. In some examples, the target coordinator service 2117 advances the coordinated tracking dataset 2160 by updating a data structure for the coordinated tracking dataset 2160 to include identifying information of local tracking datasets that have updated in response to a coordinated target checkpoint. In some examples, the target coordinator service 2117 determines a coordinated target checkpoint 2170 as discussed above. As previously described, a local replicated checkpoint may be a snapshot, a lightweight (e.g., metadata-only) checkpoint, or some other checkpoint. In some examples, the target storage systems 2113, 2115 report that a local replicated checkpoint has been received, and may include the name of the local source checkpoint, name of the coordinated source checkpoint, or other identifying information.

In some implementations, once the target coordinator service 2117 has related the local replicated checkpoints together as a coordinated target checkpoint, the target coordinator service 2117 may send a confirmation message to the target storage systems 2113, 2115 indicating that the coordinated target checkpoint is confirmed and that the local replicated checkpoints should not be discarded. The confirmation message may also indicate a name or other identifying information that the target storage systems should associate with the local target checkpoints. For example, if the replicated checkpoint is a snapshot, the message may indicate a name that should be used to rename the snapshot. If the replicated checkpoint is a lightweight checkpoint, the message may indicate a name that should be used to rename lightweight checkpoint and/or name a snapshot generated from the lightweight checkpoint.

In some examples, where a target storage system implements a native or internally-managed local tracking dataset, that target storage system may advance its local tracking dataset in response to the confirmation message. In variations of these examples, a target storage system may wait until the receipt of another message indicating that the local tracking dataset should be advanced. The storage system may report the name or other identifying information of the local tracking dataset to the target coordinator service 2117 or may rename the local tracking dataset in accordance with information provided by the target coordinator service 2117. In examples where a target storage system does not internally manage a local tracking dataset, the target coordinator service 2117 may advance the local tracking dataset of that storage system by replacing identifying information of a previous snapshot with identifying information of a new snapshot in the data structure that embodies the coordinated tracking dataset 2160.

Thus, in some examples, once the target coordinator service 2117 has collected the identifying information of all local tracking datasets 2162, 2164 that were updated in response to confirmation of a coordinated target checkpoint 2170, the target coordinator service 2117 advances 2106 the coordinated tracking dataset 2160 by replacing a previous catalog of local tracking datasets with a new catalog of updated local tracking datasets 2162, 2164. In other examples, the target coordinator service 2117 advances 2106 the coordinated tracking dataset 2160 by updating a data structure with pointers to updated local tracking datasets 2162, 2164, which replace pointers to previous local tracking datasets.

In some examples, the first coordinated target checkpoint 2170 may be a complete coordinated target checkpoint, in that all local target storage systems 2113, 2115 that replicate the source dataset 2130 received checkpoints from their paired source storage systems, and that those checkpoints were confirmed and related by the target coordinator service 2117. However, there may be instances where a coordinated target checkpoint is incomplete due to faults or partial datasets being replicated. Thus, in some cases, it may be advantageous to track complete coordinated datasets, partial datasets, and faulted datasets separately. This may result in multiple types of coordinated tracking datasets, such as a complete coordinated tracking dataset, a partial coordinated tracking dataset, and a partially faulted coordinated tracking dataset, based on the state of the coordinated checkpoint (such as those discussed above) that was used to construct the coordinated tracking dataset. In this way, the most recent known complete coordinated checkpoint can be made available, as can the most recent known coordinated checkpoint that is missing one out of several faulted sources if it is more recent than the last complete coordinated checkpoint, as can the most up-to-date non-waiting checkpoint no matter how much is missing due to faults. In fact, subsets of faulted sources or faulted replicating pairs can be tracked to provide the most recent coordinated checkpoint for different subsets of replicating pairs (or perhaps for each pair, the target coordinator service 2117 may record the most recent complete, partial or faulted checkpoint that includes that a confirmed local replicated checkpoint for that pair). Thus, there could actually be multiple partial or partially faulted coordinated tracking datasets. In some implementations, the target coordinator service 2117 assigns a time value to each of these "most recent of this type" versions of a coordinated tracking dataset, so that personnel and tools can query and visualize how far behind the various separate versions might be.

To track and coordinate these various types of coordinated tracking dataset, the target coordinator service 2117 may require that a variety of checkpoints be retained where they are part of one of one of the most recent incomplete checkpoints of the various types mentioned above. When all source checkpoint coordination and replication is performing normally and there are no faults, a single (complete) coordinated tracking dataset advances with each most recent complete coordinated checkpoint. In the presence of faults, different types of tracking datasets may become available based on the particular combinations of faults, as described above. In some cases, using one of the various types of partial checkpoints might involve substituting a most recent checkpoint prior to the partial checkpoint for each of the missing pairs in order to construct a complete tracking dataset even if the result is not consistent. However, such inconsistent substitution might not be possible in the case of a faulted target storage system that is not communicating with the target coordinator service 2117.

In some implementations, when a coordinated target is contending with any type of partial dataset due to faults, the target coordinator service 2117 may signal alarms or provide other types of notifications to monitoring equipment or personnel to indicate a concern, particularly if replication is being used for disaster recovery. For example, an administrative tool can indicate how far behind the most recent complete coordinated target checkpoint currently is.

Figure 22:
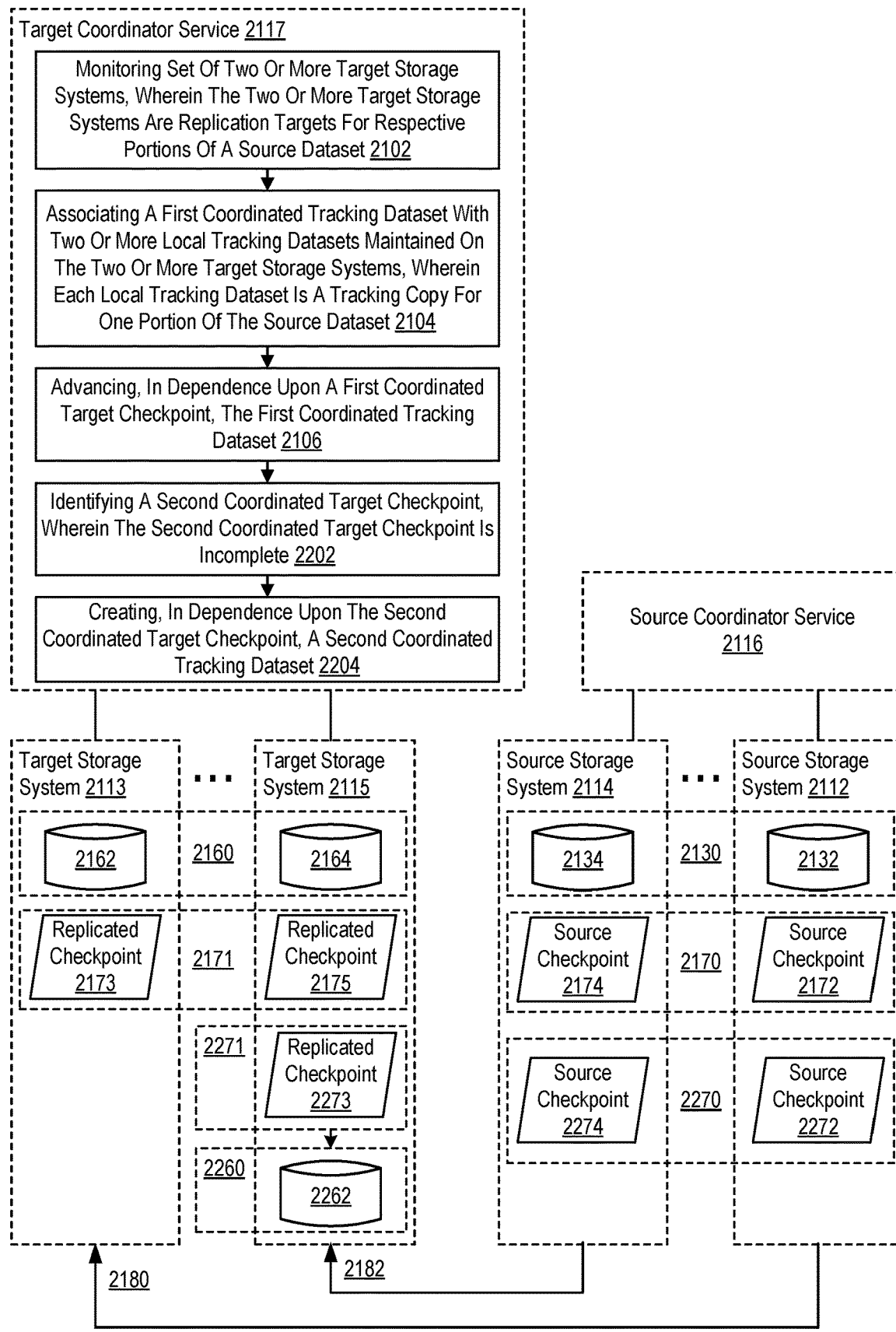
FIG. 22 sets forth a flow chart illustrating an additional example method for coordinated snapshots among storage systems implementing a promotion/demotion model according to some embodiments of the present disclosure.

For further explanation, FIG. 22 sets forth another example method of coordinated snapshots among storage systems implementing a promotion/demotion model in accordance with some embodiments of the present disclosure. The example depicted in FIG. 22 is similar to the example in FIG. 21 and may include many of the same elements as described above. However, the example method of FIG. 22 also includes identifying 2202 a second coordinated target checkpoint 2271, wherein the second coordinated target checkpoint 2271 is incomplete. For example, the second coordinated checkpoint may be incomplete due to a partially completed coordinated source checkpoint 2270, a fault in the replication between a source and a target pair, a fault in communication between the target coordinator service 2117 a target storage system 2113, 2115. For the purpose of illustration, as depicted in FIG. 22, assume the source coordinator service 2116 established a coordinated source checkpoint 2270 based on local source checkpoints 2272, 2274, but the target storage system 2113 does not receive a local source checkpoint from its paired source storage system 2112, for example, because the replication link between the source storage system 2112 and the target storage system 2113 faulted. (However, in other cases, the fault may also be due to the source storage system not being able to participate in the coordinated source checkpoint, a fault in the source storage system 2112 or target storage system 2113, or a fault in the communication link between the target coordinator service 2117 and the target storage system 2113, such that the target coordinator service 2117 cannot confirm whether a local replicated checkpoint was received). As such, the target coordinator service 2117 is not able to determine a complete coordinated target checkpoint, and thus cannot construct a complete coordinated tracking dataset based on a complete coordinated target checkpoint.

Although only two source-target pairs are depicted, it should be again noted that there may be N number of source-target pairs, and where an incomplete coordinated target checkpoint is only associated with N−1 or fewer local replicated checkpoints.

The method of FIG. 22 also includes creating 2204, in dependence upon the second coordinated target checkpoint 2271, a second coordinated tracking dataset 2260. Instead of advancing the previous coordinated tracking dataset 2160, which may have been a complete coordinated tracking dataset, the target coordinator service 2117 creates a new coordinated tracking dataset 2260 for the incomplete checkpoint to coordinate the local tracking datasets based on local replicated checkpoints that were received. For illustration, as depicted in FIG. 22, a target storage system 2115 does receive a local replicated checkpoint 2273 that is associated with a local tracking dataset 2262 (e.g., a snapshot). Because target storage system 2113 did not receive a local replicated checkpoint, it has no updated local tracking dataset to contribute to the coordinated tracking dataset 2160. Thus, instead of updating the existing coordinated tracking dataset 2160 to generate the updated local tracking dataset 2262, the target coordinator service 2117 creates the new coordinated tracking dataset 2260 that includes the updated local tracking dataset 2262 (and any other local tracking datasets that were received with the partial target checkpoint). For example, the second coordinated tracking dataset may be a partially coordinated tracking dataset or a partially faulted coordinated tracking dataset, depending on circumstances of the coordinated target checkpoint used to construct the second coordinated tracking dataset 2260. In some cases, the target coordinator service 2117 may include an older local tracking dataset 2162 from the target storage system 2113 to yield an inconsistent complete coordinated tracking dataset. If the target storage system 2113 does eventually receive a local replicated checkpoint, the target coordinator service 2117 may update the second coordinated tracking dataset 2260 to include a local tracking dataset for that target storage system 2113, yielding an up-to-date complete coordinated tracking dataset, and thus the prior complete coordinated tracking dataset 2160 may be discarded. It will be appreciated that tracking multiple different types of coordinated tracking datasets may require that older replicated checkpoints, such as local replicated checkpoints 2173, 2175 be retained, for example, to make a complete coordinated checkpoint available even though does not contain up-to-date data from the source dataset 2130.

With all these potential versions of the coordinated tracking dataset available, a management server may provide tools, programmatic and administrative interfaces to allow personnel or monitor equipment to identify and select between them so that the most appropriate version can be used for particular needs. Thus, in some implementations, the target coordinator service 2117 provides an interface that exposes the various types of coordinated tracking datasets along with information describing the type or state of the coordinated tracking dataset, a time value for the coordinated tracking dataset, portions of the dataset that are missing, a list target storage systems that are missing an up-to-date portion of their local tracking dataset, and so on. For example, if there is a disaster and it is necessary to switch over to a consistent version of a replicated dataset, the disaster recovery procedure can promote the set of coordinated target storage systems to the complete coordinated tracking dataset, representing the most recent complete coordinated checkpoint, but snapshots or clones of a combination of any partial tracking datasets could be made in order to preserve that data for diagnostic purposes or for less automated recovery of potentially inconsistent but more recent data In some implementations, coordinated replication and coordinated tracking datasets are adapted to implement a promotion and demotion model. In one example of a promotion and demotion model, for a replicating pair of storage systems there is a direction to replication for a dataset (though there could be other datasets running in the other direction), and each side of a replication link can be made writable. To be made writable a side is promoted, in that the storage system includes a read-write accessible copy of the dataset. Otherwise, a side of the replication link is demoted, in which case there may be a tracking dataset that can be used to create snapshots or clones. In some cases, the tracking dataset could be available as a read-only "replica." If one side is promoted and the other side is demoted, then the replication link is from the promoted side to the demoted side. A demoted side can be promoted while the other side is still promoted, in which case the replication link remains in the same direction as before but the newly promoted side becomes available for read-write access but a tracking dataset is retained to continue tracking the other, still promoted, side. This target-side promotion can be used, for example, to test access and recovery procedures in the case of disasters, or as part of an actual failover in case of a disaster that cannot be coordinated with the current source.

To handle a planned switch of primary access to the dataset from one side of the replication link to the other, there can be an operation to "flush and demote" a dataset, which will disable read-write access on the current source side and push the last version (e.g., a checkpoint taken after disabling read-write access) to the target. When that is complete, the target can safely promote with assurances that it has the up-to-date dataset. To facilitate a back-out of a demotion, or to recover in case the newly promoted side suffers failures, the source side dataset at the time of a demotion can be preserved as an "undo" snapshot. This can then be used to revert the dataset to the undo version, or to make a clone or snapshot of the undo version for diagnostic or other recovery purposes.

Figure 23:
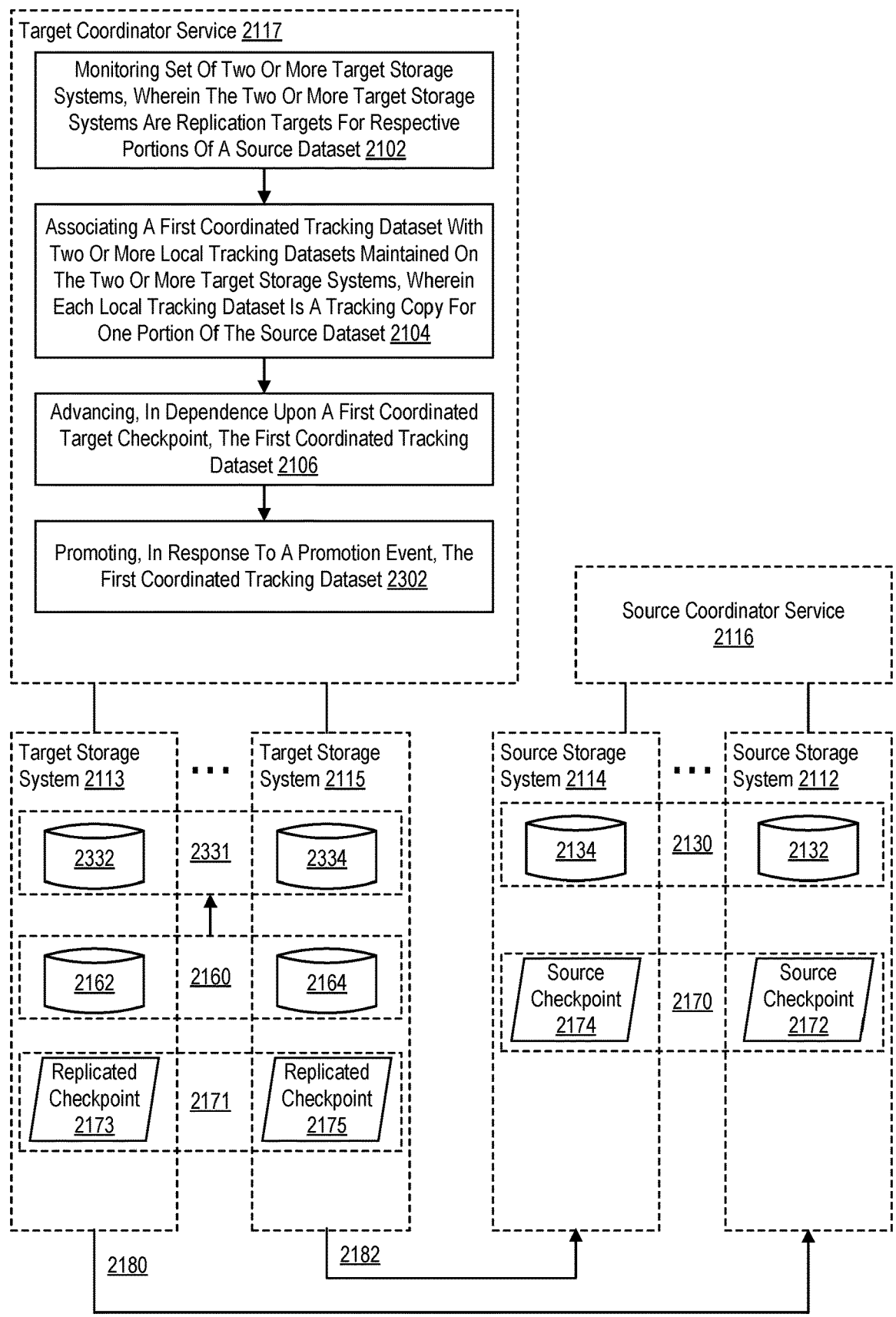
FIG. 23 sets forth a flow chart illustrating an additional example method for coordinated snapshots among storage systems implementing a promotion/demotion model according to some embodiments of the present disclosure.

For further explanation, FIG. 23 sets forth another example method of coordinated snapshots among storage systems implementing a promotion/demotion model in accordance with some embodiments of the present disclosure. The example depicted in FIG. 23 is similar to the example in FIG. 21 and may include many of the same elements as described above. However, the example of FIG. 23 also includes promoting 2302, in response to a promotion event, the coordinated tracking dataset 2160. In some examples, the target coordinator service 2117 promotes the coordinated source tracking dataset 2160 by coordinating the creation of a replica dataset 2331 that is a writable replica of the source dataset 2130. In some implementations, the target coordinator service 2117 coordinates the creation of the replica dataset 2330 by orchestrating the creation of a local replica 2332, 2334 from a local tracking dataset 2162, 2164 on each target storage system 2113, 2115, where the local replica is a replicated portion of the source dataset from a paired source storage system. For example, the target coordinator service 2117 may send a message to each target storage system 2113, 2115 indicating that a snapshot corresponding to a local tracking dataset should be cloned, or that the local tracking dataset should be made write accessible. In some examples, demoting a side when the other side is promoted may result in all the local replication pairs switching the replication direction, swapping their designations as source and target.

In some examples, promoting a demoted side when the other side is still promoted leaves the coordinated tracking dataset in place, but makes a read-write version of the coordinated tracking dataset available. The specific version chosen can be any of the available coordinated tracking datasets (e.g., a complete coordinated tracking dataset, a partially completed coordinated tracking dataset, or a partially faulted coordinated tracking dataset). In the case of a faulted target at the time or promotion, a complete coordinated tracking dataset may not be available. It should be noted, however, that even if there is a faulted local target storage system at the time of promotion, the promoted complete coordinated tracking dataset may still be missing, but if it recovers it should have its corresponding local target checkpoint so it should be possible to bring it online to a point in time that matches the rest of the promoted dataset.

In some examples, a promotion event may be based on a detected failure, detected impending failure, or detected degradation of responsiveness beyond a compliance policy threshold of the source data repository. In some cases, the promotion may be automatically initiated based on such a detection of a promotion event, and in other cases, the promotion event may be responsive to a user specifying that the replica data on the set of target storage systems 2113, 2115 be promoted. For example, the coordinated tracking dataset 2160 may be promoted by a user to make replica data available for other uses—such as fire drill testing, development, analytics, and so on—where such uses may include modification of the replica data on the set of target storage systems 2113, 2115.

In some examples, the target coordinator service 2117 and the source coordinator service 2116 coordinate a promotion/demotion operation, such as a coordinated flush and demote, where the target side is promoted and the source side is demoted. In one example of a coordinated flush and demote, the source coordinator service ensures that writing has been disabled for the source dataset 2130 on all the coordinated local replicating pair source storage systems 2112, 2114 at the beginning of the operation. When all writing is disabled, the source coordinator service 2116 orchestrates a coordinated source checkpoint, where all local source storage systems will then deliver their respective local source checkpoints to their respective paired target storage systems. If any local source storage system fails to checkpoint—or suffers a communications fault or fails to deliver its local checkpoint to its paired target storage system—then the coordinated flush and demote should generally be considered faulted. In some examples, recovery from the flush and demote failure can include coordinating a re-promotion of the source dataset 2130 to resume prior operation. In some examples, recovery from the flush and demote failure can include fixing whatever is preventing the source checkpoint and delivery of the source checkpoint from completing. In some examples, recovery from the flush and demote failure can include explicitly taking a replicating pair offline for the dataset and retrying the operation without the faulting pair. If whatever fault is fixed in the future, some recovery procedure may be needed to bring it back online.

Once a former source side has been demoted (with the optional flush), the former target side can then be promoted, and the target coordinator service 2117 and the source coordinator service 2116 can then ensure that all replicating pairs have switched the replication direction. At that point replication and coordination resumes, but with the source and target pairs swapped.

In some implementations, promoting 2302, in response to a promotion event, the coordinated tracking dataset 2160 includes identifying each local tracking dataset 2162, 2164 corresponding to the coordinated tracking dataset 2160 and directing the set of target storage systems 2113, 2115 to generate read-write accessible local replica portions 2332, 2334 based in their respective local tracking datasets 2162, 2164. In these examples, the local replica portions 2332, 2334 are made write accessible for use by hosts or other applications as a replica dataset 2330. In some examples, the target coordinator service 2117 coordinates the naming of the local replica portions 2332, 2334 to facilitate the cataloging of the local tracking datasets as corresponding to the replica dataset 2330, and to present the local tracking datasets as a single coordinated dataset. In other examples, each target storage system 2113, 2115 reports the name of its local replica dataset to the target coordinator service 2117 once created. However, it should be recognized that the target coordinator service may orchestrate the cloning of local tracking datasets and creation of the replica dataset without changing or affecting the promoted status or demoted status of either side of the replication links.

Figure 24:
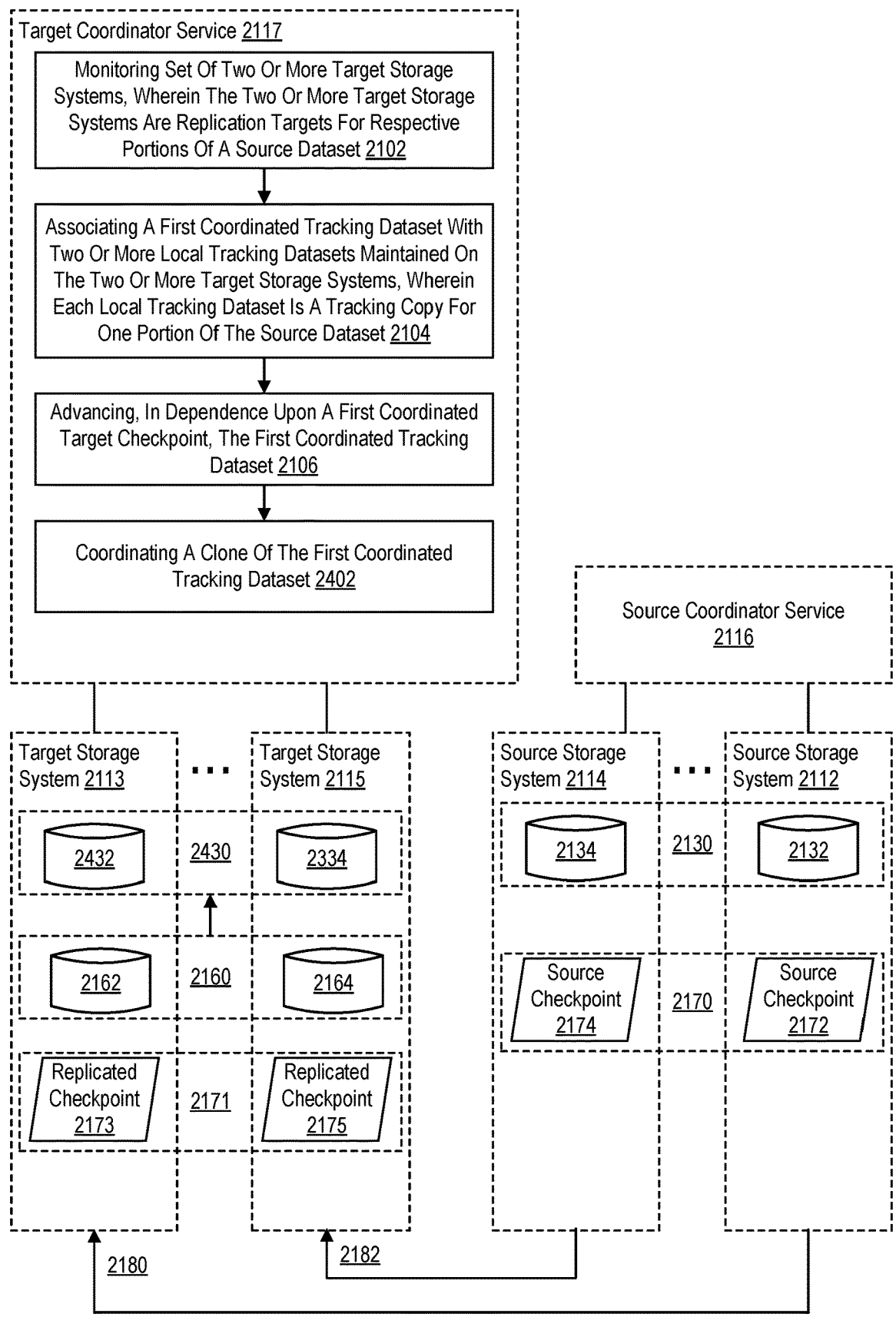
FIG. 24 sets forth a flow chart illustrating an additional example method for coordinated snapshots among storage systems implementing a promotion/demotion model according to some embodiments of the present disclosure.

For further explanation, FIG. 24 sets forth another example method of coordinated snapshots among storage systems implementing a promotion/demotion model in accordance with some embodiments of the present disclosure. The example depicted in FIG. 24 is similar to the example in FIG. 21 and may include many of the same elements as described above. However, the example of FIG. 24 also includes coordinating 2402 a clone 2430 of the coordinated tracking dataset 2160. In some examples, the target coordinator service 2117 identifies each local tracking dataset 2162, 2164 corresponding to the coordinated tracking dataset 2160 and directs the set of target storage systems 2113, 2115 to generate local clones 2432, 2434 of their respective local tracking datasets 2162, 2164, where the clone 2430 is a replica of a version of the source dataset 2130. This can include sending a message to each target storage system 2113, 2115 indicating a local tracking dataset or snapshot that should be cloned. In some examples, the clone 2430 is utilized to implement a coordinator-managed promotion model, where promotion of the coordinated tracking dataset 2160 is carried out by the target coordinator service 2117 without local target storage systems internally promoting their local tracking datasets. In some examples, the clone 2430 is utilized to model promotion behavior, for example, to test host access or migration in response to an anticipated promotion of the coordinated tracking dataset 2160.

In some implementations, the lightweight checkpoints may be a basis for implementing continuous data protection—with or without any implementation of data replication. In some examples, continuous data protection provides relatively fine-grained versioning of a dataset for extended periods of time, to allow roll-back or other access to any of those fine-grained versions. For example, these versions can be examined to determine when some update or corruption occurred, allowing a roll-back or other access (such as the formation of a usable snapshot or clone) to the version immediately prior to that update. In some cases, it makes sense to provide access to both the pre-change/pre-corruption dataset as well as the more recent data (or even a set of points-in-time of the dataset before or since the time of the update/corruption) so that other changes can be copied or otherwise reconciled, or for diagnostic purposes.

In near-synchronous replication, lightweight checkpoints may be applied as they come in or when they are completely ready to be applied. As a result, in some examples, a tracking dataset always represents some replicated source point in time, as might be represented or named by a clock value in some way associated with the replication source, or a sequence number, or in some cases tags or various other kinds of labels, which is generally some amount behind the live dataset's source point in time. Note that any two distinct points in time do differ by an amount of time, however, those two points in time are labeled, and whichever clocks, if any, are used to measure time differences. In this example, the difference between the replicated dataset source point in time and the live dataset source point in time may be reported as the current available "recovery point" the distance between the replicated dataset source time clock value and the live dataset source time clock (though propagation delays likely mean that neither source nor target know exactly what this time distance is).

Further, continuing with this example, in continuous data protection, checkpoints of a dataset may be replayed up to some limit in order to construct a consistent image. In some cases, such checkpoints may be transformed into a read-only snapshot, or the dataset may also be cloned (or the read-only snapshot may be cloned) to form a read-write volume that may be used for various purposes. In this example, an implementation of continuous data protection may clone a volume to match some point in time, test it to determine whether the volume includes or excludes some data or some corruption, and then if needed re-clone the volume to match some other point in time and test the volume again. In this example, when a point-in-time is determined, that point-in-time may be used as a basis to generate a primary volume or simply copy data out of the volume at that point-in-time.

Further still, in some implementations, continuous data protection may provide more granular access to these named point in time from the source dataset, with granularity limited to the granularity of checkpoints (essentially, based on the pattern with respect to time, measured or otherwise, at which these checkpoints are taken). In some cases, continuous data protection could be either local (the checkpoints are retained on a local storage system and are available for local access), or they can be on a replication target (the checkpoints are retained on a replication target), or both, with each possibly having different retention periods and models for merging checkpoints or converting them to long-duration snapshots.

In some implementations, a checkpoint may also be referred to as an ordered "lightweight checkpoint" of a dataset. In some examples, as described elsewhere, a checkpoint may include metadata describing a set of updates, but where the checkpoints only reference the actual data associated with a corresponding set of updates by holding references to where the data for a given checkpoint is stored in the normal course of operations for the storage system. A given set of updates may begin to be staged in NVRAM, or a first tier of a storage system's storage, before the set of updates, or at least a portion of these of updates is flushed to backing storage, or a second tier of the storage system.

However, in this example, the data references that comprise a given checkpoint, either because it was written within the duration of time represented by the checkpoint or because it is data that was not overwritten or deleted within that duration of time, may survive logical (or address range) overwrites or deletions subsequent to the checkpoint, such as in later checkpoints or in the "live" dataset, as well as surviving garbage collection either by being left in place or by being retained through migration as part of the garbage collection algorithms. Further, lightweight checkpoints may be ordered in that to arrive at a complete and consistent point-in-time image of some point in time of the original dataset, each set of updates described in each lightweight checkpoint between some prior consistent image and the point in time corresponding to a particular lightweight checkpoint should either be applied to form that point-in-time image or the update could be determined to be unnecessary, for example, being due to an overwrite or deletion. In some examples, lightweight checkpoints may be merged, which can be beneficial because merging may release some backing store data that has been overwritten or deleted, for example by having been written in an earlier checkpoint and overwritten in a later one that is merged with the earlier one (in which case the data for the earlier write may no longer be needed), thereby allowing some otherwise held data to be garbage collected.

Continuing with this example, such lightweight checkpoints are intended to represent very fine-grained consistency point moments in time as consistency points, with each lightweight checkpoint including a set of updates that have been signaled as completed, excluding a set of updates whose processing has not yet started, and potentially including or excluding updates that are concurrent with the moment in time the checkpoint represents. In some examples, formation of a new lightweight checkpoint or a duration, or period, between two checkpoints may be based on time slices, such as every few milliseconds, or operation count slices, such as every 50 to 500 update operations, or based on transfer size or some more complex relationship to update operations, such as counting a few megabytes of modifications or some number of logical extent updates, or they can relate to some explicit operation, such as an operation to explicitly tag or name a particular point-in-time so it can be referenced later such as by a program noticing or being notified when it is received and applied to replication target, or they can relate to any combination of these and other triggers. Such tags or names could also be searched for within a continuous data protection implementation.

In some implementations, lightweight checkpoints may differ from snapshots in that they do not affect the durable structure of the storage system beyond whatever side structure is used to store them, apart from the garbage collection or overwrite holds, and lightweight checkpoints may be discarded with minimal effect, other than the release of those garbage collection or overwrite holds. Further, in some cases, lightweight checkpoints may also lack individual administrative handles, perhaps apart from lightweight checkpoints that are explicitly tagged or named. In some examples, lightweight checkpoints exist almost exclusively as an ordered list of metadata bundles describing updates that would apply over the previous checkpoint, where the ordered list of metadata may be stored in a log-style structure. Further, lightweight checkpoints may be persistent (recoverable after a run-time fault such as a crash or loss of power) or not persistent (not necessarily recoverable), in dependence at least upon an intended use of the lightweight checkpoint. In particular, near-sync replication may have crash or resynchronization recovery mechanisms that may operate independently of lightweight checkpoints and that may then not require persisting of lightweight checkpoint logs, while the target of replication might separately benefit from persisting checkpoints on the target storage system for fault recovery purposes, such as part of making application of lightweight checkpoints atomic.

In some implementations, if the metadata for a lightweight checkpoint represents logical composite and leaf extents, as described in prior patents, then a lightweight checkpoint may be a set of descriptions for updating these logical composite and leaf extents which are themselves metadata descriptions that reference stored data by content identifier references In some cases, use of content identifiers irrespective of the use of an extent model may also be beneficial in that such use preserves information about duplicates and may be used as part of a strategy to avoid transfer of content that a target storage system may already be known to store.

Continuing with this example, this structure of a metadata representation of a dataset may be particularly effective in a Flash storage system because Flash does not allow overwrite in place at the chip level and may generally be driven, at some level, by garbage collection algorithms that can readily account for a wide variety of references that have holds on written data. In some cases, some details may account for the NVRAM, or persistent staging memory, aspects which do not have to follow the same write-elsewhere-with-garbage-collection model, but at least the bulk data writes for lightweight checkpoints are not separate writes that require separate storage.

In some implementations, and as described in other sections of this reference, some applications of lightweight checkpoints may include normal operation of near-sync replication (in contrast to initialization or resynchronization), which may in some cases and for some products also be referred to as asynchronous replication. In this example, lightweight checkpoints may be transferred over a network link to some target storage system that may then apply the lightweight checkpoints to a tracking copy of the original dataset, with lightweight checkpoints (and their referenced data) being held at least until the tracking copy has been updated.

In some cases, if checkpoints may be received or applied out-of-order, then all intermediate checkpoints may need to be received and applied before the lightweight checkpoint on the source system can be released. Generally, lightweight checkpoints should be applied atomically, such as by using some transaction mechanism. One transaction mechanism is to receive the metadata for a lightweight checkpoint, receive all the data content for a lightweight checkpoint and storing it locally on the target, and then roll forward the tracking copy to incorporate the metadata updates in the lightweight checkpoint with its data references updated to reference the data content stored locally on the target. Depending on the implementation and recovery model, with all the data content for the lightweight checkpoint stored, if there is a run-time fault, the changes described by that content can be reapplied as part of recovery, to arrive at the same result as if the fault had not occurred.

Further, other applications of lightweight checkpoints may include:

In some examples, a tracking copy may be converted into a snapshot or a clone to provide a stable image at some point in time, thereby allowing use of a point-in-time image for testing purposes or failover purposes;

In some examples, if a source-to-target interconnect and the target storage system are not roughly keeping up with the rate that the source storage system itself is receiving data, storing it, and forming and transferring lightweight checkpoints, then these lightweight checkpoints can start building up. In this scenario, there are several reactions to this that can be used: lightweight checkpoints could be merged to reduce their cost (the source dataset points-in-time associated with named or tagged checkpoints might be preferentially retained); back pressure could be put on the source storage system to reduce the rate at which it receives, processes, or completes updates; a subset of checkpoints could be converted to more durable snapshots; or lightweight checkpoint-based replication could be discarded in favor of replication based on periodic snapshots. In some cases, some number of periodic snapshots might already be kept for resync or connection loss/reconnect purposes so switching to snapshot replication may already be fully ready to go—meaning that lightweight checkpoints since the last snapshot may simply be discarded if replication is not keeping up sufficiently for the lightweight snapshots to be useful;

In some examples, connection loss or other kinds of interruptions to replication may generally be handled by switching to some other scheme, such as snapshot based replication, or by using a resync model similar such as is common for recovering from connection faults in many forms of replication, including synchronous, near-sync, and snapshot-based, though without the need to catch all the way up at the very end;

In some examples, the transfer of data can be initiated by the sender side by simply sending the referenced data to the target storage system along with sending the lightweight checkpoint metadata updates. Further, the transfer of data may instead be initiated by the target storage system: if the lightweight checkpoint metadata lists content identifiers, then the target storage system can reuse references to content it already stores but can then request retrieval of content it does not current store. This can reduce total bandwidth required, though if the network link has to be sized for the update rate, the benefit may be low; and In some examples, if the source storage system itself stores content compressed as some kind of compressed blocks, then the compressed blocks may in many cases be transferred directly rather than being uncompressed and then possibly recompressed before being transmitted over the network.

In some implementations, lightweight checkpoints may be used to implement continuous data protection either on the original storage system—with or without replication being involved—or on a replication target system by storing the lightweight checkpoints on the target storage system rather than simply applying and then discarding them. In continuous data protection, various point-in-time images of a dataset can be accessed by rolling forward a copy of a dataset to include all lightweight checkpoints up to the lightweight checkpoint corresponding to some source dataset point-in-time of interest.

For example, if the storage system also implements durable snapshots, then only lightweight checkpoints since the point-in-time of the most immediately prior snapshot may need to be applied. Generally, higher granularity is more interesting for more recent history of a dataset and less granularity is needed farther back, allowing for the possibility of ever more aggressive lightweight checkpoint merging as points-in-time recede, or eventually discarding them in favor of less frequent snapshots.

Further, if continuous data protection is used to locate a point in time just before where an unwanted change or corruption was introduced, then relatively fine grained lightweight checkpoints (milliseconds to a few seconds to every few minutes) might only need to be kept until plenty of time has elapsed to ensure that corruption will have been noticed and recovery procedures started. After that, 30 minute or hourly or even daily snapshots might be preferable (or such rollbacks may be considered unnecessary or may be left to be taken care of by backup subsystems where needed). In support of this, any specific lightweight checkpoint can be converted into a durable snapshot if such a snapshot hadn't been created explicitly. If lightweight checkpoints can be named or tagged, continuous data protection could further support locating and accessing those named lightweight checkpoints. Further, names, tags, or other useful identifying metadata (such as clock values), could be inherited by any snapshots formed from those named or tagged lightweight checkpoints. Names, tags, or other metadata could also be used to prioritize which checkpoints will be converted to snapshots and how long or in what patterns various snapshots might be retained.

Figure 25:
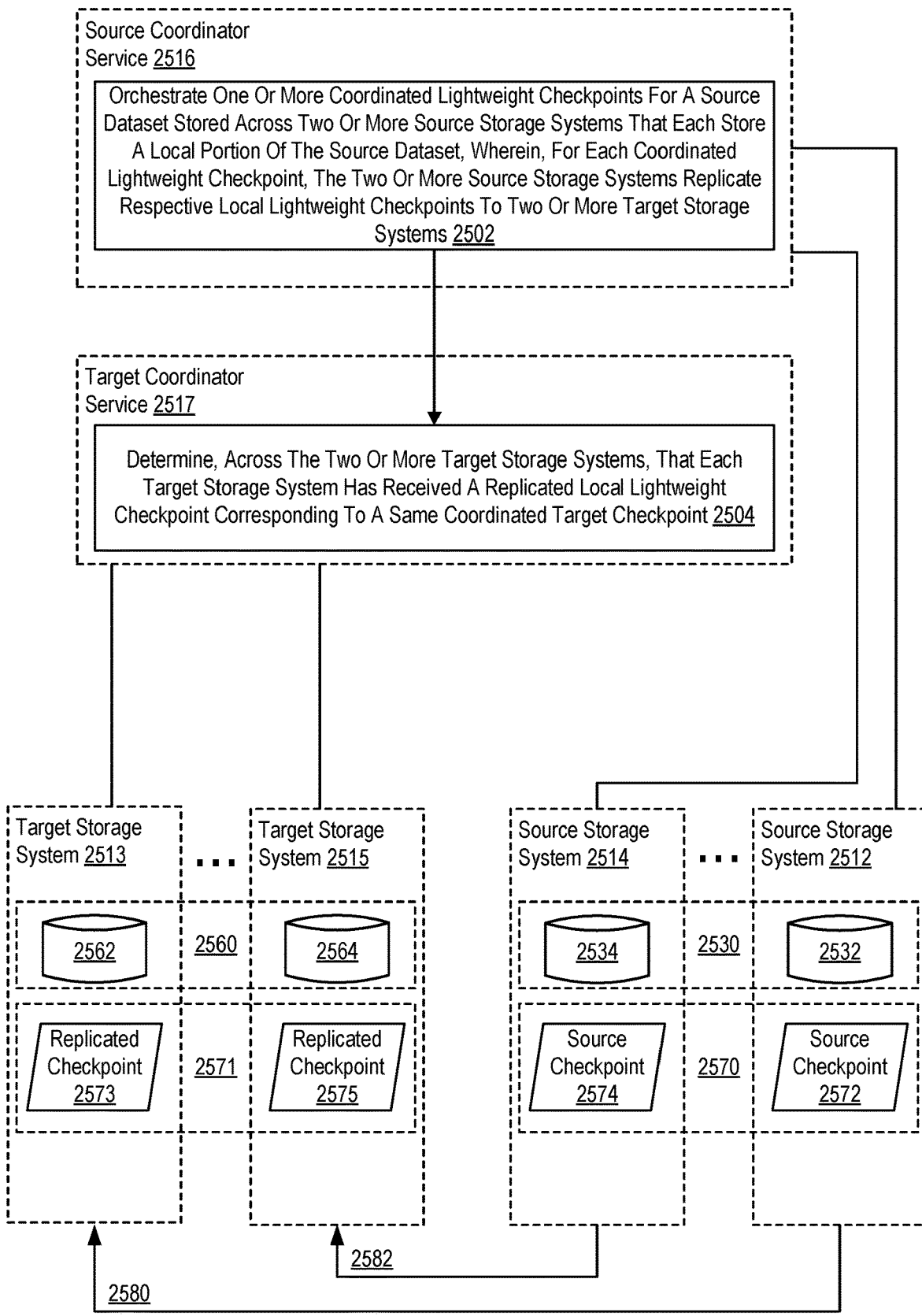
FIG. 25 sets forth a flow chart illustrating an example method for coordinated checkpoints among storage systems implementing checkpoint-based replication according to some embodiments of the present disclosure.

For further explanation FIG. 25 shows a flowchart of an example method for coordinated checkpoints among storage systems implementing checkpoint-based replication. The example depicted in FIG. 25 can include two or more source storage systems 2512, 2514 and a source dataset 2530 stored across the two or more storage systems 2512, 2514. The example depicted in FIG. 25 can also include two or more target storage system 2513, 2515 that are replication targets for the source dataset 2530. Each storage system, such as source storage systems 2512, 2514 and target storage systems 2513, 2515 in this particular example, may be similar to the storage systems described above, including any combination of the storage systems described above. In fact, source storage systems 2512, 2514 and target storage systems 2513, 2515 depicted in FIG. 25 may include the same, fewer, or additional components as the storage systems described above.

In the example depicted in FIG. 25, the source dataset 2530 is coordinated across the two or more source storage system 2512, 2514. For example, a first portion 2532 of the source dataset 2530 is stored on source storage system 2512 and a second portion 2534 of the source dataset 2530 is stored on source storage system 2514. Thus, each source storage system 2512, 2514 stores a distinct local portion 2532, 2534 of the source dataset 2530. In some examples, the two or more source storage systems 2512, 2514 have different implementations and storage environments (although the storage systems 2512, 2514 being dissimilar is not a requirement for all embodiments of the present disclosure). For example, a storage system environment can implement a particular type of storage, such as block storage, file system storage, object storage, and database storage. In one non-limiting example, a source storage system 2512 can store a block volume that is a first portion 2532 of the dataset 2530 and another source storage system 2514 can store a file system that is a second portion 2534 of the dataset 2530. Thus, in some examples, the source storage systems 2512, 2514 can employ different storage environments to implement data types of storage.

In some examples, each source storage system 2512, 2514 is paired with a target storage system 2513, 2515 for replication of its local portion of the source dataset 2530 to its paired target storage system 2513, 2515. In some implementations, the source storage systems 2512, 2514 and the target storage systems 2513, 2515 are paired with respective replications links 2580, 2582, such as the replication link described above. The replication links 2580, 2582 can be representative of a communications path and replication protocol for replicating data of the local portions 2532, 2534 of source dataset 2530 from the source storage systems 2512, 2514 to the target storage systems 2513, 2515. In some examples, a replication link may specify a replication policy, where the replication policy may specify snapshot-based replication, may specify nearly synchronous replication, or may specify synchronous replication. A user may be provided with a single user interface, or with a single workflow, for configurating replica link parameters allowing for specification of one or more characteristics for data replication. In the example depicted in FIG. 25, source storage system 2512 and target storage system 2513 form a replication pair through replication link 2580. Likewise, source storage system 2514 and target storage system 2515 form a replication pair through replication link 2582. In some examples, the source storage systems 2512, 2514 each include a storage controller (not shown), such as any of the storage controllers discussed above, which processes storage operations and implements data services such as replication.

Although the example of FIG. 25 and following examples describe replication pairings between a single source storage system and a single target storage system, it will be appreciated that a particular source storage system may be paired with multiple target storage systems for the replication of multiple distinct portions of the source dataset to separate target storage systems. The reverse may also be true, in that a single target storage system may be the replication target for multiple source storage systems. Consider an example where source storage system 2512 stores two distinct portions (not shown) of the source dataset 2530, where one distinct portion is replicated to one target storage system 2513 and another distinct portion is replicated to another target storage system 2515. Consider another example, where one target storage system 2513 is the replication target for a distinct portion (not shown) of the source dataset 2530 stored on one source storage system 2512 and another distinction portion (not shown) of the source dataset 2530 stored on another source storage system. Thus, while replication links are discussed in the sense of paired source and target storage systems, more particularly the replication link can refer to the replication mechanism for a particular portion of the source dataset between a particular pair of source and target storage systems. Thus, for a source dataset 2530 there may be N number of source storage systems across which the dataset 2530 is stored and M number of target storage systems across which the dataset 2530 is replicated, where N may be greater than M, M may be greater than N, or N and M may be equal. It will also be appreciated that, in some cases, the replication direction for the set of replication links corresponding to the set of distinct portions of the dataset may be reversed.

In the example depicted in FIG. 25, the source storage systems 2512, 2514 implement continuous data protection through the use of lightweight checkpoints, as discussed above. In this example, the replication links 2580, 2582 employ a continuous, or near-synchronous, replication policy through the replication of lightweight checkpoints, lightweight journals, or other metadata logs, as discussed above. Thus, each source storage system 2512, 2514 is configured to generate lightweight checkpoints for its local portion 2532, 2534 of the source dataset 2530. However, to achieve a consistent checkpoint for the source dataset 2530 among such storage systems utilizing near-synchronous or continuous replication, the source storage systems 2512, 2514 must generate frequent (e.g., multiple per second) lightweight checkpoints in a coordinated fashion.

Accordingly, the example method of FIG. 25 includes orchestrating 2502 one or more coordinated lightweight checkpoints 2570 for the source dataset 2530 stored across the two or more source storage systems 2512, 2514 that each store a local portion 2532, 2534 of the source dataset 2530, wherein, for each coordinated lightweight checkpoint 2570, the two or more source storage systems 2512, 2514 replicate respective local lightweight checkpoints to two or more target storage systems 2513, 2515. In some embodiments, a source coordinator service 2516 orchestrates the coordinated lightweight checkpoint 2570 by coordinating the source storage systems 2512, 2514 to generate coordinated local lightweight checkpoints 2572, 2574 for their local portions 2532, 2534 of the source dataset 2530. For example, local lightweight checkpoints 2572, 2574 are coordinated by coordinating a pause in I/O operations (i.e., either I/O completion signaling or I/O processing) on the source storage systems 2512, 2514 such that a set of consistent lightweight checkpoints 2572, 2574 can be generated by the source storage systems 2512, 2514. In other words, each source storage system generates a local lightweight checkpoint 2572, 2574 for its local portion 2532, 2534 for the source dataset 2530 to render the coordinated lightweight checkpoint 2570, wherein no local lightweight checkpoint 2572, 2574 includes any updates to the local portions 2532, 2534 of the source dataset 2530 that rely on updates not included in any other local lightweight checkpoint 2572, 2574. Thus, the coordinated lightweight checkpoint 2570 represents a plausible crash recovery point for a version of the source dataset 2530 that does not include any modifications that could causally depend on the results of any other modification that is not included in that version of the source dataset 2530.

In some implementations, the source coordinator service 2516 explicitly coordinates every local lightweight checkpoint 2572, 2574 generated by the source storage systems 2512, 2514. In other words, in these implementations, each source storage system 2512, 2514 does not generate any local lightweight checkpoints without an explicit message from the source coordinator service 2516. This allows fast detection of any source storage system that has faulted. In other implementations, the source coordinator service 2516 may coordinate one set of local lightweight checkpoints 2572, 2574 through explicit messaging, where subsequent local lightweight checkpoints are autonomously generated by the source storage systems 2512, 2514 on a schedule based on the initial messaging for the explicitly coordinated light weight checkpoint. This reduces messaging between the source coordinator service 2516 and the source storage systems 2512, 2514, although some messaging to the source coordinator service 2516 may be useful to indicate local lightweight checkpoints are generated successfully.

In still further implementations, the source storage systems generate local lightweight checkpoints for their local portion of the dataset 2530, where only some of those local lightweight checkpoints are coordinated. In other words, in these implementations, the source coordinator service 2516 periodically coordinates local lightweight checkpoint 2572, 2574 to render a coordinated lightweight checkpoint 2570 for the source dataset 2530. However, the source storage systems 2512, 2514 may independently generate other local lightweight checkpoints that are not part of a coordinated lightweight checkpoint. As such, a coordinated lightweight checkpoint may be orchestrated less frequently than local lightweight checkpoints, such as those that are generated in accordance with a local data protection or replication policy of a particular replicating pair. For example, the coordinated lightweight checkpoints may be orchestrated to meet an RPO for a consistent version of the entire source dataset 2530 that is coarser than an RPO for an individual replication link. As one example, a particular storage system may be configured for a near-synchronous replication policy that requires a lightweight checkpoint to be generated every 150 milliseconds, whereas an RPO for the entire source dataset may permit a coordinated lightweight checkpoint to be established once per second. In this way, coordinated lightweight checkpoints may be overlaid on individual checkpointing implementations.

In some implementations, each local lightweight checkpoint 2572, 2574 may be similar to those described above in that a local lightweight checkpoint is associated with metadata describing an ordered application of updates received by a source storage system for its local portion of the source dataset. Each local lightweight checkpoint may be associated with source time based on a local clock of the source storage system. In some examples, each local lightweight checkpoint is tagged in association with the coordinated lightweight checkpoint.

In various examples, the source coordinator service 2516 may be similar to any of the coordinator services discussed above. In a particular example, the source coordinator service 2516 may employ a variant of the message-based checkpoint coordination implementations described above with reference to FIGS. 4-24. For example, the source coordinator service 2516 may orchestrate the coordinated lightweight checkpoint 2570 by sending request messages to each source storage system indicating that I/O operations (i.e., either I/O completion signaling or I/O processing) should be paused and a lightweight checkpoint should be generated. In this example, once the source coordinator service 2516 confirms that all source storage systems 2512, 2514 have paused I/O operation, the source coordinator service 2516 sends another message to each source storage systems 2512, 2514 indicating that all storage systems may resume I/O processing. The source coordinator service 2516 may determine that the coordinated lightweight checkpoint 2570 has been established once all source storage systems 2512, 2514 have confirmed that the local lightweight checkpoints 2572, 2574 were successfully generated.

In another particular example, the source coordinator service 2516 may employ clock-based checkpoint coordination implementations described above with reference to FIG. 20. For example, the source coordinator service 2516 may orchestrate the coordinated lightweight checkpoint 2570 by coordinating a time in the future at which point the source storage systems 2512, 2514 will pause I/O operations (i.e., either I/O completion signaling or I/O processing) for a time period determined by the source coordinator service 2516, and generate a local lightweight checkpoint 2572, 2574. The source coordinator service 2516 may determine that the coordinated lightweight checkpoint 2570 has been established once all source storage systems 2512, 2514 have confirmed that the local lightweight checkpoints 2572, 2574 were successfully generated.

In applications where coordinated lightweight checkpoints are established frequently, such as once per second or even many times per second, it may be advantageous to employ a clock-based model for coordinating local lightweight checkpoints. Further, in some implementations, executing the source coordinator service 2516 on one of the source storage systems 2512, 2514 will reduce messaging latency and may be advantageous to implementing such fine-grained checkpointing. For example, the multiple checkpoints per second associated with near-synchronous replication greatly increases the number of interactions between the source coordinator service 2516 and the source storage systems 2512, 2514, and works better if these interactions generally have quite low latencies nearly all the time. Thus, placing the source coordinator service 2516 a source storage system places it closer to the kinds of low-latency scheduling associated with I/O code, where the I/O code layers are presumed to run on the most optimal code using the most responsive schedulers and with the fewest network layers between the algorithms and the network interfaces.

Subsequent to generating the local lightweight checkpoints 2572, 2574 for the coordinated lightweight checkpoint 2570, each source storage system 2512, 2514 replicates its local lightweight checkpoint to its paired replication target storage system 2513, 2515. For example, storage system 2512 may replicate its local lightweight checkpoint 2572 for its local portion 2532 of the source dataset 2530 to target storage system 2513 over replication link 2580, while storage system 2514 may replicate its local lightweight checkpoint 2574 for its local portion 2534 of the source dataset 2530 to target storage system 2515 over replication link 2582. The local lightweight checkpoints 2572, 2574 may be replicated in accordance with a replication policy for the replication link.

The method of FIG. 25 also includes determining 2504, across the two or more target storage systems 2513, 2515, that each target storage system 2513, 2515 has received a replicated local lightweight checkpoint 2573, 2575 corresponding to a same coordinated target checkpoint 2571. In some examples, a target coordinator service 2517 determines whether all replicated local lightweight checkpoints 2573, 2575 have been received by the target storage systems 2513, 2515 by monitoring local replicated lightweight checkpoints 2573, 2575 received by the two or more target storage systems 2513, 2515 from respective source storage systems 2512, 2514. In some examples, the target coordinator service 2517 monitors replicated local lightweight checkpoints on the target storage systems 2513, 2515 by receiving messaging from the target storage system indicating that a replicated local lightweight checkpoint has been received and including identifying information for the local replicated lightweight checkpoint. For example, the identifying information may include a tag, time value, or other information. In some examples, the target coordinator service 2517 identifies the coordinated target checkpoint 2571 by relating the replicated local lightweight checkpoints 2573, 2575 as corresponding to the same coordinated source lightweight checkpoint 2570 and confirming that all local replicated lightweight checkpoints 2573, 2575 for the coordinated target checkpoint 2571 have been received. For example, relating local replicated checkpoints together may be carried out by a target coordinator service, for example, by relating replicated local lightweight checkpoint based on a common identifier or tag, as discussed above. In some examples, the source coordinator service 2516 provides the target coordinator service 2517 with identifying information for a set of local source lightweight checkpoints that have been replicated by the source storage systems 2512, 2514 to the target storage systems 2513, 2515. In such examples, after confirming the receipt of the replicated local lightweight checkpoints, the target coordinator service 2517 may report to the source coordinator service 2516 that a coordinated target lightweight checkpoint 2571 has been confirmed.

As one example, the target coordinator service 2517 may identify that a replicated local lightweight checkpoint 2573 has been received by a target storage system 2513, and also identify an identifier, tag, time value, or other information associated with the replicated local lightweight checkpoint 2573. The target coordinator service 2517 may then determine whether all other target storage systems 2515 that are replication targets for the source dataset 2530 have received a replicated local lightweight checkpoint 2575 that is related by the same particular identifier, tag, time value or other information. Once the target coordinator service 2517 determines that all target storage systems 2513, 2515 have received related replicated local lightweight checkpoints 2573, 2575, the target coordinator service 2517 can confirm a coordinated target checkpoint for the replica dataset 2560. In some examples, the source coordinator service 2516 provides the target coordinator service 2517 with information such as the identifier, tag, time value, or other information that is associated with the local lightweight checkpoints and corresponds to the same coordinated lightweight checkpoint 2570. In some examples, the source coordinator service 2516 coordinates the source storage systems 2512, 2514 to associate their local lightweight checkpoints 2572, 2574 with the identifier, tag, time value, or other information that relates them together as corresponding to the coordinated lightweight checkpoint 2570.

In some examples, the target coordinator service 2517 manages a coordinated tracking dataset 2560 that relates local tracking datasets 2562, 2564 of the replication target storage systems 2513, 2515, where each local tracking dataset 2562, 2564 tracks a portion of the source dataset 2530 and may be updated in accordance with a particular coordinated target lightweight checkpoint. That is, the local tracking datasets 2562, 2564 may be advanced in accordance with the replicated local lightweight checkpoints 2573, 2575. In these examples, the local tracking datasets 2562, 2564 of the target storage systems 2513, 2515 are tracking copies of the local portions 2532, 2534 of the source dataset 2530 for the paired source storage systems 2512, 2514. In some examples, persistent coordinated snapshot of the source dataset 2530 can be generated by persisting local snapshots of the local tracking datasets 2562, 2564 that are coordinated by the target coordinator service 2517 and advanced in accordance with the coordinated target lightweight checkpoint 2571.

In some examples, the source coordinator service 2516 may facilitate the coordinated target checkpoint 2571 by coordinating with the target coordinator service 2517 through an exchange of messages. For example, the source coordinator service 2516 may send a message to the target coordinator service 2517 identifying a coordinated lightweight checkpoint or local lightweight checkpoints associated with the coordinated lightweight checkpoint. For example, the identified coordinated lightweight checkpoint may be associated with a tag or time value. In these examples, the source coordinator service 2516 may request confirmation that the local lightweight checkpoints have been received and/or applied by the target storage system 2513, 2515. Further, the source coordinator service 2516 may receive a message from the target coordinator service 2517 indicating whether those local lightweight checkpoints were received and/or applied by the target storage systems 2513, 2515. Thus, in some examples, the source coordinator service determines 2504 that each target storage system 2513, 2515 has received a replicated local lightweight checkpoint 2573, 2575 corresponding to a same coordinated target checkpoint 2571 by receiving a confirmation message from the target coordinator service 2517. In some implementations, explained in greater detail below, the source coordinator service 2516 may send a message to the target coordinator service 2517 that includes information indicating that a set of replicated local lightweight checkpoints should be disregarded or canceled. For example, the source coordinator service 2516 may recognize that the corresponding local source lightweight checkpoints are not consistent (e.g., as a result of clock variance drift in coordinating the local source checkpoints). Based on such information provided by the source coordinator service 2516, the target coordinator service 2517 may decide to cancel the coordinated target lightweight checkpoint 2571. Further, the source coordinator service 2516 may indicate to the target coordinator service 2517 whether the coordinated source lightweight checkpoint 2570 is complete, partially complete, or partially faulted.

It will be appreciated that, depending on a potential difference between the number of source storage systems 2512, 2514 across which the source dataset 2530 is stored and the number of target storage systems 2513, 2515 across which the coordinated tracking dataset 2160 is stored, the number of source storage systems 2512, 2514 being coordinated among local portions 2532, 2534 of the source dataset 2530 by the source coordinator service 2516 can differ from the number of target storage systems 2513, 2515 being coordinated among local portions of the coordinated tracking dataset 2160 by the target coordinator service 2117. In the example of FIG. 25, for ease of explanation, each source storage system 2512, 2514 coordinating the source dataset 2530 stores one distinct local portion 2532, 2534 that is replicated to one distinct target storage system, where each target storage system stores one distinct local tracking dataset 2162, 2164 of the coordinated target dataset 2160.

Figure 26:
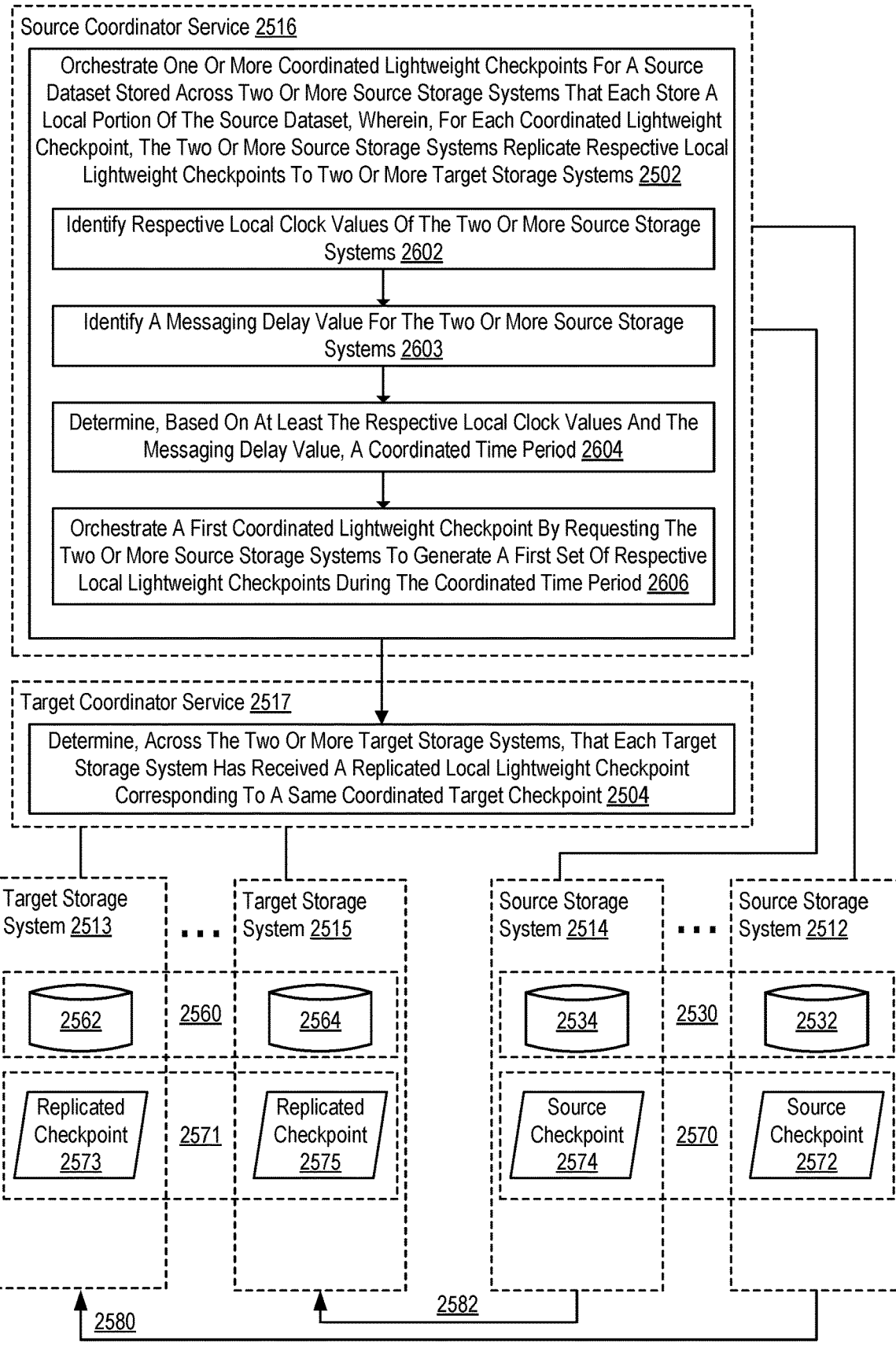
FIG. 26 sets forth a flow chart illustrating an additional example method for coordinated checkpoints among storage systems implementing checkpoint-based replication according to some embodiments of the present disclosure.

For further explanation, FIG. 26 sets forth another example method of coordinated checkpoints among storage systems implementing checkpoint-based in accordance with some embodiments of the present disclosure. The example depicted in FIG. 26 includes many of the same elements as the figures described above. However, in the example of FIG. 26, orchestrating 2502 one or more coordinated lightweight checkpoints 2570 for the source dataset 2530 stored across the two or more source storage systems 2512, 2514 includes identifying 2602 respective local clock values of the two or more source storage systems 2512, 2514. In some examples, the source coordinator service 2516 identifies the local clock values of the source storage systems 2512, 2514 by sending a message to each source storage system requesting its local clock value. Each source storage system 2512, 2514 responds with its local clock value. In other examples, the exchange of clock information may be built into other messaging that is occurring between the source coordinator service 2516 and the source storage systems 2512, 2514. When the source coordinator service 2516 has received the response message with the local clock value, it knows that each storage system's clock value was obtained sometime between the time the source coordinator service 2516 sent out the clock request message and the time a response was received.

In the method of FIG. 26, orchestrating 2502 the coordinated lightweight checkpoint also includes identifying 2603 a messaging delay value for the two or more source storage systems. The source coordinator service 2516 may identify the messaging delay value based on identified messaging delays between the source coordinator service 2516 and the two or more source storage systems 2512, 2514. For example, the messaging delay value may be the longest measured time period between the transmission of a clock request message by the source coordinator service 2516 and the receipt of a clock response message from a particular source storage system 2512, 2514. In one example, the source coordinator service 2516 selects the worst case (e.g., the last received clock response) as the time granularity $T_G$ for the coordinated lightweight checkpoint 2570. For example, the source coordinator service 2516 determines the difference between the time a clock request message was sent and the time that a clock response message was received, and selects the largest difference as the time granularity $T_G$. This represents a worst-case variation in the actual times each of the storage systems looked at their clocks, and thus represents a maximum amount of time needed for coordinating an overlapping time-span given the uncertainties the source coordinator service 2516 has for each storage system's local clock. Thus, the messaging delay value may be a likely worse-case messaging delay that is a probabilistic delay presuming that networking and the software and driver stacks are running normally.

For illustration and not limitation, consider an example where there are only two source storage systems 2512, 2514, referred to as storage system 'A' and storage system 'B'. At time $T_{c0}$, the source coordinator service 2516 sends a clock request message to storage system A and storage system B. At time $T_{c1}$, the source coordinator service 2516 receives a response from storage system A indicating a local clock time $T_{a0}$. Subsequently, at time $T_{c2}$, the source coordinator service 2516 receives a response from storage system B indicating a local clock time $T_{b0}$. Here, the difference between $T_{c0}$ and $T_{c2}$ (i.e., the last received response) represents the worst-case variation, and therefore the time granularity is selected to be $T_G = T_{c2} - T_{c0}$.

In the method of FIG. 26, orchestrating 2502 the coordinated lightweight checkpoint also includes determining 2604, based on at least the respective local clock values and the messaging delay value, a coordinated time period. The coordinated time is a future point in time for each storage system at which I/O operations should be paused for a specified duration, such that the respective periods during which the storage systems have paused I/O operations at least partially overlap in real time. In one example, the source coordinator service 2516 uses $T_G$ to calculate a coordinated clock delta, which may be a reasonably safe time that can be added to each received local clock value to establish a safe time in the future that each source storage system 2512, 2514 can receive a checkpoint request message from the source coordinator service 2516 with enough time to start pausing local writes and delaying new reads to initiate a local lightweight checkpoint. In one example, the coordinated clock delta may be expressed as $T_{p\Delta} = 2T_G + \epsilon$, where $\epsilon$ is selected to provide additional compensation for messaging delays or to permit an amount of clock drift. The coordinated clock delta is then added to each storage system's local clock value obtained from the responses to the clock request message to establish a local time $T_{sp}$ at which point a storage system should pause I/O operations for a duration equal to $T_G$.

Continuing the above example, the source coordinator service 2516 adds $T_{p\Delta}$ to $T_{a0}$ to establish a local time $T_{ap} = T_{a0} + T_{p\Delta}$ in the future at which point storage system A should pause I/O operations and initiate its local lightweight checkpoint. Likewise, the source coordinator service 2516 adds $T_{p\Delta}$ to $T_{b0}$ to establish a local time $T_{bp} = T_{b0} + T_{p\Delta}$ in the future at which point storage system B should pause I/O operations and initiate its local lightweight checkpoint.

In the method of FIG. 26, orchestrating 2502 the coordinated lightweight checkpoint also includes orchestrating 2606 a first coordinated lightweight checkpoint 2570 by requesting the two or more source storage systems 2512, 2514 to generate a first set of respective local lightweight checkpoints 2572, 2574 during the coordinated time period. In some examples, the source coordinator service 2516 sends a checkpoint request message to each source storage system 2512, 2514, where each checkpoint request message indicates a local time in the future, based on that storage system's local clock, when the storage system should pause I/O operations and initiate a lightweight checkpoint for its portion of the source dataset. The checkpoint request message may also indicate the duration for which I/O operations should be paused, where that duration is equal to $T_G$. Continuing the above example, the source coordinator service 2516 sends a checkpoint request message to storage system A indicating that I/O operations should be paused at time $T_{ap}$ for a time period of duration $T_G$ according to its local clock, and that its local lightweight checkpoint 2572 should be generated during that time period. Likewise, the source coordinator service 2516 sends a checkpoint request message to storage system B indicating that I/O operations should be paused at time $T_{bp}$ for a time period of duration $T_G$ according to its local clock, and that its local lightweight checkpoint 2574 should be generated during that time period.

Each storage system waits until their local time $T_{sp}$ and at that time delays completing writes and performing new reads and then initiates the local checkpoint. When a storage system both reaches its local time $T_{sp}+T_G$ and completes the establishment of its local checkpoint, it responds to the source coordinator service 2516 indicating that it is done establishing its local lightweight checkpoint 2572, 2574. When the source coordinator service 2516 receives a 'done' message from all storage systems, the coordinated lightweight checkpoint 2570 is considered established. If any storage system does not respond with a 'done' message after a reasonable period of time the source coordinator service 2516 may abandon the checkpoint and perform cleanup.

With the frequency of coordinated lightweight checkpoints needed for applications such as near-synchronous replication, the clock exchange for clock coordination may be performed periodically rather than for every coordinated lightweight checkpoint. That is, absent an indication to the contrary, the source coordinator service 2516 may trust that the local clocks of the source storage systems have remained consistent with a prior exchange of local clock values. Instead, local clock values may be reconfirmed periodically, such as when exchanging other messages related to near-synchronous replication coordination.

Figure 27:
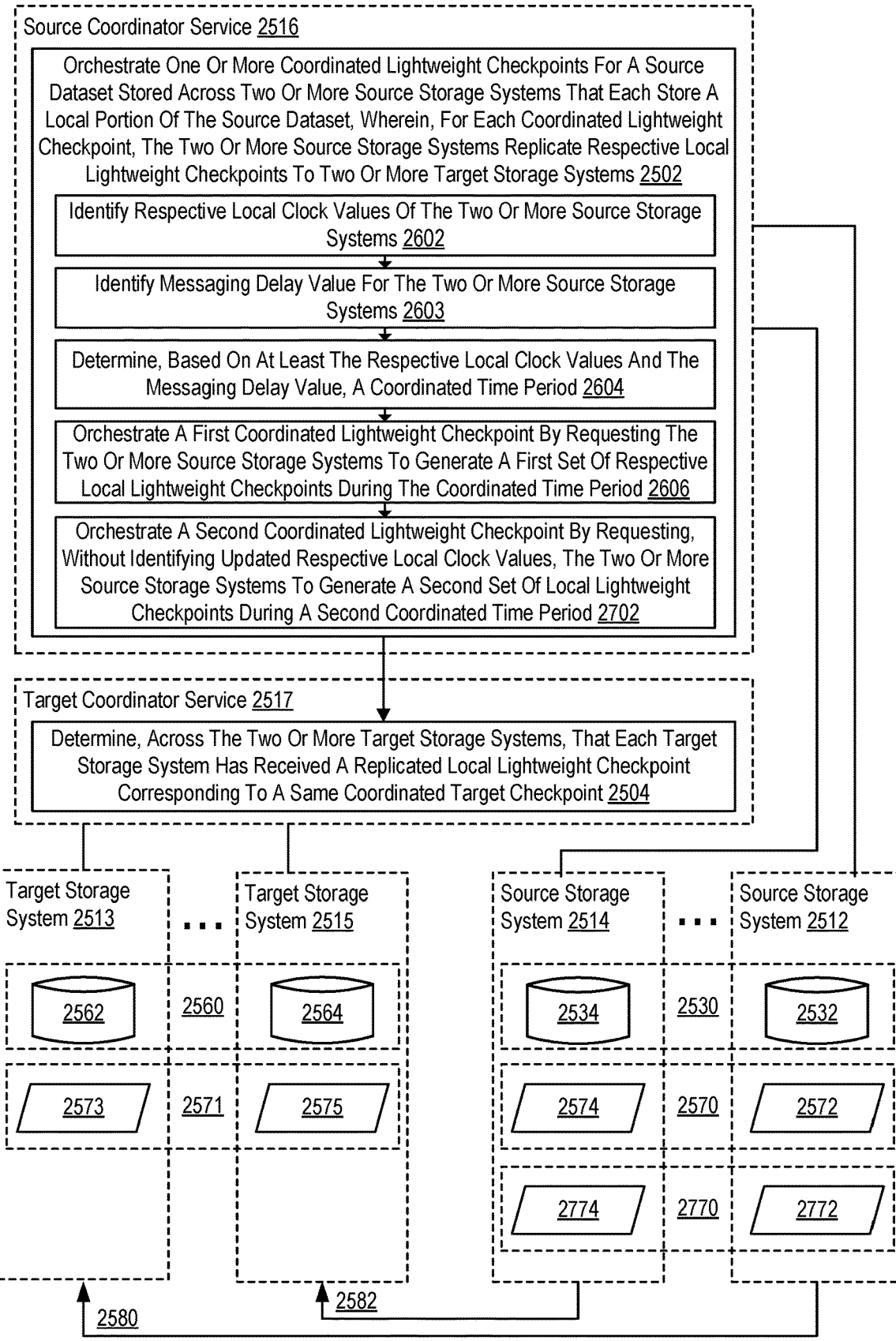
FIG. 27 sets forth a flow chart illustrating an additional example method for coordinated checkpoints among storage systems implementing checkpoint-based replication according to some embodiments of the present disclosure.

For further explanation, FIG. 27 sets forth another example method of coordinated checkpoints among storage systems implementing checkpoint-based replication in accordance with some embodiments of the present disclosure. The example depicted in FIG. 27 includes many of the same elements as the FIG. 26 described above. However, the example of FIG. 27 also includes orchestrating 2702 a second coordinated lightweight checkpoint 2770 by requesting, without identifying updated respective local clock values, the two or more source storage systems 2512, 2514 to generate a second set of local lightweight checkpoints 2772, 2774 during a second coordinated time period. In some implementations, the source coordinator service 2516 uses the local clock values from a previous clock exchange (and thus the same time granularity $T_G$ and coordinated clock delta $T_p\Delta$ previously calculated) to determine a coordinated time period for subsequent coordinated lightweight checkpoints. For example, the source coordinator service 2516 may calculate a second $T_{sp}$ for each source storage system based on the initial clock value obtained from that storage system plus, for example, 150 milliseconds. Similarly, the source coordinator service 2516 may calculate a third $T_{sp}$ for each source storage system based on the initial clock value obtained from that storage system plus 300 milliseconds, and so on.

Continuing the above example, the source coordinator service 2516 may add 150 millisecond and $T_{p\Delta}$ to $T_{a0}$ to establish a local time $T_{ap2}=T_{a0}+150$ ms$+T_{p\Delta}$ in the future at which point storage system A should pause I/O operations and initiate its second local lightweight checkpoint 2772 for the second coordinated lightweight checkpoint 2770. Likewise, the source coordinator service 2516 may add 150 millisecond and $T_{p\Delta}$ to $T_{b0}$ to establish a local time $T_{bp2}=T_{b0}+150$ ms$+T_{p\Delta}$ in the future at which point storage system B should pause I/O operations and initiate its second local lightweight checkpoint 2774. The source coordinator service 2516 can then send a second checkpoint request message to storage system A indicating that I/O operations should be paused at time $T_{ap2}$ for a time period of duration $T_G$ according to its local clock, and that its second local lightweight checkpoint 2772 should be generated during that time period. Likewise, the source coordinator service 2516 can send a second checkpoint request message to storage system B indicating that I/O operations should be paused at time $T_{bp2}$ for a time period of duration $T_G$ according to its local clock, and that its second local lightweight checkpoint 2774 should be generated during that time period.

As described above, after carrying out a clock exchange and clock delta for the source storage systems, the source coordinator service 2516 can explicitly coordinate a series of coordinated lightweight checkpoints by sending a series of checkpoint request messages to initiate a local lightweight checkpoint based on a periodic interval (e.g., every 150 milliseconds). In another variation, as mentioned above, the source storage systems 2512, 2514 receive a first checkpoint request message and schedule periodic local lightweight checkpoints for subsequent coordinated checkpoints based on that first checkpoint request message.

Figure 28:
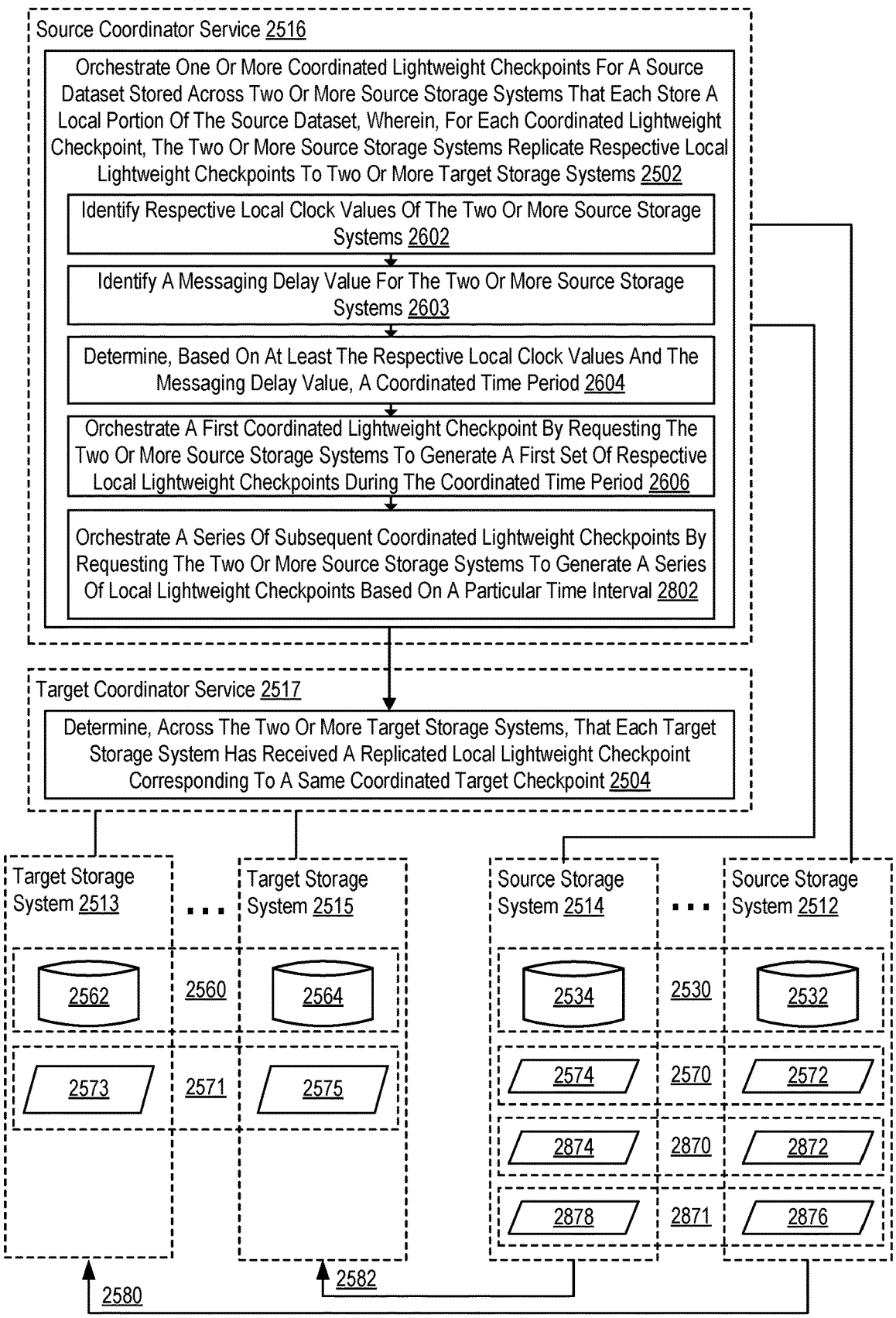
FIG. 28 sets forth a flow chart illustrating an additional example method for coordinated checkpoints among storage systems implementing checkpoint-based replication according to some embodiments of the present disclosure.

For further explanation, FIG. 28 sets forth another example method of coordinated checkpoints among storage systems implementing checkpoint-based replication in accordance with some embodiments of the present disclosure. The example depicted in FIG. 28 includes many of the same elements as the FIG. 26 described above. However, the example of FIG. 28 includes orchestrating 2802 a series of subsequent coordinated lightweight checkpoints 2870, 2871 by requesting the two or more source storage systems 2512, 2514 to generate a series of local lightweight checkpoints 2872, 2874, 2876, 2878 based on a particular time interval. In some examples, the source coordinator service 2516 provides the source storage systems 2512, 2514 with a periodicity for generating local lightweight checkpoints, i.e., a time interval at which the source storage systems should pause I/O operations and initiate a local lightweight checkpoint. For example, this periodicity value (e.g., 150 millisecond) may be included in a checkpoint request message following a clock exchange. Thus, in some examples, the clock request message sent to each source storage system includes a time $T_{sp}$ (based on respective local clocks) to pause I/O operations and initiate a local lightweight checkpoint, a duration $T_G$ for which I/O operations should remain paused, and a periodicity at which subsequent local lightweight checkpoints should be initiated. The source storage systems 2512, 2514 may then use the periodicity value to periodically and autonomously generate local lightweight checkpoints, which a coordinated based on the initial lightweight checkpoint for which the local clocks were coordinated.

Continuing the above example, the source coordinator service 2516 sends a checkpoint request message to storage system A indicating that I/O operations should be paused at time $T_{ap}$ for a time period of duration $T_G$ according to its local clock, and that its local lightweight checkpoint 2572 should be generated during that time period, and that future local lightweight checkpoints should be initiated every N milliseconds (e.g., 150 milliseconds) after $T_{ap}$. When storage system A's local clock reaches $T_{ap}$, storage system A pauses I/O operations and initiates a local lightweight checkpoint 2572. When storage system A's local clock reaches $T_{ap}+T_G$, storage system A sends a confirmation message to the source coordinator service 2516 indicating that the checkpoint was successfully generated. Storage system A then increments $T_{ap}$ by the periodicity value (for examples, $T_{ap}=T_{ap}+150$ milliseconds), and when storage systems A's local clock reaches the incremented $T_{ap}$, storage system A pauses I/O operations and initiates another local lightweight checkpoint 2872 as part of a subsequent second coordinated checkpoint 2870. When storage system A's local clock reaches $T_{ap}+T_G$, storage system A sends another confirmation message to the source coordinator service 2516 indicating that the next local checkpoint was successfully generated. Storage system A then increments $T_{ap}$ by the periodicity value again and generates a subsequent third local lightweight checkpoint 2876 for a subsequent third coordinated lightweight checkpoint 2871, and this process continues on. If storage A fails to establish a local lightweight checkpoint by $T_{ap}+T_G$, storage system A sends a failure message to the source coordinator service 2516 indicating that the checkpoint failed or was otherwise aborted. In the above example, storage system B also increments $T_{bp}$ by the periodicity value for every checkpoint, and performs in the same manner as described above with respect to storage system A to autonomously generate a second local lightweight checkpoint 2874 for the second coordinated lightweight checkpoint 2870 and a third local lightweight checkpoint 2878 for the third coordinated lightweight checkpoint 2871. In this way, each storage system autonomously generates a series local light weight checkpoint for a series of coordinated lightweight checkpoints based on an initial clock coordination. In this example, explicit checkpoint request messages for every coordinated lightweight checkpoint are obviated. However, the periodic local lightweight checkpoints are implicitly coordinated based on an initial coordination by the source coordinator service 2516.

In a variation, the source coordinator service 2516 does not provide a periodicity value to the source storage systems 2512, 2514. Rather, the source storage systems 2512, 2514 are configured with a periodicity value. Thus, in response to a checkpoint request message from the source coordinator service 2516, each storage system generates a local lightweight checkpoint and subsequently generates a series of local lightweight checkpoints that are based on the preconfigured periodicity value and the initial timing information provided in the checkpoints request message (i.e., $T_{sp}$ and $T_G$). For example, the periodicity value may be preconfigured by a user or administrator, or the periodicity value may be provided to source storage system when that source storage system is first initialized for coordinated checkpointing and/or replication, or the periodicity value may be configured in accordance with a replication policy or RPO.

As described earlier, clock exchanges can occur periodically rather than continuously, or they can be built into other coordination messages that are exchanged for other purposes, with occasional slow round trips being ignored. One issue is that if a clock starts drifting and a clock exchange eventually exhibits that a discrepancy has built up that exceeds the variance that the protocol had previously been accounting for, some number of prior checkpoints might actually not have been properly coordinated. In that case, it might be necessary to effectively "cancel" those replicated checkpoints for the coordinated target storage systems and deliver a new coordinated lightweight checkpoint that is properly coordinated. In such a case, the source coordinator service 2516 may deliver a message to the target coordinator service 2517 indicating that a set of replicated local checkpoints should be disregarded. This should not affect local source lightweight checkpoints that were established but improperly coordinated, so a new coordinated local source lightweight checkpoint may be a difference to earlier improperly coordinated local source lightweight checkpoints.

Clock coordination should happen frequently enough (and should add some small time interval to the $T_G$ value to reduce issues with clock drift) that this will not happen. However, to ensure that clock drift is not occurring, the source coordinator service 2516 may send updates every few coordinated lightweight checkpoints to confirm to a target coordinator that the prior few coordinated checkpoints have been confirmed to have avoided any unusual clock drift that might have left them inconsistent. This could be done, for example, once every second or two, to keep a low RPO in case a disaster failover is required, presuming that a target coordinator would only promote to a confirmed consistent target dataset.

Figure 29:
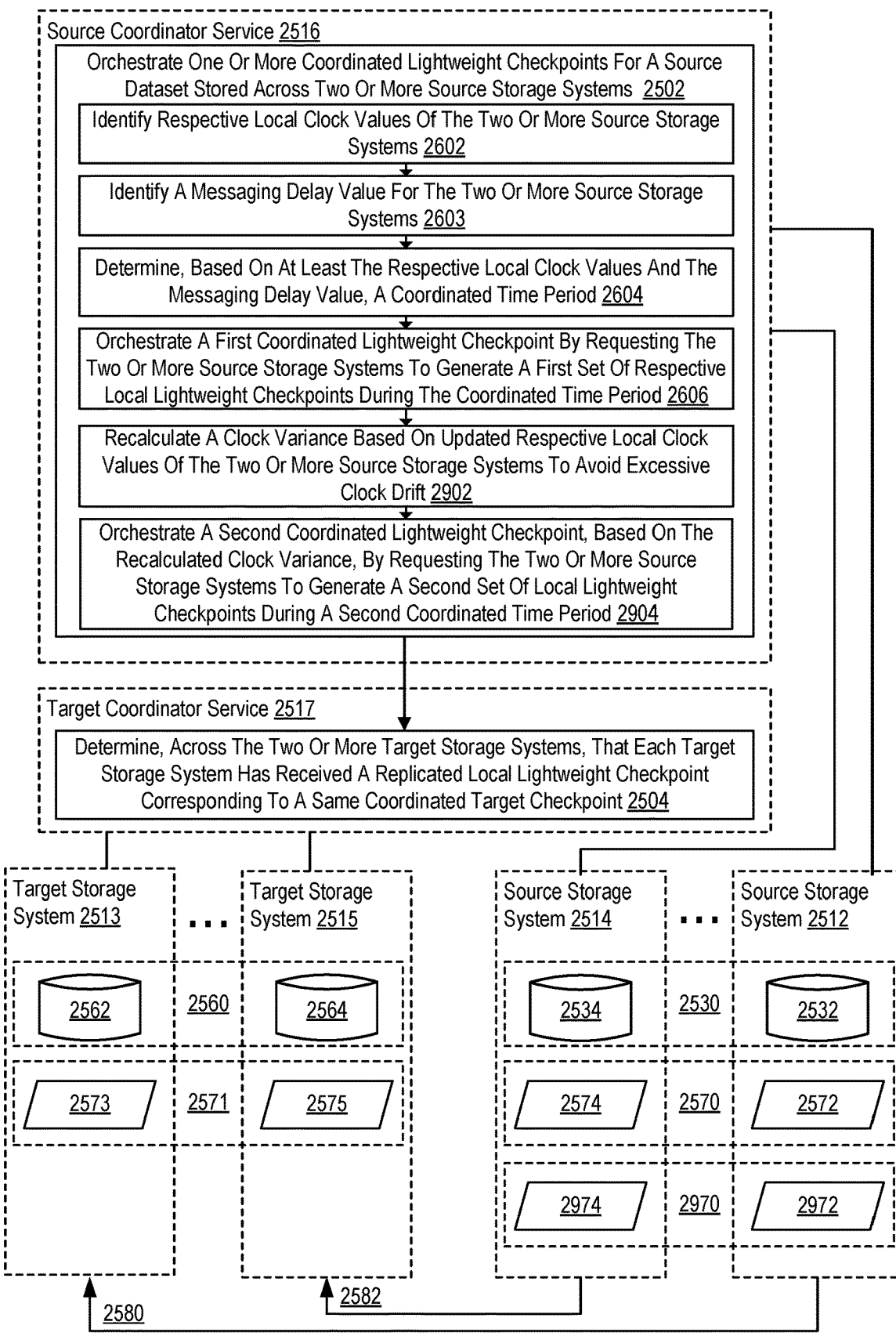
FIG. 29 sets forth a flow chart illustrating an additional example method for coordinated checkpoints among storage systems implementing checkpoint-based replication according to some embodiments of the present disclosure.

For further explanation, FIG. 29 sets forth another example method of coordinated checkpoints among storage systems implementing checkpoint-based replication that employs a clock-based coordinated checkpoint model in accordance with some embodiments of the present disclosure. The example depicted in FIG. 29 includes many of the same elements as the FIG. 26 described above. However, the example of FIG. 29 includes recalculating 2902 a clock variance based on updated respective local clock values of the two or more source storage systems 2512, 2514 to avoid excessive clock drift. In this example, to avoid an excessive clock drift between the state of the respective local clocks observed by the source coordinator service 2516 and the actual state of those local clocks, the source coordinator service 2516 may periodically re-coordinate the set of local clock values by calculating a new clock variance. The source coordinator service 2516 may calculate a new clock variance based on updated local clock values from the two or more source storage systems 2512, 2514 in the same manner that the original clock variance was calculated, as discussed above. Particularly, in some examples, the source coordinator service 2516 requests an updated set of respective local clock values from the source storage systems 2512, 2514 and calculates a new clock delta based on an updated time granularity $T_G$. The frequency at which the clocks of the source storage systems are re-coordinated may be selected based on historical trends, network conditions, based on the state of individual source storage system, through experimentation, or through some other mechanism that may occur to those of skill in the art. In some examples, a buffer may be included when calculating clock variance to allow for some amount of clock drift, such that clock variance should be recalculated at a frequency that will avoid a threshold amount of clock drift.

The method of FIG. 29 also includes orchestrating 2904 a second coordinated lightweight checkpoint 2970, based on the recalculated clock variance, by requesting the two or more source storage systems 2512, 2514 to generate a second set of local lightweight checkpoints 2972, 2974 during a second coordinated time period. In some examples, the source coordinator service 2516 orchestrates a second coordinated lightweight checkpoint as discussed above with respect a set of clock values for the first coordinated lightweight checkpoint. Particularly, the source coordinator service 2516 adds the updated clock delta to the respective updated local clock values, and sends checkpoint request messages to the source storage systems 2512, 2514 indicating respective local times at which point the source storage systems 2512, 2514 should pause I/O operations and initiate a local lightweight checkpoint for the second coordinated lightweight checkpoint.

In some examples, an excessive clock drift may be detected by the source coordinator service 2516. As discussed above, the coordinated time period is based on a future clock value for each local storage system as well as a I/O delay time that should ensure some amount of overlap if each local storage system blocks I/O for the agreed delay time at that scheduled local clock time and establishes a checkpoint boundary somewhere within that delay time. If the local clocks drift a bit too much relative to each other such that the delay coupled with those clocks is no longer sufficient to cause an overlap across the coordinated source storage systems, then checkpoint consistency may be lost. In some examples, the source coordinator service 2516 may detect a clock drift based on updated local clock values for the source storage systems 2512, 2514. For example, the source coordinator service 2516 may discover a clock drift during a periodic clock variance recalculation. In some examples, the source coordinator service 2516 detects a clock drift by determining whether an updated time granularity $T_G$ exceeds the previously calculated $T_G$ by a threshold amount. In other examples, the source coordinator service 2516 may detect a clock drift based one or more messages received from the source storage systems 2512, 2514 indicating that a local checkpoint may not have been properly established in a prior coordinated time period. In response to detecting the excessive clock drift, the source coordinator service 2516 may indicate that a previous coordinated lightweight checkpoint is potentially invalid. In some examples, the source coordinator service 2516 delivers a message to the target coordinator service 2517 indicating that a previously coordinated lightweight checkpoint and its associated replicated local lightweight checkpoints are potentially invalid. In such a case, the target coordinator service 2517 may discard the coordinated target lightweight checkpoint corresponding to the potentially invalid coordinated source lightweight checkpoint.

Figure 30:
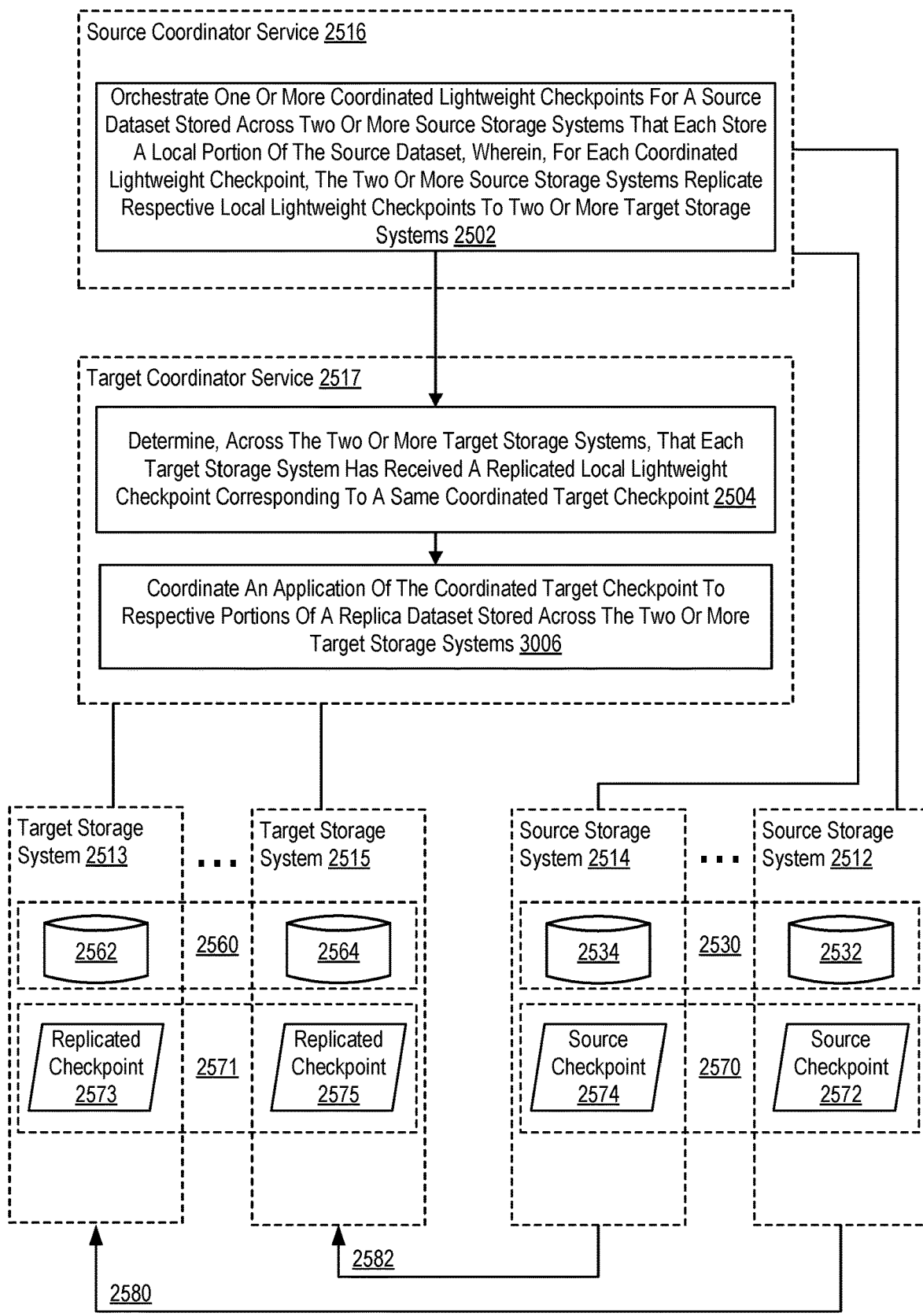
FIG. 30 sets forth a flow chart illustrating an additional example method for coordinated checkpoints among storage systems implementing checkpoint-based replication according to some embodiments of the present disclosure.

For further explanation, FIG. 30 sets forth another example method of coordinated checkpoints among storage systems implementing checkpoint-based replication in accordance with some embodiments of the present disclosure. The example depicted in FIG. 30 includes many of the same elements as the FIG. 25 described above. However, the example of FIG. 30 also includes coordinating 3006 an application of the coordinated target checkpoint 2571 to respective portions 2562, 2564 of a replica dataset 2560 stored across the two or more target storage systems 2513, 2515. In some examples, as described above, the target storage systems may maintain local tracking datasets 2562, 2564 that are portions of a coordinated tracking dataset 2560, and apply lightweight checkpoints to those local tracking datasets 2562, 2564. In some examples, the target storage systems 2513, 2515 are configured to withhold application of the local replicated lightweight checkpoints to a local tracking dataset until the target coordinator service 2517 has confirmed that the local replicated lightweight checkpoints should be applied. An issue with lightweight checkpoints for near-synchronous replication and coordinated target storage systems, is the issue of how many checkpoints are kept, and when and how they are applied to the tracking dataset. For example, if a link between one replicating pair runs much slower because the available networking bandwidth temporarily is not enough for the update rate on the source storage system, then checkpoints for one of the replicating pairs may end up being a lot slower than for other pairs. As a result, some of the local replicated checkpoints may be well ahead.

To handle this problem, a target storage system may be configured to hold onto replicated lightweight checkpoints (such as by not yet applying them) until the target coordinator service 2517 confirms that all the other coordinated replication target storage systems have caught up to the same point. Essentially, target coordinator service 2517 may be tracking the furthest behind near-synchronous replication target storage system and communicating that target storage system's most recent replicated checkpoint to the near-synchronous replication target storage systems, so all the target storage systems can apply the related local lightweight checkpoints together at roughly the same time. Additionally, it may make sense to push back on a local source storage system to slow down front-end I/O (essentially adding front-end flow control) if its paired target storage system is falling too far behind its coordinated peers. Accordingly, a number of in-progress coordinated target checkpoints may be assigned a 'waiting' state and tracked as waiting coordinated target checkpoints.

With respect to faults and recoveries, if a system crashes, the target coordinator service 2517 may not know what checkpoint was last applied to the target copy of the source dataset if checkpoints are not persisted as identifiable checkpoints. Thus, in some examples, coordinated target-side persistent snapshots are persisted on a semi-frequent basis to generate persistent semi-frequent checkpoints (as snapshots) that can record a last known persistent complete coordinated target checkpoint, or a last known persistent version of any of the other tracking dataset types (complete, partial complete, faulted, and so on). If none of the target systems fault, or if the list of faulted target systems has not changed since the last persisted checkpoint, then on a promotion or in the case of a snapshot or clone request, the last coordinated state can be used without having to fall back to the last persistent coordinated checkpoint of the requested type.

In some examples, the two or more target storage systems 2513, 2515 have different implementations and storage environments (although the storage systems 2513, 2515 being dissimilar is not a requirement for all embodiments of the present disclosure). For example, a storage system environment can implement a particular type of storage, such as block storage, file system storage, object storage, and database storage. In one non-limiting example, a target storage system 2513 can implement block storage to replicate a portion of the source dataset 2530 another target storage system 2515 can implement file storage to replicate another portion of the source dataset 2530. Thus, in some examples, the target storage systems 2513, 2515 can employ different storage environments to implement data types of storage.

Figure 31:
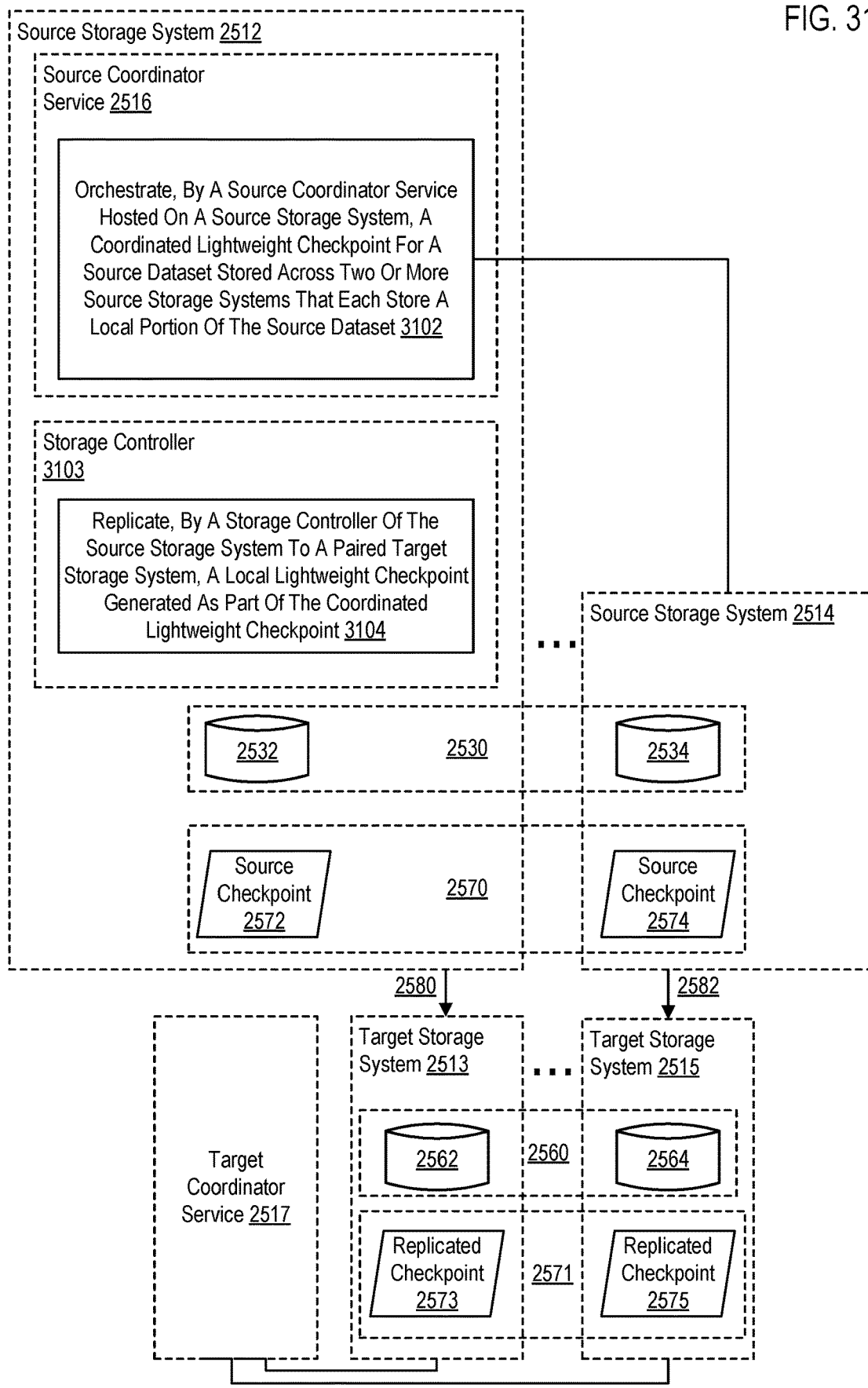
FIG. 31 sets forth a flow chart illustrating an additional example method for coordinated checkpoints among storage systems implementing checkpoint-based replication according to some embodiments of the present disclosure.

For further explanation, FIG. 31 sets forth another example method of coordinated checkpoints among storage systems implementing checkpoint-based replication in accordance with some embodiments of the present disclosure. The example depicted in FIG. 31 includes many of the same elements as the FIG. 25 described above. The example depicted in FIG. 30 includes orchestrating 3102, by a source coordinator service 2516 hosted on a source storage system 2512, a coordinated lightweight checkpoint 2570 for a source dataset 2530 stored across two or more source storage systems 2512, 2514 that each store a local portion 2532, 2534 of the source dataset 2530. In some examples, a source coordinator service 2516 that is hosted by a source storage system 2512 orchestrates 3102 the coordinated lightweight checkpoint 2570 as described above with reference to orchestrating 2502 one or more coordinated lightweight checkpoints 2570 for the source dataset 2530 stored across the two or more source storage systems 2512, 2514. In these examples, the source coordinator service 2516 is resident on one of the two or more storage systems, which places the source coordinator service 2516 closer to the kinds of low-latency scheduling associated with I/O code.

The example method of FIG. 31 also includes replicating 3104, by a storage controller 3103 of the source storage system 2512 to a paired target storage system, a local lightweight checkpoint generated as part of the coordinated lightweight checkpoint. In some examples, replicating 3104 a local lightweight checkpoint may be carried out as discussed above.

In some embodiments, the source coordinator service 2516 may be implemented on a source coordinator device coupled to the source storage systems 2512, 2514, where the source coordinator device includes a processor and a memory storing computer executable instructions that, when executed by the processor, cause the source coordinator device to carry out the operations of the source coordinator service 2516 described above. In some examples, the source coordinator device may be one of the source storage systems 2512, 2514. In some embodiments, the target coordinator service 2517 may be implemented on a target coordinator device (e.g., a server) coupled to the target storage systems, where the target coordinator device includes a processor and a memory storing computer executable instructions that, when executed by the processor, cause the target coordinator device to carry out the operations of the target coordinator service 2517 described above. Thus, in some embodiments, a data replication system may comprise the source storage systems, target storage systems, source coordinator device, and target coordinator device.

Although some embodiments are described largely in the context of devices and storage systems, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:
 orchestrating a coordinated checkpoint for a dataset based on a clock value determination for two or more source storage systems that replicate local checkpoints of portions of the dataset to replication targets; and
 based on the clock value determination, scheduling different times for replicating local lightweight checkpoints, corresponding to the coordinated checkpoint, to different replication targets.

2. The method of claim 1, wherein a coordinated lightweight checkpoint represents a coordinated point in time for a source dataset that is coordinated, by a source coordinator, across the two or more source storage systems.

3. The method of claim 1, wherein a source coordinator coordinates, for each coordinated lightweight checkpoint, the two or more source storage systems to generate respective local lightweight checkpoints for their respective local portions of a source dataset.

4. The method of claim 3, wherein the two or more source storage systems are paired with two or more target storage systems for replication; and
wherein the respective local lightweight checkpoints are replicated between replication pairs.

5. The method of claim 4, wherein a replication link between a replicating pair employs a near-synchronous replication policy.

6. The method of claim 1, wherein at least one first source storage system and at least one second source storage system employ different storage implementations.

7. The method of claim 1, wherein orchestrating one or more coordinated lightweight checkpoints for a source dataset stored across two or more source storage systems includes:
identifying respective local clock values of the two or more source storage systems;
identifying a messaging delay value for the two or more source storage systems;
determining, based on at least the respective local clock values and messaging delay value, a coordinated time period; and
orchestrating a first coordinated lightweight checkpoint by requesting the two or more source storage systems to generate a first set of respective local lightweight checkpoints during the coordinated time period.

8. The method of claim 7 further comprising:
orchestrating a second coordinated lightweight checkpoint by requesting, without identifying updated respective local clock values, the two or more source storage systems to generate a second set of local lightweight checkpoints during a second coordinated time period.

9. The method of claim 7 further comprising:
orchestrating a series of subsequent coordinated lightweight checkpoints by requesting the two or more source storage systems to generate a series of local lightweight checkpoints based on a particular time interval.

10. The method of claim 7 further comprising:
recalculating a clock variance based on updated respective local clock values of the two or more source storage systems to avoid excessive clock drift; and
orchestrating a second coordinated lightweight checkpoint, based on the recalculated clock variance, by requesting the two or more source storage systems to generate a second set of local lightweight checkpoints during a second coordinated time period.

11. The method of claim 10, wherein, in response to detecting an excessive clock drift, a previous coordinated lightweight checkpoint is indicated as potentially invalid.

12. The method of claim 7, wherein a second coordinated lightweight checkpoint is orchestrated by the two or more source storage systems autonomously generating a second set of respective local lightweight checkpoints during a second coordinated time period that is based on a first coordinated time period.

13. An apparatus comprising a computer processor, a computer memory operatively coupled to the computer processor, the computer memory having disposed within it computer program instructions that, when executed by the computer processor, cause the apparatus to:
orchestrating a coordinated checkpoint for a dataset based on a clock value determination for two or more source storage systems that replicate local checkpoints of portions of the dataset to replication targets; and
based on the clock value determination, scheduling different times for replicating local lightweight checkpoints, corresponding to the coordinated checkpoint, to different replication targets.

14. A system comprising:
two or more source storage systems that each store a local portion of a source dataset;
two or more target storage systems that are replication targets of the two or more source storage systems;
a source coordinator device configured to: orchestrate a coordinated checkpoint for a dataset based on a clock value determination for two or more source storage systems that replicate local checkpoints of portions of the dataset to replication targets; and
based on the clock value determination, schedule different times for replicating local lightweight checkpoints, corresponding to the coordinated checkpoint, to different replication targets.

15. The system of claim 14, wherein orchestrating one or more coordinated lightweight checkpoints for a source dataset stored across the two or more source storage systems includes:
identifying respective local clock values of the two or more source storage systems;
identifying a messaging delay value for the two or more source storage systems;
determining, based on at least the respective local clock values and the messaging delay value, a coordinated time period; and
orchestrating a first coordinated lightweight checkpoint by requesting the two or more source storage systems to generate a first set of respective local lightweight checkpoints during the coordinated time period.

16. The system of claim 15, wherein the source coordinator device is further configured to:
orchestrate a second coordinated lightweight checkpoint by requesting, without identifying updated respective local clock values, the two or more source storage systems to generate a second set of local lightweight checkpoints during a second coordinated time period.

17. The system of claim 15, wherein the source coordinator device is further configured to:
orchestrate a series of subsequent coordinated lightweight checkpoints by requesting the two or more source storage systems to generate a series of local lightweight checkpoints based on a particular time interval.

18. The system of claim 15, wherein the source coordinator device is further configured to:
recalculate a clock variance based on updated respective local clock values of the two or more source storage systems to avoid excessive clock drift; and
orchestrate a second coordinated lightweight checkpoint, based on the recalculated clock variance, by requesting the two or more source storage systems to generate a second set of local lightweight checkpoints during a second coordinated time period.

19. The system of claim 15, wherein a second coordinated lightweight checkpoint is orchestrated by the two or more source storage systems autonomously generating a second set of respective local lightweight checkpoints during a second coordinated time period that is based on a first coordinated time period.

20. The system of claim 14, wherein the source coordinator device is comprised in one of the two or more source storage systems.

* * * * *